US009497562B2

(12) United States Patent
Hiruma et al.

(10) Patent No.: US 9,497,562 B2
(45) Date of Patent: Nov. 15, 2016

(54) SOUND FIELD CONTROL APPARATUS AND METHOD

(75) Inventors: Takahiro Hiruma, Tokyo (JP); Akihiko Enamito, Kawasaki (JP); Osamu Nishimura, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 426 days.

(21) Appl. No.: 13/357,634

(22) Filed: Jan. 25, 2012

(65) Prior Publication Data

US 2012/0195447 A1 Aug. 2, 2012

(30) Foreign Application Priority Data

Jan. 27, 2011 (JP) ................................ 2011-015364

(51) Int. Cl.

| | |
|---|---|
| ***H04R 5/02*** | (2006.01) |
| ***H04R 21/00*** | (2006.01) |
| ***G10K 11/16*** | (2006.01) |
| ***H04B 3/00*** | (2006.01) |
| ***H04R 5/00*** | (2006.01) |
| ***H04S 7/00*** | (2006.01) |
| ***H04S 1/00*** | (2006.01) |

(Continued)

(52) U.S. Cl.

CPC ................. *H04S 7/303* (2013.01); *H04R 1/26* (2013.01); *H04R 3/12* (2013.01); *H04R 2499/15* (2013.01); *H04S 1/002* (2013.01); *H04S 7/301* (2013.01); *H04S 7/305* (2013.01); *H04S 7/307* (2013.01); *H04S 2400/13* (2013.01); *H04S 2420/07* (2013.01)

(58) Field of Classification Search

USPC .................. 381/71.1, 56, 122, 59, 71.4, 306

See application file for complete search history.

(56) References Cited

U.S. PATENT DOCUMENTS

| | | | | |
|---|---|---|---|---|
| 6,192,133 | B1 * | 2/2001 | Enamito | G10K 11/1784 381/71.1 |
| 6,931,370 | B1 * | 8/2005 | McDowell | H04S 3/008 704/200.1 |
| 2005/0084115 | A1 * | 4/2005 | Enamito et al. | 381/71.7 |
| 2006/0050890 | A1 * | 3/2006 | Tsuhako | H04R 5/02 381/27 |

(Continued)

FOREIGN PATENT DOCUMENTS

| | | |
|---|---|---|
| JP | 5130700 A | 5/1993 |
| JP | 2002185276 A | 6/2002 |

(Continued)

OTHER PUBLICATIONS

First Office Action dated Feb. 5, 2013 for corresponding Japanese Patent Application No. 2011-015364 with English translation (10 pages).

*Primary Examiner* — Duc Nguyen
*Assistant Examiner* — Yogeshkumar Patel
(74) *Attorney, Agent, or Firm* — Finnegan, Henderson, Farabow, Garrett & Dunner, LLP

(57) ABSTRACT

According to one embodiment, a sound field control apparatus is provided with a control filter and a calculation unit. The filter executes an FIR computation for an acoustic signal using coefficients to output a main signal and control signals. The unit calculates the main coefficient and the coefficients based on Spatial transmission characteristics and a sound increase factor n, to set a composite sound pressure from a main speaker and control speakers to a first area to be n times of a coming sound pressure from only the main speaker, and to set a composite sound pressure from the main speaker and control speakers to a second area to be equal to the coming sound pressure from only the main speaker.

20 Claims, 34 Drawing Sheets

(51) Int. Cl.
*H04R 1/26* (2006.01)
*H04R 3/12* (2006.01)

(56) References Cited

U.S. PATENT DOCUMENTS

| | | | | |
|---|---|---|---|---|
| 2006/0204022 | A1* | 9/2006 | Hooley | H04R 1/403 381/117 |
| 2006/0215853 | A1 | 9/2006 | Hiruma et al. | |
| 2007/0098183 | A1* | 5/2007 | Enamito | H04S 3/002 381/71.1 |
| 2008/0152152 | A1* | 6/2008 | Kimura | H04S 7/30 381/17 |
| 2009/0129604 | A1* | 5/2009 | Enamito | H04S 7/302 381/58 |

FOREIGN PATENT DOCUMENTS

| | | | |
|---|---|---|---|
| JP | 2003032776 | A | 1/2003 |
| JP | 2004312141 | A | 11/2004 |
| JP | 2005252538 | A | 9/2005 |
| JP | 2006246310 | A | 9/2006 |
| JP | 2007-013400 | A | 1/2007 |
| JP | 2007-121439 | A | 5/2007 |
| JP | 2008263293 | A | 10/2008 |
| JP | 2009111920 | A | 5/2009 |
| JP | 2009130538 | A | 6/2009 |
| JP | 2009212890 | A | 9/2009 |
| JP | 2010171513 | A | 8/2010 |
| JP | 2010-199802 | A | 9/2010 |
| WO | 2007/029500 | A1 | 3/2007 |

* cited by examiner

1000Hz

500Hz

250Hz

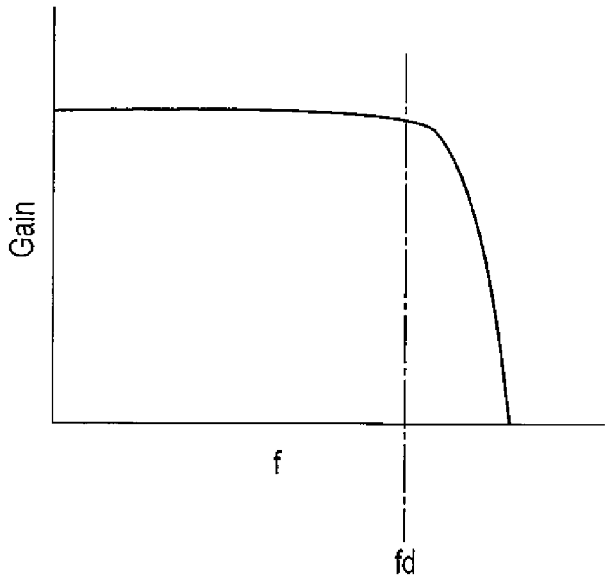
FIG. 10
FIG. 11A
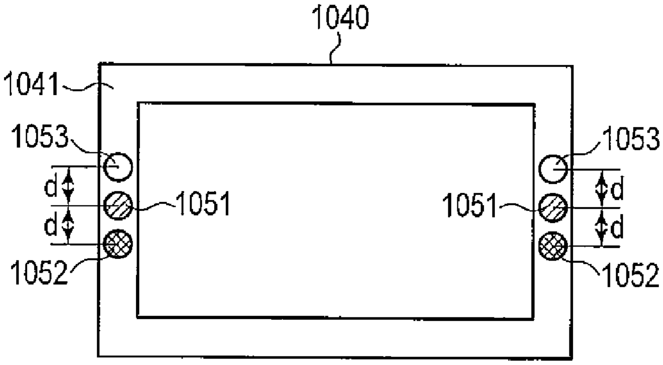
FIG. 11B
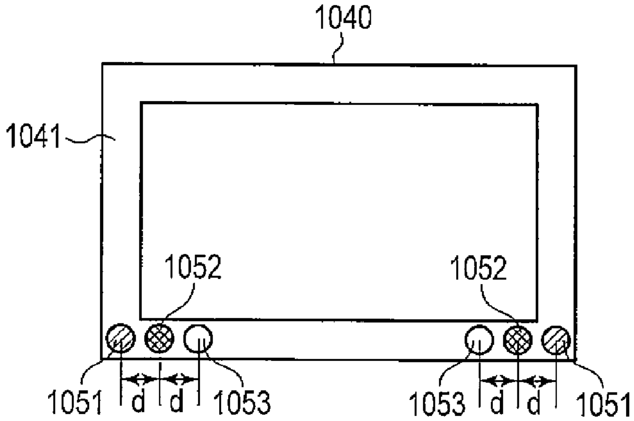

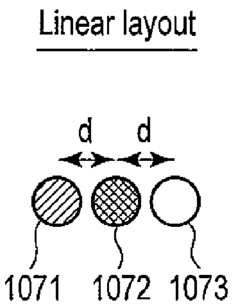
FIG. 13A
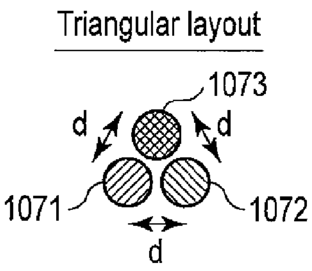
FIG. 13B
FIG. 14A
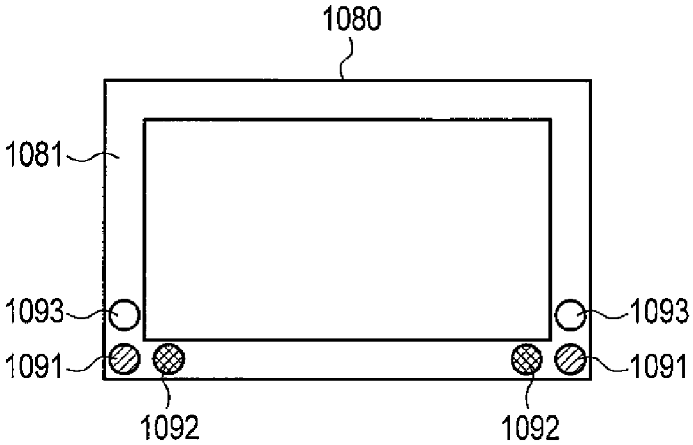
FIG. 14B
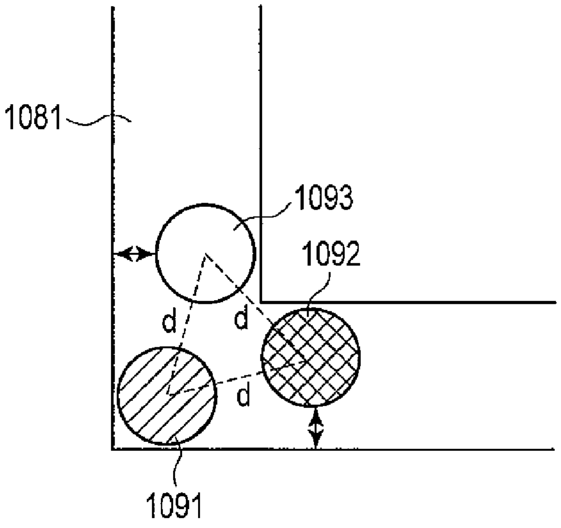

SOUND FIELD CONTROL APPARATUS AND METHOD

CROSS-REFERENCE TO RELATED APPLICATIONS

This application is based upon and claims the benefit of priority from prior Japanese Patent Application No. 2011-015364, filed Jan. 27, 2011, the entire contents of which are incorporated herein by reference.

FIELD

Embodiments described herein relate generally to a sound field control apparatus and method for controlling a sound field.

BACKGROUND

As a sound field control technique which increases sound pressure in a specific area, and maintains sound pressure in another area, for example, a sound spot or sound collector using a time delay is known. This technique targets at mid/treble tones, and increases bass tones in both an area for increasing mid/treble tones and an area for maintaining mid/treble tones. A superdirectional parametric speaker using ultrasounds is also unsuitable for bass tones.

On the other hand, a sound field control technique which can target at bass tones is also known. This technique maintains sound pressure in an area in front of a speaker, and reduces sound pressure in a surrounding area. Upon reducing sound pressure, uniform frequency characteristics cannot be provided.

No conventional control technique which increases bass tones in a specific area, can maintain sound pressure in another area, and can give uniform frequency characteristics in association with sound pressure maintenance is known.

BRIEF DESCRIPTION OF THE DRAWINGS

FIG. 10 is a graph for explaining a low-pass cutoff frequency;

FIGS. 11A and 11B show speaker layout examples;

FIGS. 13A and 13B show views for explaining speaker layouts;

FIGS. 14A and 14B show a speaker layout example;

DETAILED DESCRIPTION

Figure 1:
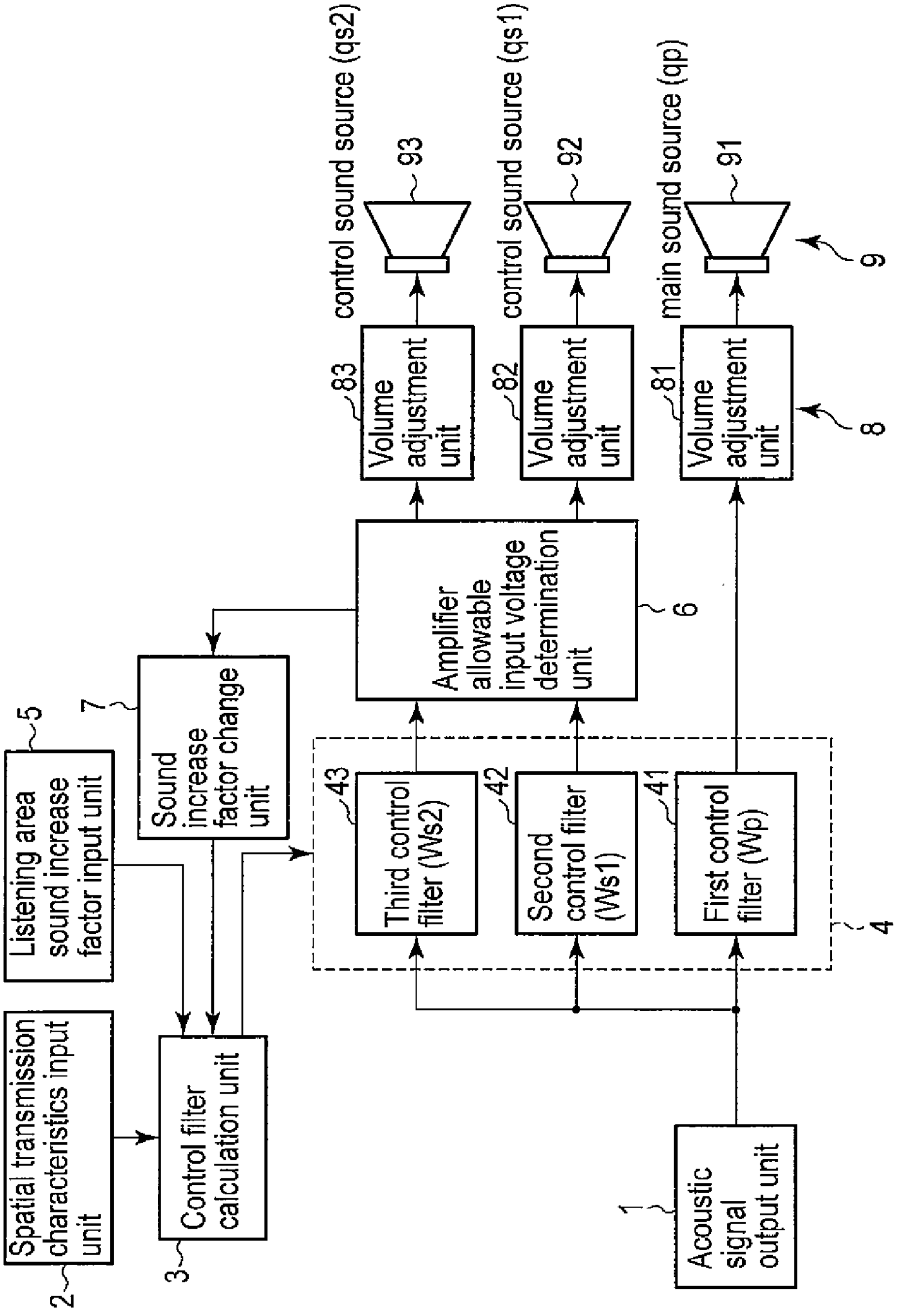
FIG. 1 is a block diagram showing an example of the arrangement of a sound field control apparatus according to a first embodiment.

Referring to the accompanying drawings, a sound field control apparatus according to the embodiments of the invention will be described in detail. In the embodiments, like reference numbers denote like elements, and no duplicate explanations will be given.

In general, according to one embodiment, a sound field control apparatus is provided with a control filter unit, a volume adjustment unit and a calculation unit. The control filter unit executes an FIR computation for an input acoustic signal using a main sound source coefficient and a plurality of control sound source coefficients and to output a main sound source signal and a plurality of control sound source signals. The volume adjustment unit adjusts volumes of the main sound source signal and the plurality of control sound source signals output from the control filter, and to supply the adjusted main sound source signal and the adjusted plurality of control sound source signals to a corresponding main sound source speaker and a plurality of control sound source speakers. The calculation unit calculates the main sound source coefficient and the plurality of control sound source coefficients to be used by the control filter based on Spatial transmission characteristics from the main sound source speaker and the plurality of control sound source speakers to a first area and a second area, the first area being different from the second area, and a sound increase factor n, so as to set a composite sound pressure from the main sound source speaker and the plurality of control sound source speakers to the first area to be n times or closer of a coming sound pressure from only the main sound source speaker, and to set a composite sound pressure from the main sound source speaker and the plurality of control sound source speakers to the second area to be equal or close to the coming sound pressure from only the main sound source speaker.

According to this embodiment, tones can be increased in a desired area, sound pressure can be maintained in another area, and uniform frequency characteristics can be given in association with sound pressure maintenance.

The embodiments use a plurality of control sound sources (control speakers) with respect to a main sound source (main speaker), and controls control filters for these sound sources, thereby controlling to increase sound pressure in a certain area compared to a state of the main sound source alone (a state without sound increase control), and controlling to maintain sound pressure in another area (upon comparison of states before and after sound increase control).

In the following description, "control to increase sound pressure in a certain area and to maintain sound pressure in another area" of the embodiments will be referred to as "sound increase control".

Also, in the embodiments, an increase target area in the sound increase control will be referred to as a "listening area", and a sound pressure maintenance target area will be referred to as a "non-listening area". Note that the non-listening area does not mean an area in which one does not listen to any sound, but whether or not to listen to sound in the non-listening area is arbitrary.

Note that the following description may be given taking as an example a case in which the listening area is set as an area in front of the main speaker. However, the embodiments are not limited to such specific example, and an area except for the area in front of the main speaker may be used as the listening area. Likewise, the following description may be given taking as an example a case in which the non-listening area is set as a surrounding area of the area in front of the main speaker. However, the embodiments are not limited to such specific example, and the non-listening area may be set as an area other than that surrounding area.

Both of an arrangement which fixes the listening and non-listening areas in advance and that which variably sets the listening and/or non-listening areas are available.

Purposes of "sound increase" are not particularly limited. For example, various cases are conceivable: a case in which a user enjoys overwhelming sound (heavy sound) in only the listening area, a case in which a certain user enjoys overwhelming sound, and another user listens to heavy sound at a level lower than the listening area, or sound at a normal volume, or sound at a volume lower than the normal volume in the non-listening area, a case in which a user who has diminished hearing listens to sound at an increased volume in the listening area, and another user listens to sound with a normal volume in the non-listening area, and so forth.

The related art will be described in more detail below.

Figure 37:
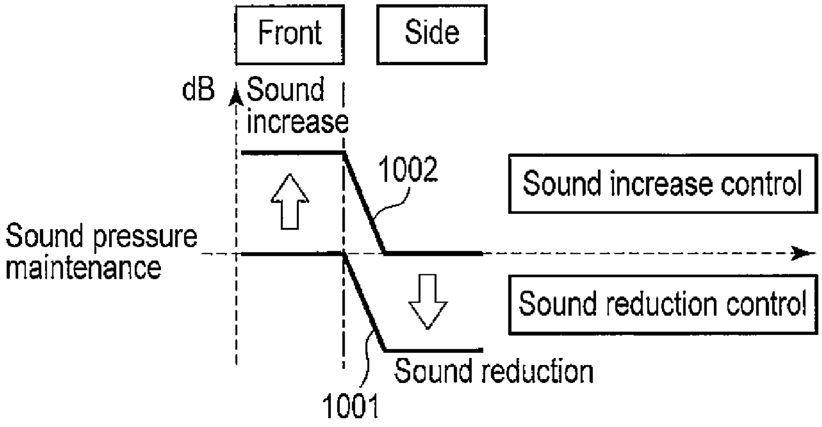
FIG. 37 is a view for explaining sound reduction control according to a related art.

As described above, the related art, which maintains sound pressure in an area in front of a TV/AV speaker, and reduces sound in its surrounding area for the purpose of realization of a speaker system which allows one to enjoy AV equipment sound at full blast without regard to sound leakage to a surrounding area, is known (see 1001 in FIG. 37) (in the following description, this control will be referred to as "sound reduction control"). However, the sound reduction performance is susceptible to the reverberation characteristics of a room in an actual space, and considerably deteriorates compared to a room without any reflection. Also, since sound reduction in a spatial area is rarely ordinarily experienced, a degree of expectation of its effect differs in individuals. That is, one tends to image sound deadening which reduces AV sound to a completely inaudible level, and it is difficult for a user to accept, for example, sound reduction of about 5 dB. Even when sound reduction of a surrounding area can be achieved, a person in the surrounding area experiences the effect of the sound reduction control (difference before and after the sound reduction control), but it is difficult for a person who is listening to sound from AV equipment in a front area to directly realize that effect.

By contrast, the embodiments realize "sound increase" in the listening area and "sound pressure maintenance" in the non-listening area. For the purpose of comparison, reference numeral 1002 in FIG. 37 denotes an overview of sound increase control when the listening area is set in front of a speaker and the non-listening area is set as a surrounding area of the listening area. Since sound is increased in the listening area, a difference before and after the control can be directly realized for a user in the listening area. Also, "sound increase" is an ordinarily experienced effect, and degrees of expected values do not largely differ in individuals compared to "sound reduction". Therefore, compared to the aforementioned sound reduction of about 5 dB, an increase of merely 5 dB leads to an acceptable volume increase (sound increase) function of bass tone.

Incidentally, on the surface, in a state in which control filter states that maintain sound pressure in the front area and reduce sound in the surrounding area are kept using the sound reduction control of the related art, a volume of a speaker amplifier may be raised by a level corresponding to the sound reduction, thereby increasing sound in the front area (that is, sound pressure maintenance by the sound reduction control+an increase in volume by a level corresponding to the sound reduction), and maintaining sound pressure in the surrounding area (that is, sound reduction in the sound reduction control+an increase in volume by a level corresponding to the sound reduction).

However, in this case, the following problems are posed. In consideration of a case in which only "sound reduction in the sound reduction control" in "sound reduction in the sound reduction control+an increase in volume by a level corresponding to the sound reduction" is performed in the surrounding area, since "sound reduction in the sound reduction control" is controlled and implemented by interferences of sound pressures, the frequency characteristics in the surrounding area in this reduced state are influenced by an unknown parameter, that is, indoor reverberation, which cannot be manipulated on the control side. Therefore, the frequency characteristics in the surrounding area cannot always be uniform across the whole frequency band. Next, when the gain of the amplifier is increased in this reduced state to increase sound pressure up to a sound pressure maintenance level, nonuniform frequency characteristics become conspicuous in the surrounding area, and the user takes some notice of a volume balance between bass and treble tones. That is, a demerit of distinct sound quality deterioration due to nonuniformity becomes more prominent than a merit of increasing sound in the front area.

Figure 38:
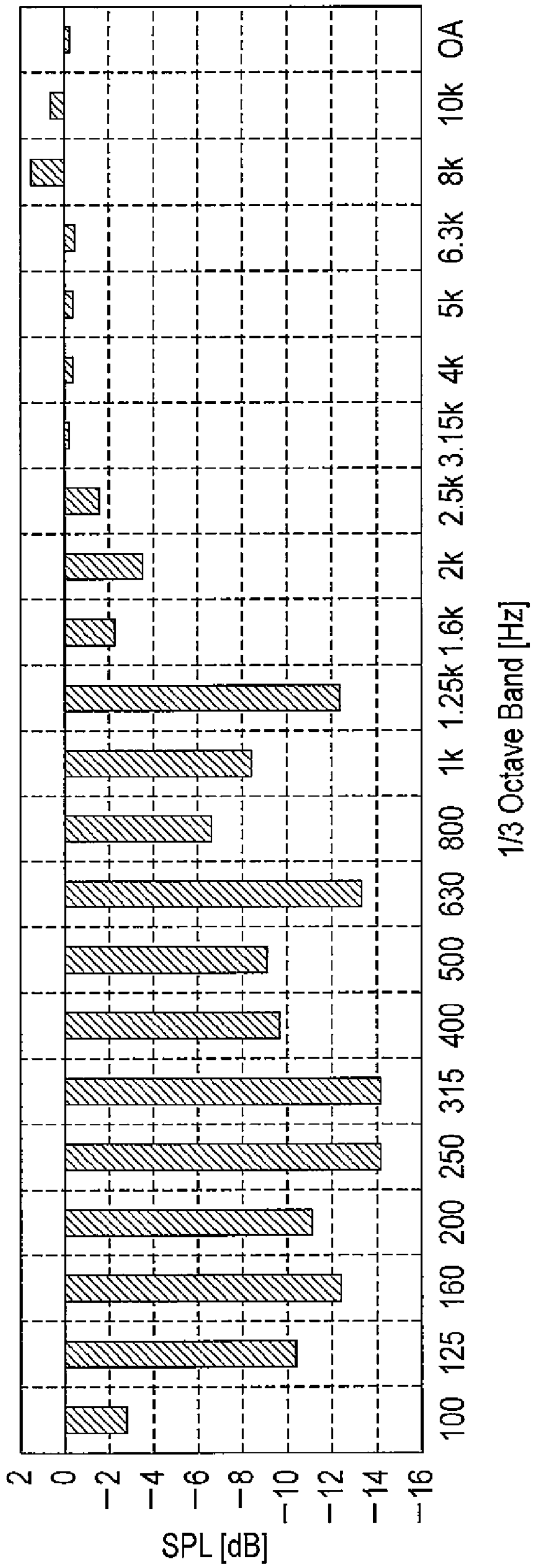
FIG. 38 is a graph for explaining nonuniformity of frequency characteristics in the sound reduction control according to the related art.

FIG. 38 shows actual measurement results of the frequency characteristics of sound reduction (sound pressure variation amounts) in the surrounding area based on the related art. Note that this measurement was made to have, as a measurement point in the surrounding area, a position which was separated by 1.5 m from a sound source in the front direction, and by 2.8 m in the side direction. As can be seen from FIG. 38, sound pressure is reduced by about 6 to 14 dB in a bass band up to a 1.25-kHz band in the surrounding area, but its effect is not constant. Therefore, even when the gain of the amplifier is increased in this state, a change of sound quality stands out, and this control is not equivalent to the sound increase control indicated by reference numeral 1002 in FIG. 37.

By contrast, the sound increase control of the embodiments increase sound pressure in the listening area while sound pressure is maintained in the non-listening area to assure uniform frequency characteristics.

Furthermore, in this case, the sound increase control of the embodiments allow sound increase control even in a bass band which cannot be reproduced by the time delay method targeted at mid/treble tones, as described in the related art, thus providing another merit. Especially, since the sound insulating performance of a wall considerably lowers in a bass band, the sound increase control of the embodiments are also important in attaining prevention of sound leakage to a neighboring room.

The first to eighth embodiments will be described in more detail hereinafter.

In the first to eighth embodiments to be described hereinafter, a sound field control apparatus, which controls a listening space (or looking and listening space) sound field of an AV audio speaker system for a low-profile television, will be exemplified. However, the sound field control apparatus of this embodiment is not limited to such specific apparatus.

The sound field control apparatus of the first to eighth embodiments may be built into an apparatus such as a TV, audio equipment, or AV equipment (to be referred to as a contents processing apparatus hereinafter for the sake of convenience), which has all or some of a function of receiving content containing an acoustic signal (that containing an acoustic signal alone, that containing an acoustic signal together with a moving image and/or still image, either one of these contents which further contain other related information, or the like) (to be simply referred to as content hereinafter) from, for example, a terrestrial broadcast signal or satellite broadcast signal, a function of acquiring content via network such as the Internet, intranet, or home network, a function of loading content stored in a recording medium such as a CD or DVD, a function of acquiring content from an internal or external disk device, a function of outputting an audio input via a microphone, and a function of synthesizing and outputting speech or sound. Alternatively, the sound field control apparatus may be built into another apparatus interposed between the contents processing apparatus and external speakers. Alternatively, this sound field control apparatus may be interposed between the contents processing apparatus and external speakers, when it is used.

The first to eighth embodiments will explain sound increase control targeted at a sound source group which includes one main sound source and two control sound sources as one set. However, three or more control sound sources per set may be used. Also, a configuration that uses two or more main sound sources per set is also available. Furthermore, for example, a set including one main sound source and two control sound sources may be arranged for each of L and R channels (in this case, the sound increase control is individually executed for the L and R channels).

The first to fourth embodiments will exemplify a sound field control apparatus including one main sound source/control sound source set. Alternatively, the sound field control apparatus of the first to fourth embodiments may include a plurality of main sound source/control sound source sets. The fifth to eighth embodiments will exemplify a sound field control apparatus which includes one main sound source/control sound source set for each of L and R channels, that is, a total of two sets. Alternatively, in the arrangements of the fifth to eighth embodiments, an arrangement which includes only one main sound source/control sound source set targeted at, for example, a monaural audio is also available.

The first to fourth embodiments will mainly exemplify a case in which a listening area in which sound is increased in the sound increase control is statically fixed to an area in a direction in front of speakers. Alternatively, in the first to fourth embodiments, the listening area may be set as an area other than that in front of the speakers. The fifth embodiment will exemplify a case in which the listening area in which sound is increased in the sound increase control is statically fixed to an arbitrary area. The sixth to eighth embodiments will exemplify a case in which the listening area can be dynamically changed. In the first to fifth embodiments, the listening area can also be dynamically changed.

First Embodiment

The first embodiment will be described below.

FIG. 1 shows an arrangement example of a sound field control apparatus according to this embodiment.

As shown in FIG. 1, the sound field control apparatus of this embodiment includes an acoustic signal output unit 1, Spatial transmission characteristic input unit 2, control filter calculation unit 3, control filters 4, and volume adjustment units (amplifier units) 8. Speakers 9 may be incorporated in or externally connected to the sound field control apparatus.

The sound field control apparatus may further include an amplifier allowable input voltage determination unit 6 and sound increase factor change unit 7 (FIG. 1 exemplifies the arrangement in this case, and when the amplifier allowable input voltage determination unit 6 and sound increase factor change unit 7 are not included, output signals of the control filters 4 are directly connected to the volume adjustment units 8).

The control filters 4 include a first control filter (Wp) 41, second control filter (Ws1) 42, and third control filter (Ws2) 43.

The volume adjustment units 8 include a first volume adjustment unit 81, second volume adjustment unit 82, and third volume adjustment unit 83.

The speakers 9 include a first speaker 91, second speaker 92, and third speaker 93.

The first control filter 41, first volume adjustment unit 81, and first speaker 91 are used for a main sound source.

The second control filter 42, second volume adjustment unit 82, and second speaker 92 are used for a first control sound source.

The third control filter 43, third volume adjustment unit 83, and third speaker 93 are used for a second control sound source.

The acoustic signal output unit 1 outputs an acoustic signal as a source. As described above, various cases are available as an acoustic signal acquisition method, and any of such cases can be used.

In this embodiment, when n is designated as a listening area sound increase factor, sound pressure of the listening area is controlled to an n-fold or closer sound pressure compared to that in a state in which sound increase control is OFF, and sound pressure of the non-listening area is maintained (that is, it is controlled to a 1-fold or closer sound pressure). That is, the control is made to attain the following state (by calculating amplitudes and phases of the two control sound sources with respect to the main sound source). In this state, a composite sound pressure $P_i$ (i=1 to N) from the main sound source (main sound source speaker) and two control sound sources (control sound source speakers) is controlled to an n-fold or closer sound pressure of a coming sound pressure from only the main sound source in the listening area. Also, a composite sound pressure from the main sound source (main sound source speaker) and two control sound sources (control sound source speakers) is controlled to be equal or closer to the coming sound pressure from only the main sound source (that is, sound pressures from the two control sound sources cancel each other out or acoustic energies from the two control sound sources are minimized, and only the coming sound pressure from the main sound source is left) in the non-listening area. This control is implemented by calculating control filters which meet that state.

Calculations of the control filters use the listening area sound increase factor n and Spatial transmission characteristics from respective speakers to some sample points of respective areas.

This embodiment will exemplify a case in which the listening area sound increase factor n and Spatial transmission characteristics are externally input.

The Spatial transmission characteristic input unit 2 inputs Spatial transmission characteristics from the speakers 91 to 93 to the listening area and those from the control sound source speakers 92 and 93 to the non-listening area (the Spatial transmission characteristics from the main sound source speaker 91 to the non-listening area need not be included).

Figure 2:
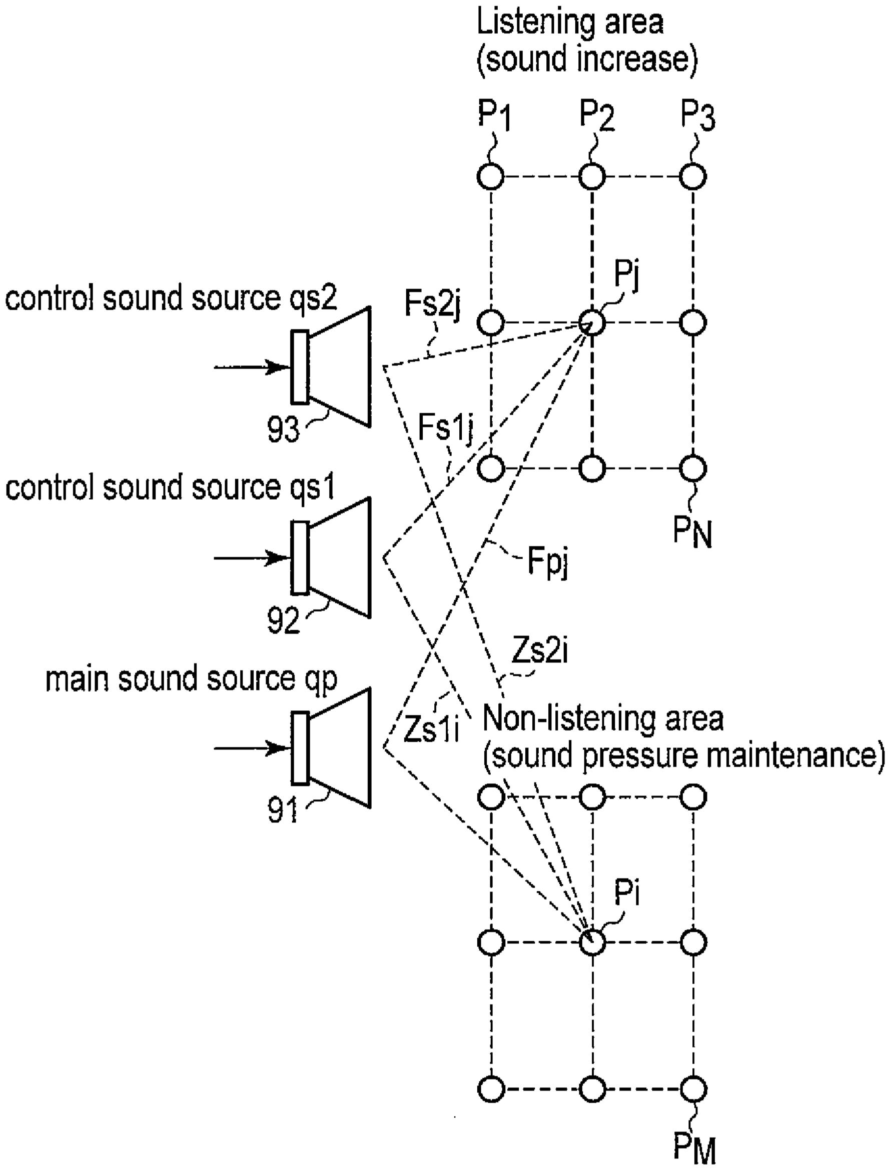
FIG. 2 is a view for explaining Spatial transmission characteristics from speakers to evaluation points of respective areas.

Assume that in this embodiment, as shown in, for example, FIG. 2, N evaluation points are set in the listening area in which the sound increase control is to be executed, M evaluation points are set in the non-listening area in which sound pressure maintenance control is to be executed, and Spatial transmission characteristics (radiation impedances) from the respective speakers to the respective evaluation points are acquired in advance. In this case, let $P_i$ be a sound pressure at an evaluation point j in the listening area, $P_i$ be a sound pressure at an evaluation point i in the non-listening area, $F_{pj}$ be a radiation impedance from a main sound source $q_p$ to the evaluation point j in the listening area, $F_{s1j}$ be a radiation impedance from a first control sound source $q_{s1}$ to the evaluation point j in the listening area, $F_{s2j}$ be a radiation impedance from a second control sound source $q_{s2}$ to the evaluation point j in the listening area, $Z_{s1i}$ be a radiation impedance from the first control sound source $q_{s1}$ to the evaluation point i in the non-listening area, and $Z_{s2i}$ be a radiation impedance from the second control sound source $q_{s2}$ to the evaluation point i in the non-listening area. These Spatial transmission characteristics, which are acquired in advance, are input from the Spatial transmission characteristic input unit 2. Note that an example to be described below does not require any radiation impedance ($Z_{pj}$) from the main sound source $q_p$ to the evaluation point i in the non-listening area.

A listening area sound increase factor input unit 5 inputs the listening area sound increase factor n.

Various input methods of the listening area sound increase factor n are available. For example, the user may designate the listening area sound increase factor n by operating the apparatus main body or a remote controller, or using a versatile apparatus such as a PC or mobile phone. Alternatively, for example, the apparatus main body or remote controller may include a speech recognition function or image recognition function, and may use an input by means of a user's speech or action pattern.

Also, for example, as the listening area sound increase factor n, continuous values may be allowed to be input, or input discrete values may be accepted. Furthermore, an upper limit value of n that can be input may be set (note that a lower limit value of n may be 1 or a predetermined value larger than 1).

Furthermore, for example, ON/OFF of "sound increase control" of this embodiment and the listening area sound increase factor n may be independently input, or only the listening area sound increase factor n may be input (in the latter case, the sound increase control=OFF may be set when the listening area sound increase factor n=1, or the sound increase control may be executed while setting n=1).

For example, in order to allow an easy input, only an "sound increase control" ON/OFF button may be arranged (in this case, when the button is ON, a predetermined n value (for example, n=2 or n=3) is used). Alternatively, for example, an "sound increase control" ON/OFF button and one or a plurality of buttons used to designate a value selected from a plurality of n values (for example, one button used to select n=2 or n=3, or three buttons used to select n=1.5, 2, or 3) may be arranged.

The control filter calculation unit 3 calculates coefficients of the control filters 4 (that is, a coefficient Wp of the first control filter 41, a coefficient Ws1 of the second control filter 42, and a coefficient Ws2 of the third control filter 43) based on the input Spatial transmission characteristics, so as to increase sound pressure in the listening area and to maintain sound pressure in the non-listening area upon execution of the sound increase control. When the sound increase control is not to be performed, the control filter calculation unit 3 calculates the coefficients of the control filters so as to use only the main sound source. The coefficient of each control filter may be a complex number or a pair of a gain and phase.

The first, second, and third control filters 41, 42, and 43 respectively execute FIR computations using the coefficients Wp, Ws1, and Ws2 calculated by the control filter calculation unit 3.

The first, second, and third volume adjustment units 81, 82, and 83 respectively adjust the volumes of the main sound source, first control sound source, and second control sound source.

Note that although a detailed description will be given in the last part of the first embodiment, the amplifier allowable input voltage determination unit 6 determines whether or not output voltages associated with the control sound sources of the control filters 4 are equal to or lower than an amplifier allowable input voltage, and when it is determined that the output voltages exceed the amplifier allowable input voltage, the sound increase factor change unit 7 adjusts the sound increase factor n, an amplitude of the main sound source, or both of them so that the output voltages become equal to or lower than the amplifier allowable input voltage.

Meanwhile, FIG. 1 may include a function of allowing the user to adjust the amplitude of the main sound source (the original volume of the main sound source when the sound increase control is OFF) (that is, a normal volume function). This function is the same as the conventional one, and an illustration and description thereof will not be given.

Using the normal volume function and the sound increase control function of this embodiment together, when the user wants to increase a volume (sound pressure) in the listening area, he or she can select one of several methods. In method A, sound is increased using the sound increase control of this embodiment without changing a volume. In method B, the sound increase control of this embodiment is effected while increasing a volume. In method C, a volume is increased without effecting the sound increase control of this embodiment. The user can select one of these methods to be used as needed. In this case, when sound pressure in the listening area remains the same, sound pressure difference appears in the non-listening area, that is, a lowest sound pressure (volume) is obtained in method A, and it is increased in turn in the order of methods B and C.

A calculation method of the control filters which implement sound increase in the listening area and sound pressure maintenance in the non-listening area will be described below.

A case will be examined below wherein N evaluation points are set in the listening area, M evaluation points are set in the non-listening area, sound pressure is increased in the listening area, and sound pressure is maintained in the non-listening area, as shown in FIG. 2.

Acoustic energies of the first and second control sound sources are minimized in the non-listening area, while an n-fold acoustic energy of the main sound source to that before control is achieved using the remaining total energy of the control sound sources and the acoustic energy of the main sound source in the listening area.

The non-listening area (sound pressure maintenance area) will be examined first.

Letting $P_i$ be a sound pressure at an evaluation point i in the non-listening area set at the side position of the speaker, we have:

$$P_i = Z_{S1i} q_{S1} + Z_{S2i} q_{S2} \tag{1}$$

In this case, radiation impedances $Z_{s1i}$ and $Z_{s2i}$ of the respective control sound sources having complex amplitudes $q_{s1}$ and $q_{s2}$ are respectively expressed by:

$$Z_{S1i} = \frac{\rho j \omega e^{-jkr_{s1i}}}{4\pi r_{s1i}},\ Z_{S2i} = \frac{\rho j \omega e^{-jkr_{s2i}}}{4\pi r_{s2i}} \tag{2}$$

where $r_{s1}$ is a distance from the first control sound source to the evaluation point i in the non-listening area, $r_{s2}$ is a distance from the second sound control source to the evaluation point i in the non-listening area, ρ is a density, ω is an angular velocity (ω=2πf, f: frequency), k is a wavenumber (k=ω/c, c: sonic velocity), and j is an imaginary unit.

In the non-listening area, an acoustic energy U, which is given to this sound field by the two control sound sources having complex amplitudes $q_{s1}$ and $q_{s2}$, is minimized so as to suppress interferences between the main sound source and control sound sources, thereby preventing sound from being reduced.

$$U = \sum_{j=1}^{N} (P_j \cdot P_j^*) \tag{3}$$

In consideration that $q_{s1}$ is a complex amplitude, it is given by:

$$q_{S1} = q_{S1}^{\ r} + j q_{S1}^{\ i} \tag{4}$$

Then, a relationship between $q_{s1}$ and $q_{s2}$ is calculated from:

$$\frac{\partial U}{\partial q_{S1}^r} = 0,\ \frac{\partial U}{\partial q_{S1}^i} = 0 \tag{5}$$

As a result, a real number part and imaginary number p0061rt of the complex amplitude are respectively given by:

$$q_{S1}^r = -\frac{\sum_{i=1}^{N} (Z_{S1i} \cdot Z_{S2i}^* \cdot q_{S2}^* + Z_{S1i}^* \cdot Z_{S2i} \cdot q_{S2})}{2\sum_{i=1}^{N} (Z_{S1i} \cdot Z_{S1i}^*)} \tag{6}$$

$$q_{S1}^i = -\frac{\sum_{i=1}^{N} (Z_{S1i} \cdot Z_{S2i}^* \cdot j \cdot q_{S2}^* - Z_{S1i}^* \cdot Z_{S2i} \cdot j \cdot q_{S2})}{2\sum_{i=1}^{N} (Z_{S1i} \cdot Z_{S1i}^*)} \tag{7}$$

Therefore, substitution of these equations into equation (4) yields:

$$\therefore q_{S1} = -\frac{\sum_{i=1}^{N}(Z_{S1i}^{*}\cdot Z_{S2i})}{\sum_{i=1}^{N}(Z_{S1i}\cdot Z_{S1i}^{*})}q_{S2} \tag{8}$$

In this case, for the purpose of simple calculations, equation (8) is rewritten like:

$$q_{S1} = \alpha\cdot q_{S2} \tag{9}$$

$$\text{for } \alpha = -\frac{\sum_{i=1}^{N}(Z_{S1i}^{*}\cdot Z_{S2i})}{\sum_{i=1}^{N}(Z_{S1i}\cdot Z_{S1i}^{*})}$$

The listening area (increase area) will be examined below.

In order to increase sound pressure at an evaluation point j in the listening area set in front of the speakers, a composite sound pressure of the main sound source and two control sound sources can be n (n>1) times of a coming sound pressure of only the main sound source. Therefore, we have:

$$F_{Pj}q_P + F_{S1j}\cdot q_{S1} + F_{S2j}\cdot q_{S2} = n\cdot F_{Pj}\cdot q_P \tag{10}$$

Substitution of equation (9) in equation (10) yields:

$$F_{Pj}q_P + (F_{S1j}\cdot\alpha + F_{S2j})\cdot q_{S2} = n\cdot F_{Pj}\cdot q_P \tag{11}$$

In this case, radiation impedances $F_{pj}$, $F_{s1j}$, and $F_{s2j}$ of the main sound source and control sound sources, which respectively have the complex amplitudes $q_p$, $q_{s1}$, and $q_{s2}$, are respectively expressed by:

$$F_{Pj} = \frac{\rho j\omega e^{-jkLPj}}{4\pi L_{Pj}},\ F_{S1j} = \frac{\rho j\omega e^{-jkL_{s1j}}}{4\pi L_{s1j}},\ F_{S2j} = \frac{\rho j\omega e^{-jkL_{S2j}}}{4\pi L_{s2j}} \tag{12}$$

where $L_{pj}$ is a distance from the main sound source to the evaluation point j in the listening area, $L_{s1i}$ is a distance from the first control sound source to the evaluation point j in the listening area, and $L_{s2j}$ is a distance from the second control sound source to the evaluation point j in the listening area.

Therefore, in order to satisfy equation (11), an acoustic energy Qj as a composite sound of the main sound source and the two control sound sources in this listening area can be minimized. This acoustic energy Qj is given by:

$$Q_j = (1-n)F_{Pj}q_P + (F_{s1j}\cdot\alpha\cdot F_{S2j})\cdot q_{S2} \tag{13}$$

For the purpose of simple calculations, equation (13) is rewritten like:

$$Q_j = (1-n)F_{Pj}q_P + \beta_j\cdot q_{S2} \tag{14}$$

for $\beta_j = F_{S1j}\cdot\alpha + F_{S2j}$

Then, letting U be the above acoustic energy, we have:

$$U = \sum_{j=1}^{N}(Q_j\cdot Q_j^{*}) \tag{15}$$

In consideration that $q_{s2}$ is a complex amplitude, it is given by:

$$q_{S2} = q_{S2}^{r} + jq_{S2}^{i} \tag{16}$$

Then, a relationship between $q_p$ and $q_{s2}$ is calculated from:

$$\frac{\partial U}{\partial q_{S2}^{r}} = 0,\ \frac{\partial U}{\partial q_{S2}^{i}} = 0 \tag{17}$$

As a result, a real number part and imaginary number part of the complex amplitude are respectively given by:

$$q_{S2}^{r} = -\frac{\sum_{j=1}^{M}((1-n)F_{Pj}\cdot\beta_j^{*}\cdot q_P + (1-n)F_{Pj}^{*}\cdot\beta_j^{*}\cdot q_P^{*})}{2\sum_{j=1}^{M}(\beta_j\cdot\beta_j^{*})} \tag{18}$$

$$q_{S2}^{i} = -\frac{\sum_{j=1}^{M}((1-n)F_{Pj}\cdot\beta_j^{*}\cdot(-j)\cdot q_P + (1-n)F_{Pj}^{*}\cdot\beta_j^{*}\cdot j\cdot q_P^{*})}{2\sum_{j=1}^{M}(\alpha_j\cdot\alpha_j^{*})} \tag{19}$$

Therefore, substitution of equations (18) and (19) into equation (16) yields an optimal complex amplitude of the control sound source with respect to the main sound source, so as to implement the listening area. This optimal complex amplitude is calculated like:

$$q_{S2} = -\frac{\sum_{j=1}^{M}((1-n)F_{Pj}\cdot\beta_j^{*})}{\sum_{j=1}^{M}(\beta_j\cdot\beta_j^{*})}\cdot q_P \tag{20}$$

$$\text{for } q_{S1} = \alpha\cdot q_{S2}$$

$$\alpha = -\frac{\sum_{i=1}^{N}(Z_{S1i}^{*}\cdot Z_{S2i})}{\sum_{i=1}^{N}(Z_{S1i}\cdot Z_{S1i}^{*})}$$

At this time, a control effect at an arbitrary spatial point X is as follows. A sound pressure before control is given by:

$$P(X)_{OFF} = Z_P(X)q_P \tag{21-1}$$

A sound pressure after control is given by:

$$\begin{aligned} P(X)_{ON} &= Z_P(X)\cdot q_P + Z_{S1}(X)\cdot q_{S1} + Z_{S2}(X)\cdot q_{S2} \\ &= Z_P(X)\cdot q_P + (Z_{S1}(X)\cdot\alpha + Z_{S2}(X))\cdot q_{S1} \\ &= Z_P(X)\cdot q_P + (Z_{S1}(X)\cdot\alpha + Z_{S2}(X))\cdot \left(-\frac{\sum_{j=1}^{M}((1-n)F_{Pj}\cdot\beta_j^{*})}{\sum_{j=1}^{M}(\beta_j\cdot\beta_j^{*})}\right)\cdot q_P \end{aligned} \tag{21-2}$$

for

-continued $$\therefore \alpha = -\frac{\sum_{i=1}^{N}(Z_{S1i}^{*}\cdot Z_{S2i})}{\sum_{i=1}^{N}(Z_{S1i}\cdot Z_{S1i}^{*})}$$

$$\beta_j = F_{S1j}\cdot\alpha + F_{S2j}$$

Therefore, a sound pressure level drop amount (dB) before and after control at the arbitrary point X is given by:

$$\eta = 20\log\left|\frac{P(X)_{ON}}{P(X)_{OFF}}\right| = 20\log\left|1-(Z_{S1}(X)\cdot\alpha+Z_{S2}(X))\cdot\left(\frac{\sum_{j=1}^{M}((1-n)F_{Pj}\cdot\beta_j^{*})}{\sum_{j=1}^{M}(\beta_j\cdot\beta_j^{*})}\right)\cdot\frac{1}{Z_P(X)}\right|^{(dB)} \quad (22)$$

In this case, a sound pressure ratio before and after control is given anew by:

$$\gamma = \left|1-(Z_{S1}(X)\cdot\alpha+Z_{S2}(X))\cdot\left(\frac{\sum_{j=1}^{M}\left(\frac{(1-n)F_{Pj}\cdot}{(F_{S1j}\cdot\alpha+F_{S2j})^{*}}\right)}{\sum_{j=1}^{M}\left(\frac{(F_{S1j}\cdot\alpha+F_{S2j})F_{Pj}\cdot}{(F_{S1j}\cdot\alpha+F_{S2j})^{*}}\right)}\right)\cdot\frac{1}{Z_P(X)}\right| \quad (23)$$

$$\text{for } \therefore \alpha = -\frac{\sum_{j=1}^{N}(Z_{S1i}^{*}\cdot Z_{S2i})}{\sum_{j=1}^{N}(Z_{S1i}\cdot Z_{S1i}^{*})}$$

Since the evaluation points (M=9) in the non-listening area are not in opposite phase at a target low frequency (to 500 Hz), if M=1 and N=1 to explain an outline, equation (23) is rewritten as:

$$\gamma = \left|1-(Z_{S1}(X)\cdot\alpha+Z_{S2}(X))\cdot\left(\frac{(1-n)F_{Pj}\cdot}{F_{S1j}\cdot\alpha+F_{S2j}}\right)\cdot\frac{1}{Z_P(X)}\right| = \left|1-(Z_{S1}(X)\cdot\alpha+Z_{S2}(X))\cdot\left(\frac{(1-n)F_{Pj}\cdot}{F_{S1j}\cdot\left(-\frac{Z_{S2}}{Z_{S1}}\right)+F_{S2j}}\right)\cdot\frac{1}{Z_P(X)}\right| \quad (24)$$

A sound pressure at the evaluation point (one point) in the non-listening area satisfies relations given by:

$$Z_P(X)=Z_P \quad (25\text{-}1)$$

$$Z_{S1}(X)=Z_{S1} \quad (25\text{-}2)$$

$$Z_{S2}(X)=Z_{S2} \quad (25\text{-}3)$$

Hence, it can be confirmed that no sound pressure change occurs even after control, since equation (24) is rewritten by:

$$\gamma = \left|1-\left(Z_{S1}(X)\cdot\left(-\frac{Z_{S2}}{Z_{S1}}\right)+Z_{S2}(X)\right)\cdot\left(\frac{(1-n)F_P\cdot}{F_{S1}\cdot\left(-\frac{Z_{S2}}{Z_{S1}}\right)+F_{S2}}\right)\cdot\frac{1}{Z_P(X)}\right| = \left|1-\left(Z_{S1}\cdot\left(-\frac{Z_{S2}}{Z_{S1}}\right)+Z_{S2}\right)\cdot\left(\frac{(1-n)F_P\cdot}{F_{S1j}\cdot\left(-\frac{Z_{S2}}{Z_{S1}}\right)+F_{S2}}\right)\cdot\frac{1}{Z_P}\right| = \left|1-(0)\cdot\left(\frac{(1-n)F_P\cdot}{F_{S1}\cdot\left(-\frac{Z_{S2}}{Z_{S1}}\right)+F_{S2}}\right)\cdot\frac{1}{Z_P}\right| = 1 \quad (26)$$

On the other hand, in the case of the listening area, a sound pressure satisfies relations given by:

$$Z_P(X)=F_P \quad (27\text{-}1)$$

$$Z_{S1}(X)=F_{S1} \quad (27\text{-}2)$$

$$Z_{S2}(X)=F_{S2} \quad (27\text{-}3)$$

Hence, it can be confirmed that a sound pressure after control becomes n times that of the main sound source before control, since equation (24) is rewritten by:

$$\gamma = \left|1-\left(F_{S1}\cdot\left(-\frac{Z_{S2}}{Z_{S1}}\right)+F_{S2}\right)\cdot\left(\frac{(1-n)F_P\cdot}{F_{S1}\cdot\left(-\frac{Z_{S2}}{Z_{S1}}\right)+F_{S2}}\right)\cdot\frac{1}{F_P}\right| = |1-(1-n)| = n \quad (28)$$

With the above derivation processes, optimal complex amplitudes of the control sound sources with respect to the main sound source so as to attain both sound increase and sound pressure maintenance are described anew as:

$$q_{S2} = -\frac{\sum_{j=1}^{M}((1-n)F_{Pj}\cdot\beta_j^{*})}{\sum_{j=1}^{M}(\beta_j\cdot\beta_j^{*})}\cdot q_P \quad (29)$$

$$\text{for } \beta_j = F_{S1j}\cdot\alpha + F_{S2j}$$

$$q_{S1} = \alpha + q_{S2} \quad (30)$$

$$\text{for } \alpha = -\frac{\sum_{i=1}^{N}(Z_{S1i}^{*}\cdot Z_{S2i})}{\sum_{i=1}^{N}(Z_{S1i}\cdot Z_{S1i}^{*})}$$

Then, to have a complex amplitude of the main sound source as criterion 1 (Wp=1), the first and second control sound sources with respect to it are respectively given by:

$$Q_{S2} = -\frac{\sum_{j=1}^{M}((1-n)F_{Pj}\cdot\beta_j^{*})}{\sum_{j=1}^{M}(\beta_j\cdot\beta_j^{*})}\cdot q_P \quad (31)$$

$$\text{for } \beta_j = F_{S1j}\cdot\alpha + F_{S2j}$$

-continued $$Q_{S1} = -\alpha \frac{\sum_{j=1}^{M} ((1-n)F_{Pj} \cdot \beta_j^*)}{\sum_{j=1}^{M} (\beta_j \cdot \beta_j^*)} \tag{32}$$

$$\text{for } \alpha = -\frac{\sum_{i=1}^{N} (Z_{S1i}^* \cdot Z_{S2i})}{\sum_{i=1}^{N} (Z_{S1i} \cdot Z_{S1i}^*)} \quad \beta_j = F_{S1j} \cdot \alpha + F_{S2j}$$

Therefore, control filters of a time domain obtained by computing their inverse Fourier transforms correspond to the first control filter (Wp) 41, second control filter (Ws1) 42, and third control filter (Ws2) 43 of the control filters 4 in the arrangement example shown in FIG. 1, which are respectively given by:

$$W_P = 1 \tag{33}$$

$$W_{S1} = ifft(Q_{S1}) \tag{34}$$

$$W_{S2} = ifft(Q_{S2}) \tag{35}$$

In this case, the control effects were verified using equations (31) and (32) to have the complex amplitude of the main sound source as criterion 1 (Wp=1).

Figure 3A:
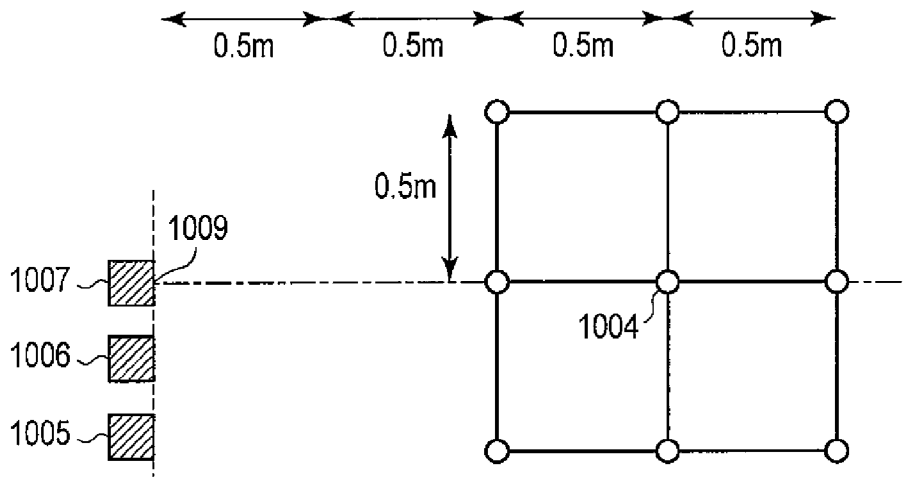
FIGS. 3A and 3B schematically show evaluation points to verify a sound increase control effect of the embodiment.
Figure 3B:
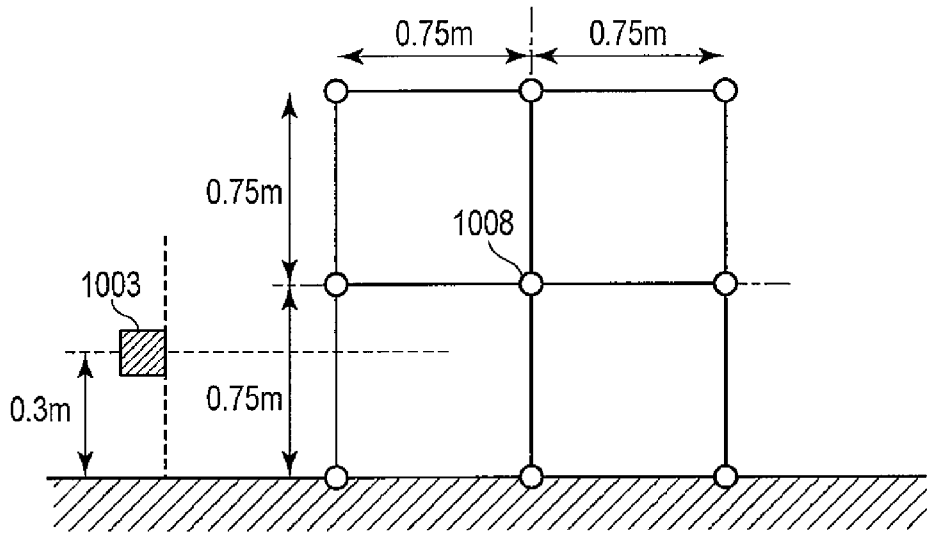

FIG. 3A shows a relationship between the three speakers and the evaluation points in the listening area, and FIG. 3B shows a relationship between the three speakers and the evaluation points in the non-listening area. FIG. 3A is a top view of a layout, and FIG. 3B is a side view of the layout. In a verification example, each speaker was laid out at a height of 0.3 m (see 1003 in FIG. 3B), as shown in FIG. 3B, and the main sound source speaker (see 1005 in FIG. 3A) and two control sound source speakers (see 1006 and 1007 in FIG. 3B) were laid out, as shown in FIG. 3A. An area in front of the speakers was set as the listening area, and nine discrete evaluation points were set at a position (see 1004 in FIG. 3A) separated by 1.5 m and on a square of 1 m×1 m having that position as a center (the height of each evaluation point was 0.3 m which was the same as that of each speaker), as shown in FIG. 3A. On the other hand, an area outside the listening area in front of the speakers was set as the non-listening area, and nine discrete evaluation points were set on a square having a height of 1.5 m and a width of 1.5 m and its center (see 1008 in FIG. 3B), as shown in FIG. 3B. As can be seen from FIG. 3, the nine discrete evaluation points were laid out to be parallel to an evaluation plane in the listening area, and were laid out to be perpendicular to the evaluation plane in the non-listening area. Note that the evaluation point 1008 in FIG. 3B is located at a position separated by 1.25 m in the right direction in FIG. 3A and by 2.5 m in the down direction in FIG. 3A with reference to the position 1009 in FIG. 3A.

Figure 4C:
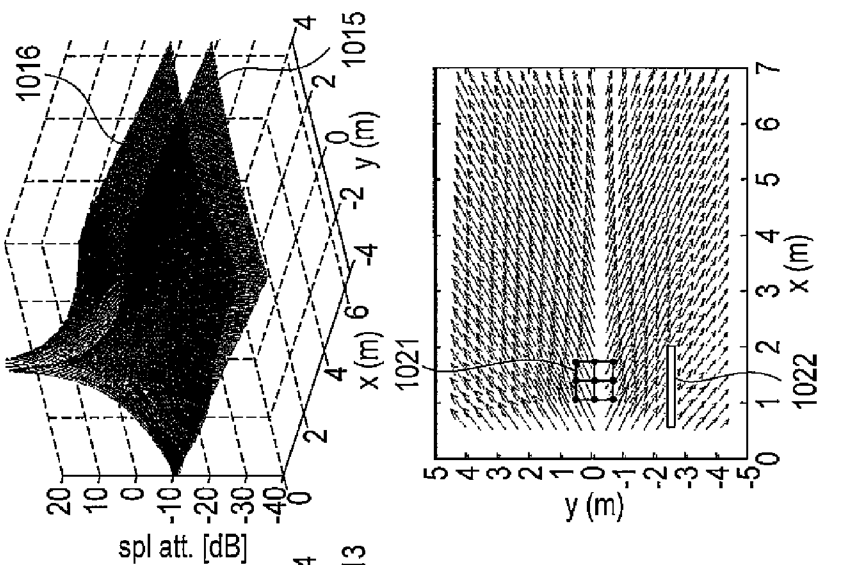
FIGS. 4A, 4B and 4C show graphs showing calculation result examples to verify the sound increase control effect of the embodiment.
Figure 4B:
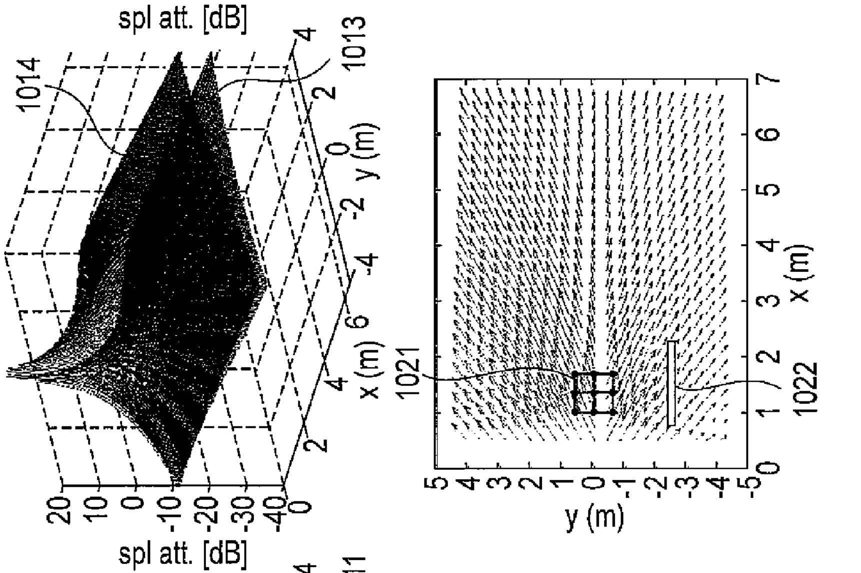
Figure 4A:
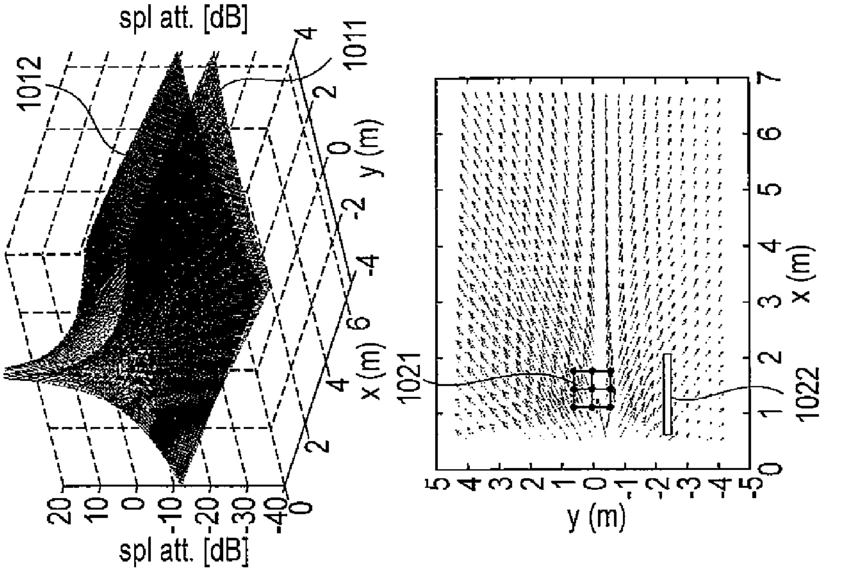

FIGS. 4A-4C show calculation results when a sound increase amount of the front listening area is set to be 20 dB (that is, sound pressure is increased by 20 dB compared to that before the sound increase control) (to a coming sound pressure from the main sound source: n=10). In FIGS. 4A-4C, reference numerals 1011, 1013, and 1015 denote calculation results before control; and 1012, 1014, and 1016, those after control. Also, in FIGS. 4A-4C, reference numeral 1021 denotes the nine evaluation points in the listening area; and 1022, those in the non-listening area. In FIGS. 4A-4C, in each upper graph, a position which gives a maximum value corresponds to a speaker installation position, and in each lower graph a left central position corresponds to a speaker installation position.

As can be seen from FIGS. 4A-4C, at all of 250 Hz in FIG. 4A, 500 Hz in FIG. 4B, and 1000 Hz in FIG. 4C, sound pressure is maintained on a wall (1022) at the side position, while sound pressure is increased by 20 dB in the front area including the nine evaluation points (1021), and is increased nearly by 10 dB in its surrounding area.

Figure 5B:
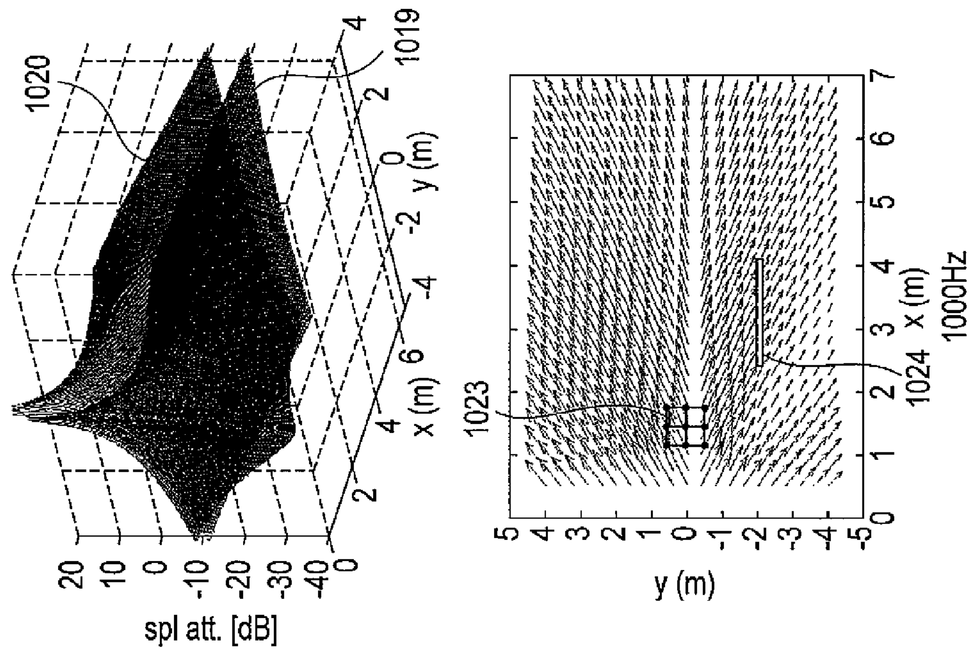
FIGS. 5A and 5B show graphs showing calculation result examples to verify the sound increase control effect of the embodiment.
Figure 5A:
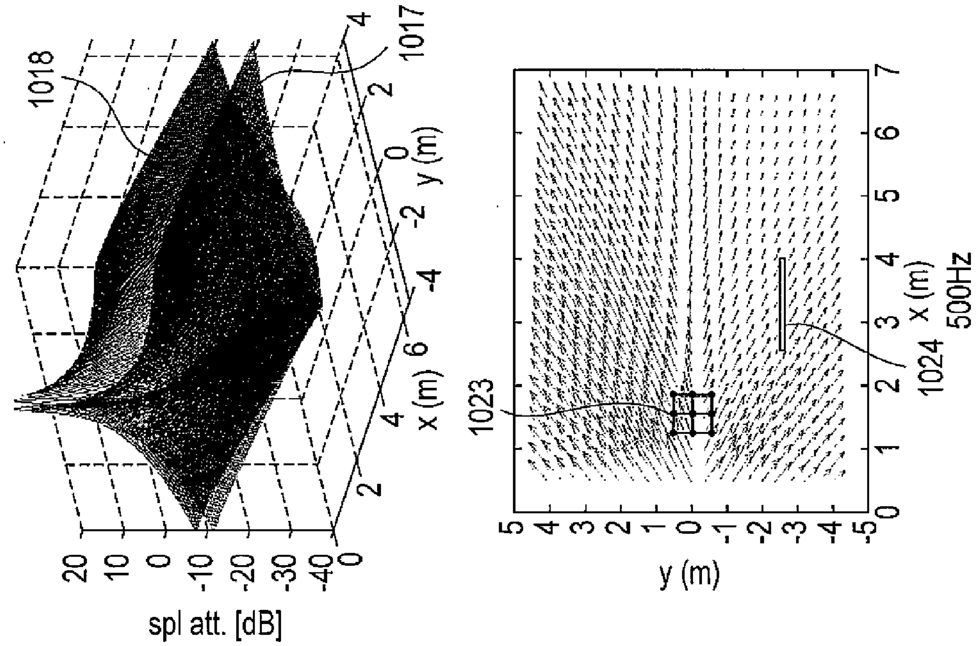

FIGS. 5A-5B show results when the position of the evaluation plane in the non-listening area at the side position is changed to that behind the position in FIGS. 4A-4C while the sound increase amount of the front listening area is set to be 20 dB (that is, sound pressure is increased by 20 dB compared to that before the sound increase control). In FIGS. 5A-5B, reference numerals 1017 and 1019 denote results before control; and 1018 and 1020, those after control. Also, in FIGS. 5A-5B, reference numeral 1023 denotes the nine evaluation points in the listening area; and 1024, those in the non-listening area. As can be seen from FIGS. 5A-5B, at both 500 Hz in FIG. 5A and 1000 Hz in FIG. 5B, even when the position of the evaluation plane is changed backward, the sound increase control functions satisfactorily.

Figure 39:
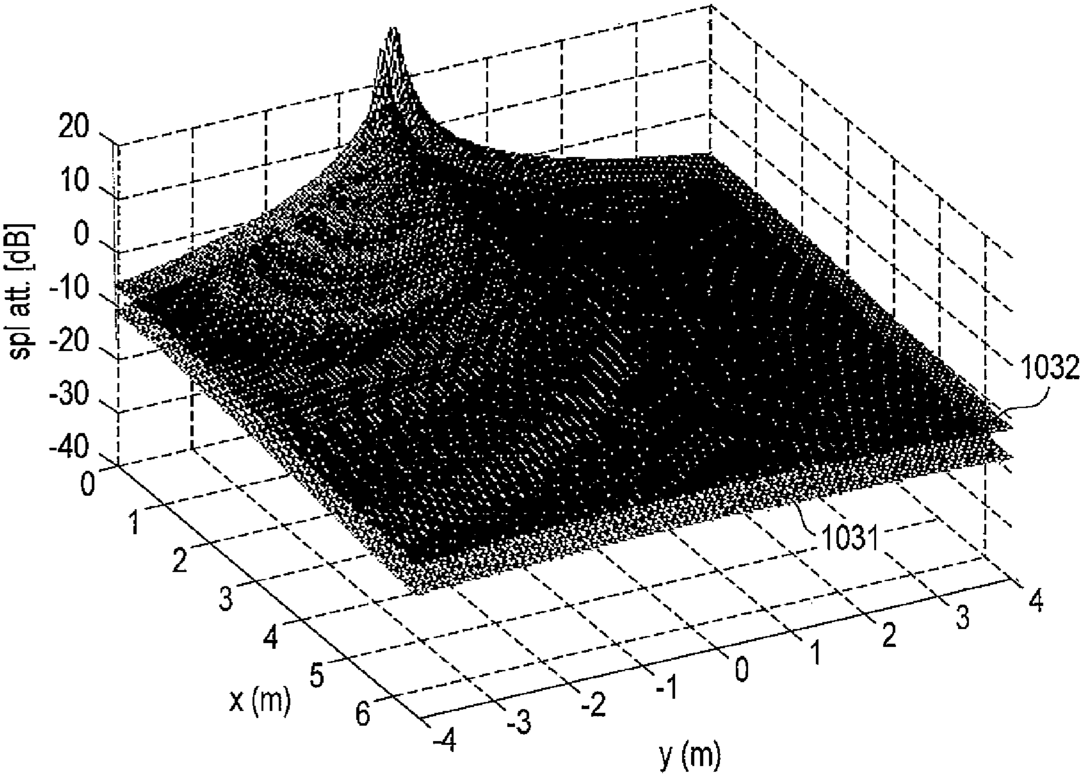
FIG. 39 is a graph for explaining a reason why the control according to the related art cannot target at bass tones.

As for an increase mode in the listening area, a technique such as a sound spot which superposes sound images using a time delay is well known. The principle of this technique corresponds to a mechanism for time-delaying, by only path differences, such that both amplitudes and phases of all of coming sound pressures from respective sound sources are matched at the front sound increase evaluation point. Therefore, since the complex amplitude relationship of the respective control sound sources to simultaneously maintain sound pressure at the side position is not specified, when sound pressure of the sound increase evaluation point is increased (250 Hz) under the same condition, sound pressure is unwantedly increased over the entire area as well as the side area, as indicated by the calculation results shown in FIG. 39 (in FIG. 39, reference numeral 1031 denotes a result before control; and 1032, that after control). In a treble band with short wavelengths, the above technique can increase sound pressure only in the vicinity of evaluation points while maintaining sound pressure in a surrounding area. However, this technique is not suited to a bass band of 500 Hz or lower, in which wavelengths are long and the sound insulating performance of a wall hardly has any effect. From this comparison, this embodiment can be positioned as sound increase control significant for bass tones.

Differences between the sound increase control of this embodiment and the front increase/side maintenance control using the related art shown in FIG. 38 will be described below.

Figure 6A:
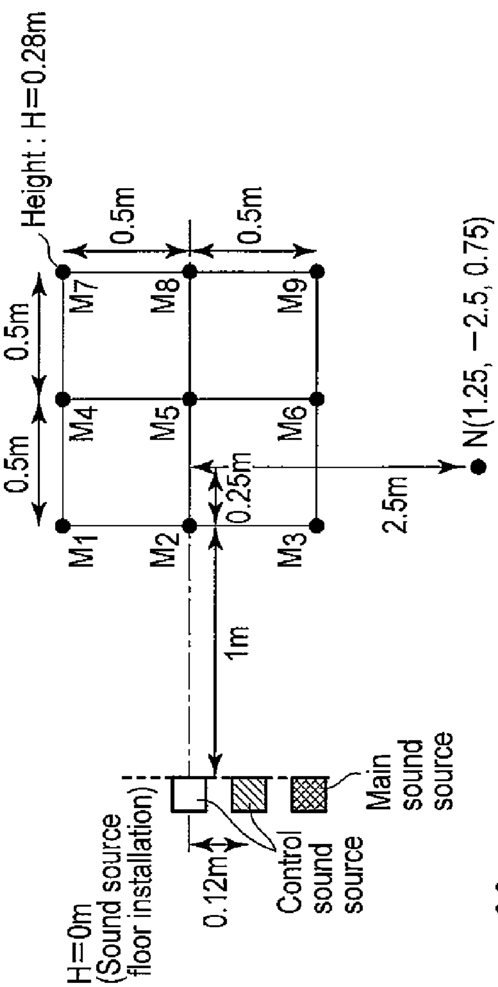
FIG. 6A schematically shows evaluation points to verify a sound increase control effect of the embodiment.
Figure 6B:
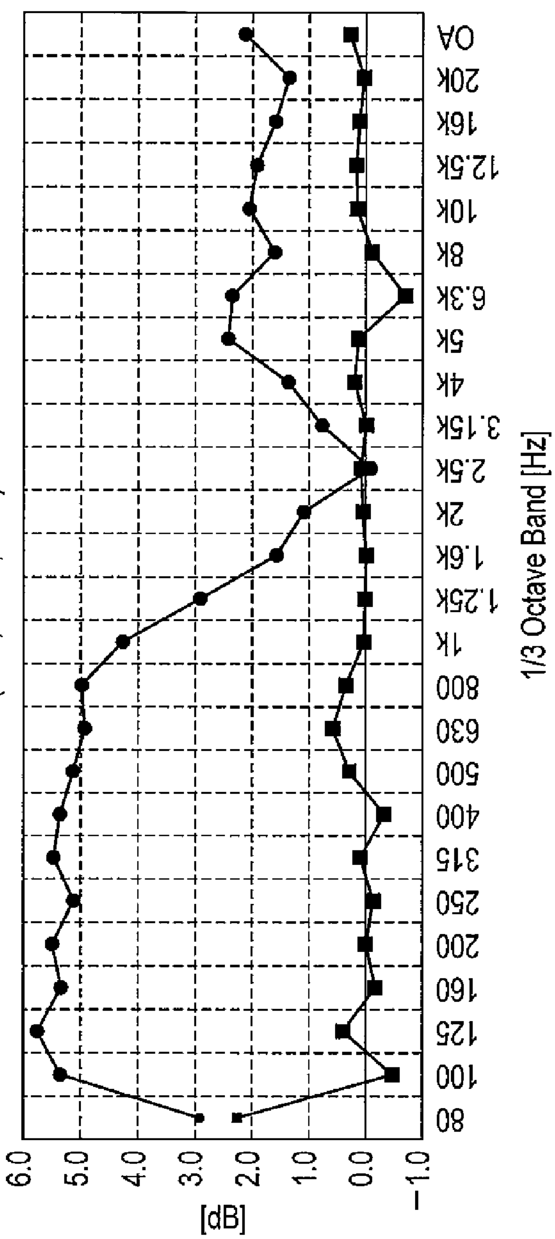
FIG. 6B shows test result examples to verify the sound increase control effect of the embodiment.

FIG. 6A shows a test system arrangement, which is carried out according to this embodiment, and FIG. 6B shows the test results. In FIG. 6B, circular plots correspond to the listening area, and rectangular plots correspond to the non-listening area. When the related art shown in FIG. 38 is used, the frequency characteristics become nonuniform. By contrast, according to the sound increase control of this embodiment, as indicated by the rectangular plots in FIG. 6B, the effect of the control is nearly uniform over a broad frequency band in the non-listening area at the side position even after control. Therefore, sound pressure can be maintained even in the surrounding area to be free from deterioration of sound quality. Also, according to the sound increase control of this embodiment, as indicated by the circular plots in FIG. 6B, sound is nearly uniformly increased in a bass band even in the front listening area. Note that sound is not increased in a treble band, and this is a theoretical limit. For example, when the user wants to listen to powerful AV sound, since the bass band is most important for the sense of reality, for example, a range of 2.5 kHz or higher may be excluded from the control range. Based on this result, a system, which targets at only bass tones for which a sound insulating effect of a wall is low, and can emphasize bass tones without regard to any sound leakage, can be provided.

Figure 7:
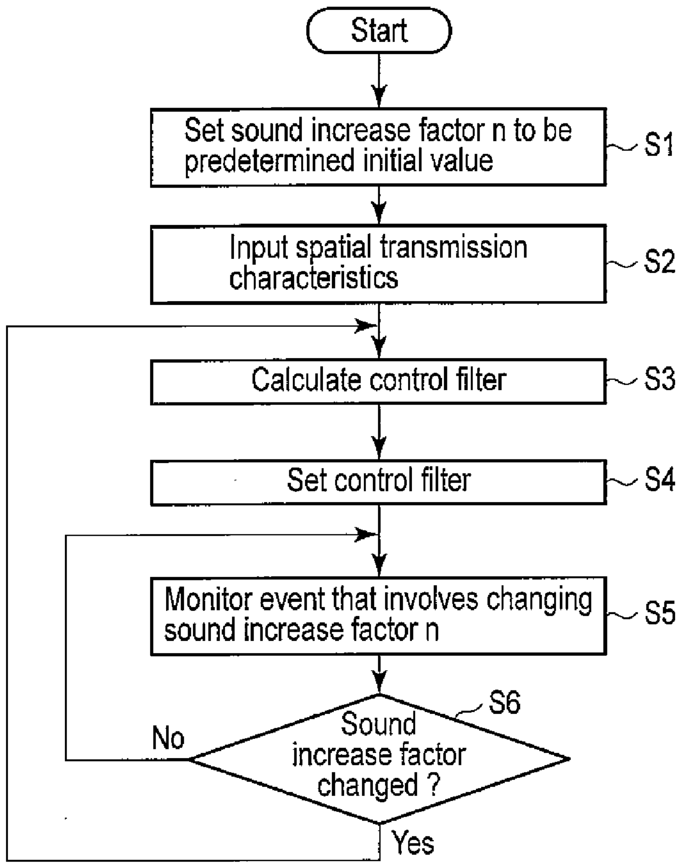
FIG. 7 is a flowchart showing an operation example of the sound field control apparatus.

FIG. 7 shows an operation example associated with the sound increase control of the sound field control apparatus of this embodiment.

Initially, the sound increase factor n is set to a predetermined initial value (step S1). The initial value may be a pre-set value (for example, n=2), or the sound increase factor n used at the latest use timing of the sound increase control in this sound field control apparatus may be set as the initial value, and various other methods are available.

Next, the Spatial transmission characteristics are input (step S2). Note that the Spatial transmission characteristics, which have been input once, may be maintained until different Spatial transmission characteristics are input later.

Then, the control filters are calculated based on the Spatial transmission characteristics and sound increase factor n (step S3).

The calculated values are set in the control filters (step S4).

After that, until an event for changing the control filters is generated, the states of the control filters are maintained. In this case, as this event, an event which involves changing the sound increase factor n will be considered.

It is monitored in step S5 whether or not an event which involves changing the sound increase factor n is occurred.

For example, when the user changes the sound increase factor n, that event is detected (step S6), and the process returns to step S3 to recalculate and re-set the control filters.

Note that this procedure is an example, and various variations are available as operations associated with the sound increase control of this embodiment.

Next, a control filter output voltage monitoring/adjustment function to prevent sound distortions and sound quality deterioration caused by excessive inputs to the speakers and amplifiers when the sound field control apparatus shown in FIG. 1 includes the amplifier allowable input voltage determination unit 6 and sound increase factor change unit 7 will be described below.

Figure 8:
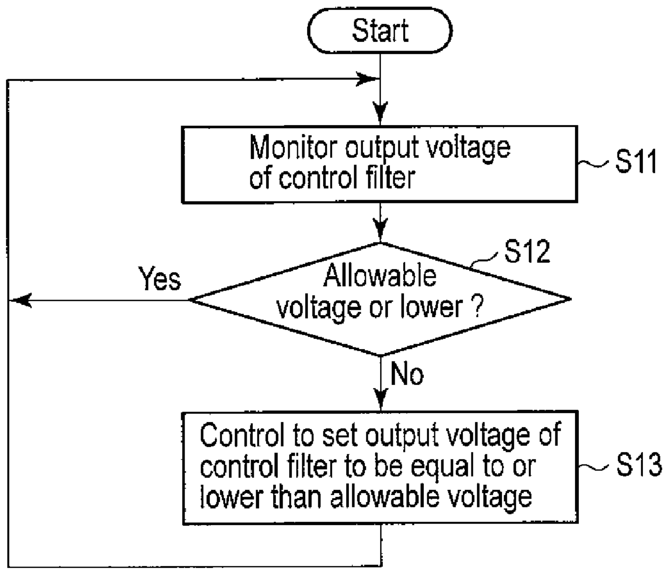
FIG. 8 is a flowchart showing an operation example associated with a control filter output voltage monitor/adjustment function of the sound field control apparatus.

FIG. 8 shows an operation example associated with this function.

The amplifier allowable input voltage determination unit 6 monitors whether or not the output voltages associated with the control sound sources of the control filters 4 are equal to or lower than an amplifier allowable input voltage (step S11). If it is determined that the output voltages exceed the amplifier allowable input voltage (step S12), the sound increase factor change unit 7 controls so that the output voltages become equal to or lower than the amplifier allowable input voltage (step S13).

Various kinds of control to be executed by the sound increase factor change unit 7 when the amplifier allowable input voltage determination unit 6 determines that the output voltages associated with the control sound sources of the control filters 4 exceed the amplifier allowable input voltage are available. Note that in the case of sound reduction control, a situation in which the amplifier allowable input voltage is exceeded is unlikely to occur according to its nature, and such control is unique to the sound increase control.

Two control examples executed when the output voltages are set to be equal to or lower than the amplifier allowable input voltage will be described below.

(1) A method of changing (reducing) the sound increase factor n (2) A method of reducing the amplitude of the main sound source control filter Wp used as a criterion The method of changing (reducing) the sound increase factor n (1) will be described first.

The relational expression between the two control sound sources, which is given by equation (30), is decided by only transfer characteristics Z from each control sound source to each evaluation point in the non-listening area, and is not related to the sound increase factor n. The relational expression between the second control sound source and the main sound source, which is given by equation (29), is related to the sound increase factor n. Especially, since this absolute value corresponds to the magnitude of the amplitude of the control sound source with respect to the main sound source, there is no theoretical upper limit of sound increase factor n. Therefore, the sound increase amount in the listening area can be increased without limit by increasing the amplitude of the control sound source with respect to the main sound source without limit. In other words, since there is a limit to increase the amplitude by interfering the main sound source and control sound source, an increase effect is attained by increasing the amplitude of the control sound source itself above the limit.

However, the amplifiers and speakers have input limits in practice, and an increase in amplitude of the control sound source causes generation of distortions due to excessive inputs. Since the distortions lead to sound quality deterioration, it is preferable to arrange an excessive input prevention function.

Coefficients calculated upon execution of the control filter calculations using the radiation impedances of the main sound source and control sound sources given by the mathematical expressions, that is, the input Spatial transmission characteristics, the input listening area sound increase factor n, and equations (31) to (35), are stored as fixed coefficients in the control filters 4 which make FIR computations. Then, an acoustic signal is filtered through these control filters 4, thus generating control signals which can attain both sound increase and sound pressure maintenance. In this process, since the amplifier allowable input voltage is given, whether or not the voltages of the control signals exceed the allowable value can be discriminated. Hence, if excessive inputs are determined, for example, the control filters are repetitively calculated while changing n, and an upper limit value of n which can make the voltages of the control signals to fall within the amplifier allowable input voltage is estimated. Note that an alert “too large listening area sound increase factor n” may be generated in this case. After the upper limit value is calculated, the control filters are fixed, and an acoustic signal is received, thus executing the control. In this way, the voltages fall within the amplifier allowable range, and appropriate control sound sources can be consequently generated from the speakers.

Note that as a variation of the method of inputting the listening area sound increase factor n, for example, a method of calculating back n from the amplifier input upper limit value, assigning n values to three levels, that is, small, middle, and large levels, and allowing the user to input or switch via a remote controller operation is also available.

In general, since a random sound source and M-sequence sound source, and acoustic signals such as music signals and speech signals are those which have a broad frequency band, even when overtone components due to excessive input distortions are generated, they are buried in the acoustic signal, and it is difficult to discriminate nonlinear distortion components.

Hence, an acoustic signal unit may generate periodic sound, which is filtered through the control filters to generate acoustic signals after control. Then, whether or not overtone components other than the periodic sound are generated may be confirmed in association with temporal waveforms of the acoustic signals, thus determining excessive inputs. Alternatively, the temporal waveforms may be further converted into signals of a frequency domain by FFT analysis, and whether or not overtone components other than the periodic sound are generated may be confirmed to attain excessive input determination. Note that this process has a merit of attaining determination without generating actual tones.

The method of reducing the amplitude of the main sound source control filter Wp as a criterion (2) will be described below.

Since the increase effect amount dulls when the sound increase factor n is reduced to avoid excessive input voltages, the method of reducing the amplitude of the first control filter (Wp) with respect to the main sound source speaker on the control filter calculation unit 3 in an operation after the excessive input determination can also be used. Since the second control filter (Ws1) and third control filter (Ws2) for the control sound source speakers depend on the amplitude of the first control filter (Wp), the acoustic signal s can fall within the allowable voltage range while maintaining a desired sound increase factor.

Although a reproduced volume is entirely lowered from that at the time of non-control, sound pressure difference between the listening area and non-listening area can be prominently attained.

The amplifier allowable input voltage determination unit 6 detects voltages of time-series acoustic signals, and reduces the sound increase factor n or the amplitude of the main sound source control filter (Wp) so that the voltages fall within the allowable input voltage range.

The allowable input voltage value is decided depending on specifications of the amplifiers (volume adjustment units) and/or speakers.

Note that the control processes (1) and (2) can be executed in combination.

As described above, according to this embodiment, sound can be increased in the listening area, and sound pressure can be maintained in the non-listening area. Also, nonuniform frequency characteristics when the related art is used can be improved. Then, for example, the user can enjoy TV/AV sound at full blast in the listening area without regard to any sound leakage to the surrounding area. Before and after the sound increase control, a listener in the listening area can directly experience the increase effect. For example, in the non-listening area, a user can enjoy TV/AV sound with a large volume of a level lower than the listening area, or a normal volume, or a volume lower than the normal volume, or he or she may not listen to any sound by muting sound.

Second Embodiment

The second embodiment will be described below.

Differences from the above embodiment will be mainly explained below.

Figure 9:
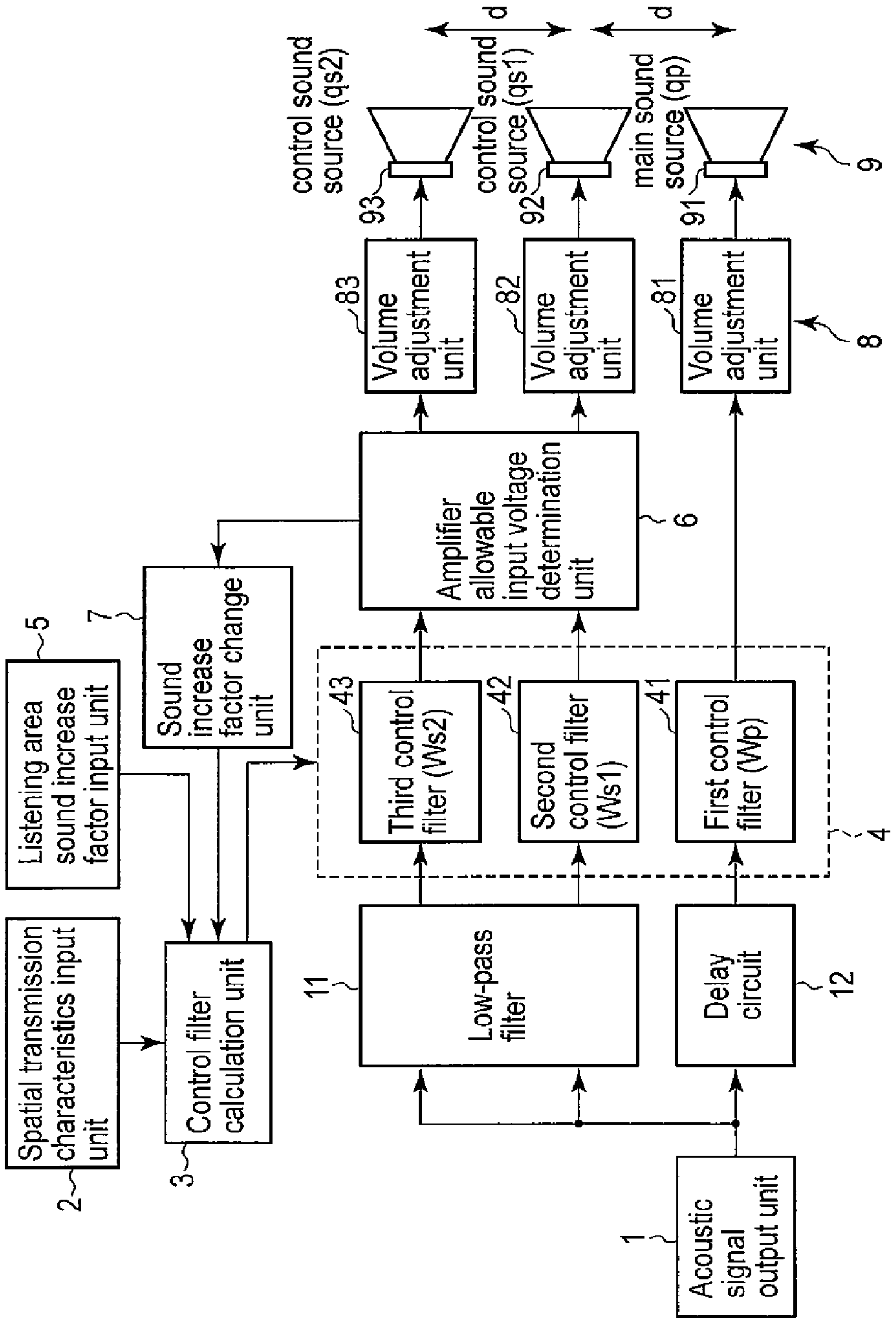
FIG. 9 is a block diagram showing an example of the arrangement of a sound field control apparatus according to a second embodiment.

FIG. 9 shows an arrangement example of a sound field control apparatus of this embodiment.

The arrangement example of FIG. 9 further includes a low-pass filter 11 and delay circuit 12 in addition to that of the sound field control apparatus of the first embodiment. Note that an arrangement which does not include the amplifier allowable voltage determination unit 6 and sound increase factor change unit 7 is also available as in the first embodiment.

As described in the first embodiment using the mathematical expressions, the amplitudes of the control sound sources are set to be larger than that of the main sound source, thereby attaining the increase effect. Therefore, under a layout condition in which the control sound sources are laid out to be separated from the main sound source, the user may feel that a sound image moves from the main sound source to the control sound sources since the amplitudes of the control sound sources are large after the control, and deterioration in terms of sound image localization may become obvious. Thus, it is preferable to obscure a sound image separation effect by integrally laying out the main sound source and control sound sources.

In this embodiment, upon integrally laying out the main sound source and control sound sources, a control upper limit frequency (=low-pass cutoff frequency) $f_d$ is considered (see FIG. 10). Letting d be a speaker interval, and c be sonic velocity, if ($d \leq c/2f_d$) is met, even when the amplitudes of the control sound sources are larger than the main sound source, the user can feel that the main sound source and control sound sources were an integrated sound source, and can experience the sound increase (especially, bass emphasis) effect without feeling any sound image movement.

In the sound field control apparatus of the first embodiment, the sound field control apparatus of this embodiment includes the low-pass filter 11 having the low-pass cutoff frequency $f_d$ after the acoustic signal output unit 1 and before the control filters 4 (in association with only acoustic signals related to the control sound sources, as shown in FIG. 9), and sets the two control sound source speakers to fall within the speaker interval d which meets ($d \leq c/2f_d$). For example, the main sound source speaker, first control sound source speaker, and second control sound source speaker may be laid out in this order in line to set the interval between the main sound source speaker and the first control sound source speaker to be d, and that between the first and second control sound source speakers to be d (see FIG. 9).

Note that the delay circuit 12 gives the same delay, which is given to acoustic signals given by the low-pass filter 11, to an acoustic signal associated with the main sound source.

When the main sound source speaker and two control sound source speakers, which are laid out at the interval d ($d \leq c/2f_d$), are applied to an image display apparatus such as a television, main sound source speakers 1051 may be laid out at the centers of two side frames of a bezel 1041 of an image display apparatus 1040, and first and second control sound source speakers 1052 and 1053 may be laid out above and below the speakers 1051 to be spaced by the interval d, as shown in, for example, FIG. 11A. Alternatively, the main sound source speakers 1051 may be laid out at the corners of the lower frame of the bezel 1041, and the first and second control sound source speakers 1052 and 1053 are laid out in line from them to be spaced by the interval d, as shown in, for example, FIG. 11B.

Third Embodiment

The third embodiment will be described below.

Differences from the embodiments described so far will be mainly explained.

In this embodiment, as for the layout of the main sound source speaker and two control sound source speakers in the second embodiment, in place of laying out the main sound source speaker, first control sound source speaker, and second control sound source speaker in line, these speakers are laid out in a triangular pattern, so that all these speaker intervals fall within a range of d. Thus, sound pressure in the front direction can be further enhanced.

Figure 12A:
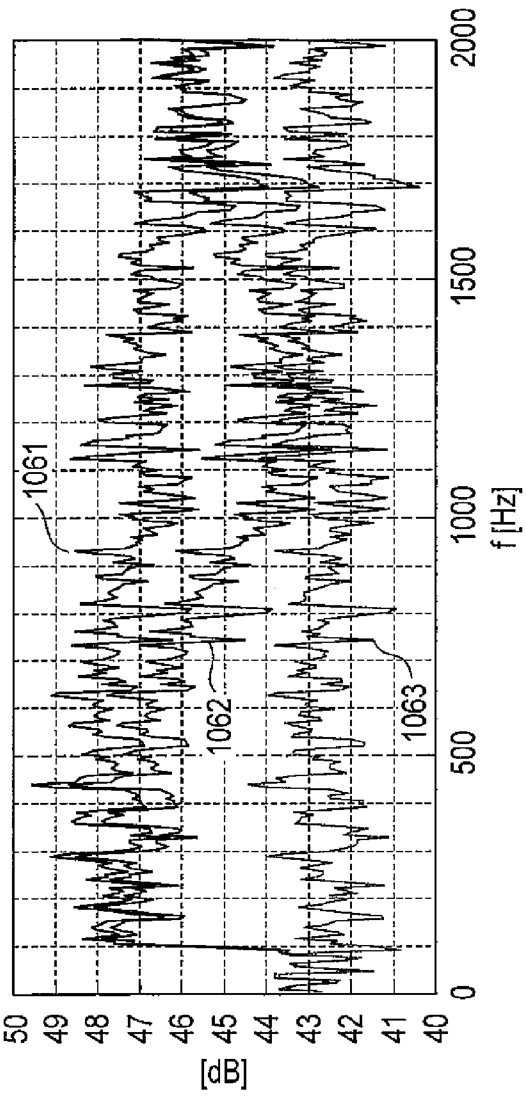
FIGS. 12A and 12B show graphs of calculation result examples to verify a sound increase control effect of a third embodiment.
Figure 12B:
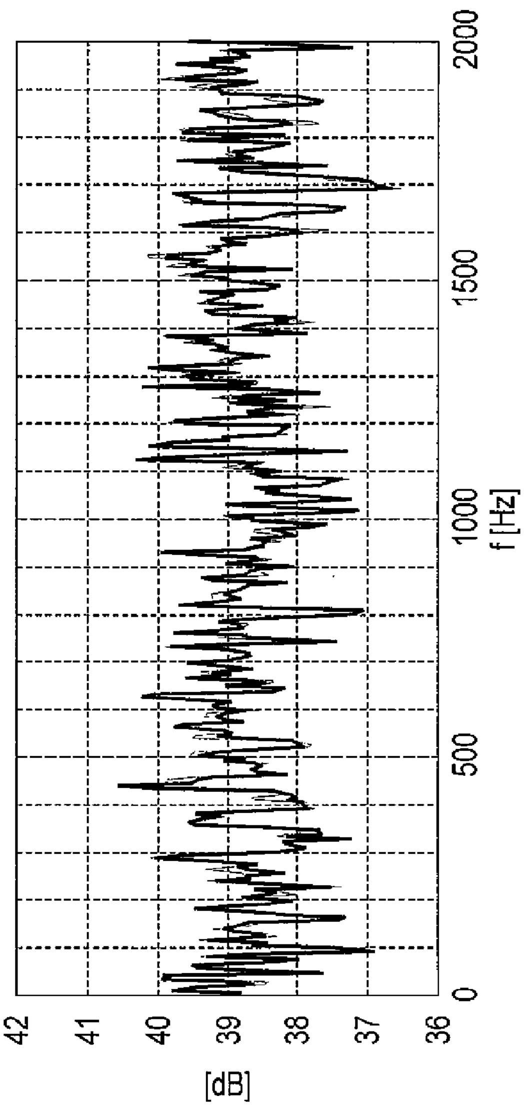

FIGS. 12A-12B show calculation results carried out according to this embodiment. FIG. 12A shows sound pressure characteristics at an evaluation point M5 (see FIG. 6) in the listening area when the speakers are arranged in a triangular layout (see 1061 in FIG. 12A), linear layout (see 1062 in FIG. 12A), and normal layout (see 1063 in FIG. 12A). FIG. 12B shows sound pressure characteristics at an evaluation point in the non-listening area when the speakers are arranged in a normal layout, linear layout, and triangular layout.

Note that as for the layouts in this case, in the layout view shown in FIG. 6A, the height of each evaluation point in the listening area is set at 1 m, and each evaluation point in the non-listening area is set at a position which is located on an extending line between evaluation points M5 and M6, and is separated by 1.8 m from M5.

In the linear layout, as shown in FIG. 13A, the three speakers are laid out in line, the interval d between the main sound source speaker and the first control sound source speaker is set to be 0.184 m, and that between the first and second control sound source speakers is set to be 0.184 m. Also, in the triangular layout, as shown in FIG. 13B, the main sound source speaker, first control sound source speaker, and second control sound source speaker are laid out at respective vertices of a regular triangle having one side of d 0.184 m (assuming that the coordinates of the main sound source speaker are (0, 0, 1), and those of the first control sound source speaker are (0.184, 0, 1), those of the second control sound source speaker are (0.092, 0, 1.1593)). Note that the normal layout is adopted when no sound increase control is made, that is, only the main sound source speaker is used.

When the main sound source speaker and two control sound source speakers, which are laid out at the interval d ($d \le c/2f_d$), are applied to an image display apparatus such as a television, main sound source speakers 1091 are laid out at corners of a bezel 1081 of an image display apparatus 1080, first and second control sound source speakers 1092 and 1093 are laid out on neighboring bezel frames, and the layout relationship among the three speakers forms a triangular pattern in which these speakers have the interval d from each other, as shown in, for example, FIGS. 14A-14B (FIG. 14A shows the overall outer appearance of the image display apparatus such as a television, and FIG. 14B shows details of a bezel corner portion). Note that in this case, both of the first and second control sound source speakers may be unequally laid out on the bezel frames (for example, these speakers may be laid out at positions where the centers of the speakers are deviated from those of the bezel frames).

Figure 15:
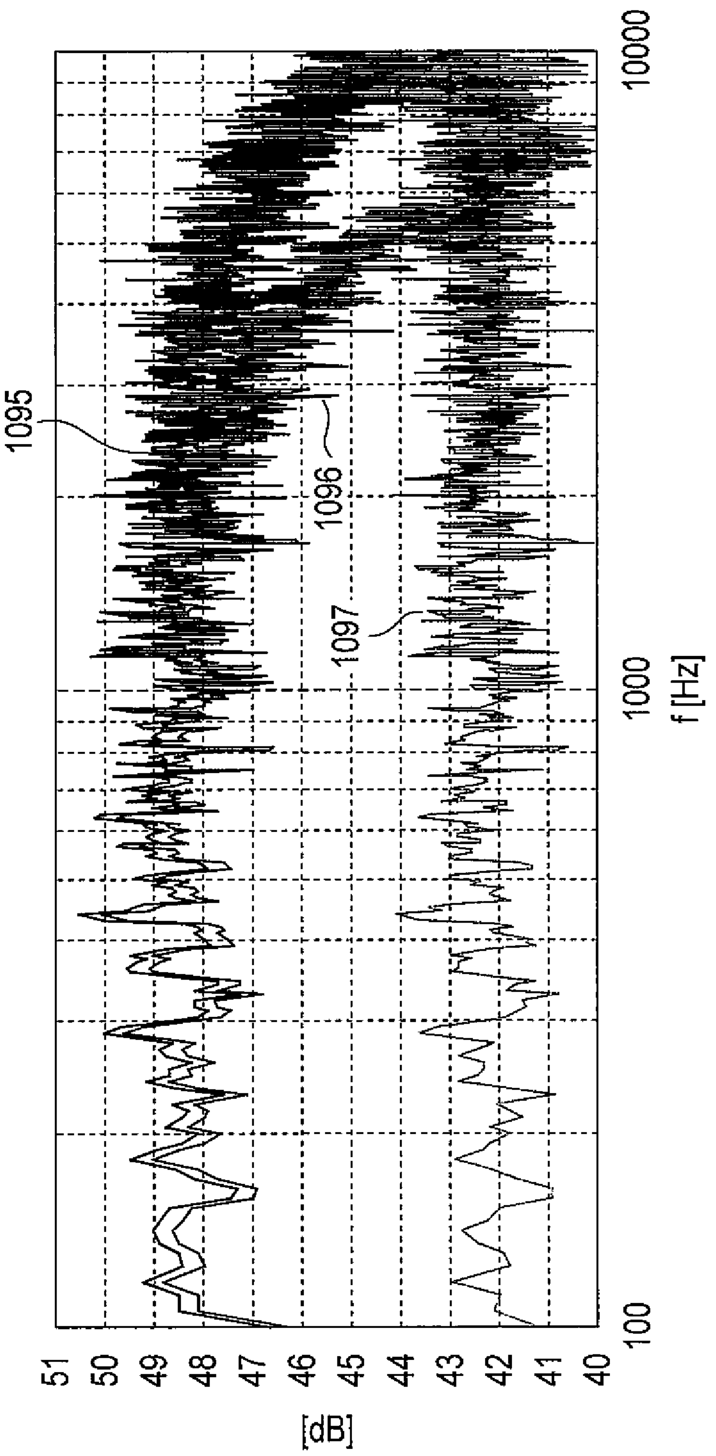
FIG. 15 is a graph showing calculation result examples to verify the sound increase control effect of the embodiment.

For example, FIG. 15 shows sound increase control effect calculation results using the same evaluation points as those in FIG. 6 for 42" class televisions having a width of 1.02 to which the speaker triangular layout shown in FIG. 14 and the speaker linear layout shown in FIG. 11A are respectively applied. In FIG. 15, reference numeral 1095 denotes a calculation result of the triangular layout; 1096, that of the linear layout; and 1097, that of the normal layout. Note that d=0.04 m in this case. In the triangular layout, the coordinates of the main sound source speaker are (−0.49, 0, 1), those of the first control sound source speaker are (−0.45, 0, 1), and those of the second control sound source speaker are (−0.47, 0, 1.0693). In the linear layout, the coordinates of the main sound source speaker are (−0.49, 0, 1), those of the first control sound source speaker are (−0.45, 0, 1), and those of the second control sound source speaker are (−0.41, 0, 1). Also, in the normal layout, only the main sound source speaker is used.

Referring to FIG. 15, in a frequency band of 2 kHz or lower, sound pressure difference between the triangular layout and linear layout is insignificant, but a sound increase amount difference tends to be increased with increasing frequency in a frequency band of 2 kHz or higher. As shown in FIG. 15, the triangular layout has a higher increase performance than the linear layout. In this layout, it is desirable to lay out the speakers in a regular triangle pattern to have nearly equal sound source intervals rather than a right-angled triangle pattern on the bezel. Hence, both of the first and second control sound source speakers are unequally laid out with respect to the bezel width.

Figure 16A:
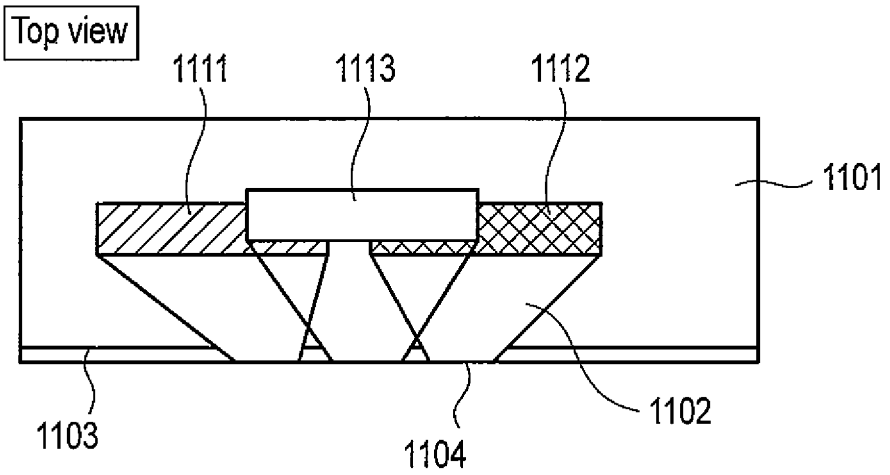
FIGS. 16A and 16B show a speaker layout example.
Figure 16B:
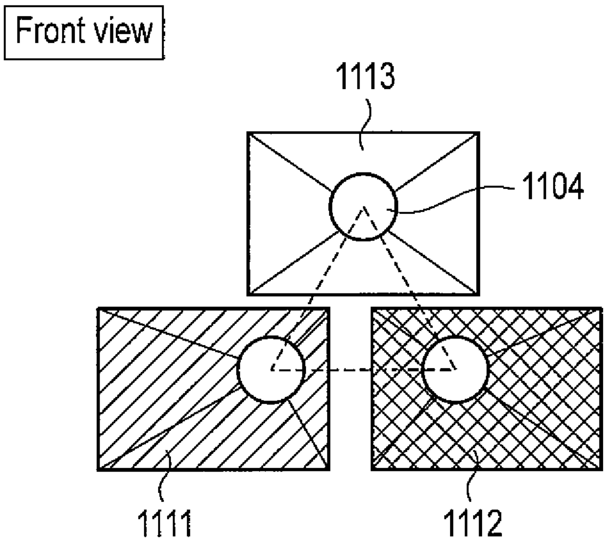

Meanwhile, when existing speakers are mounted intact, it may often be difficult to lay out the speakers in a triangular pattern to be spaced by the interval d which satisfies ($d \le c/2f_d$) depending on their dimensions and shapes. In such case, in place of laying out the speakers on the bezel surface, Main sound source speaker 1111, Control sound source speaker 1112 and Control sound source speaker 1113 may be laid out inside a TV housing 1101 of a television, ducts 1102 are attached to speaker front surface portions, and openings 1104, which define a triangular layout having the interval d, may be formed on the surface of a television bezel surface 1103, as shown in FIG. 16A. Then, the speakers 1111 to 1113 may be coupled to the openings 1104 in the triangular layout of the interval d via the ducts 1102, respectively, and outlets of these openings 1104 may be used as virtual sound sources, as shown in FIG. 16B, thus satisfying the triangular layout.

Fourth Embodiment

The fourth embodiment will be described below.

Differences from the embodiments described so far will be mainly explained.

Figure 17:
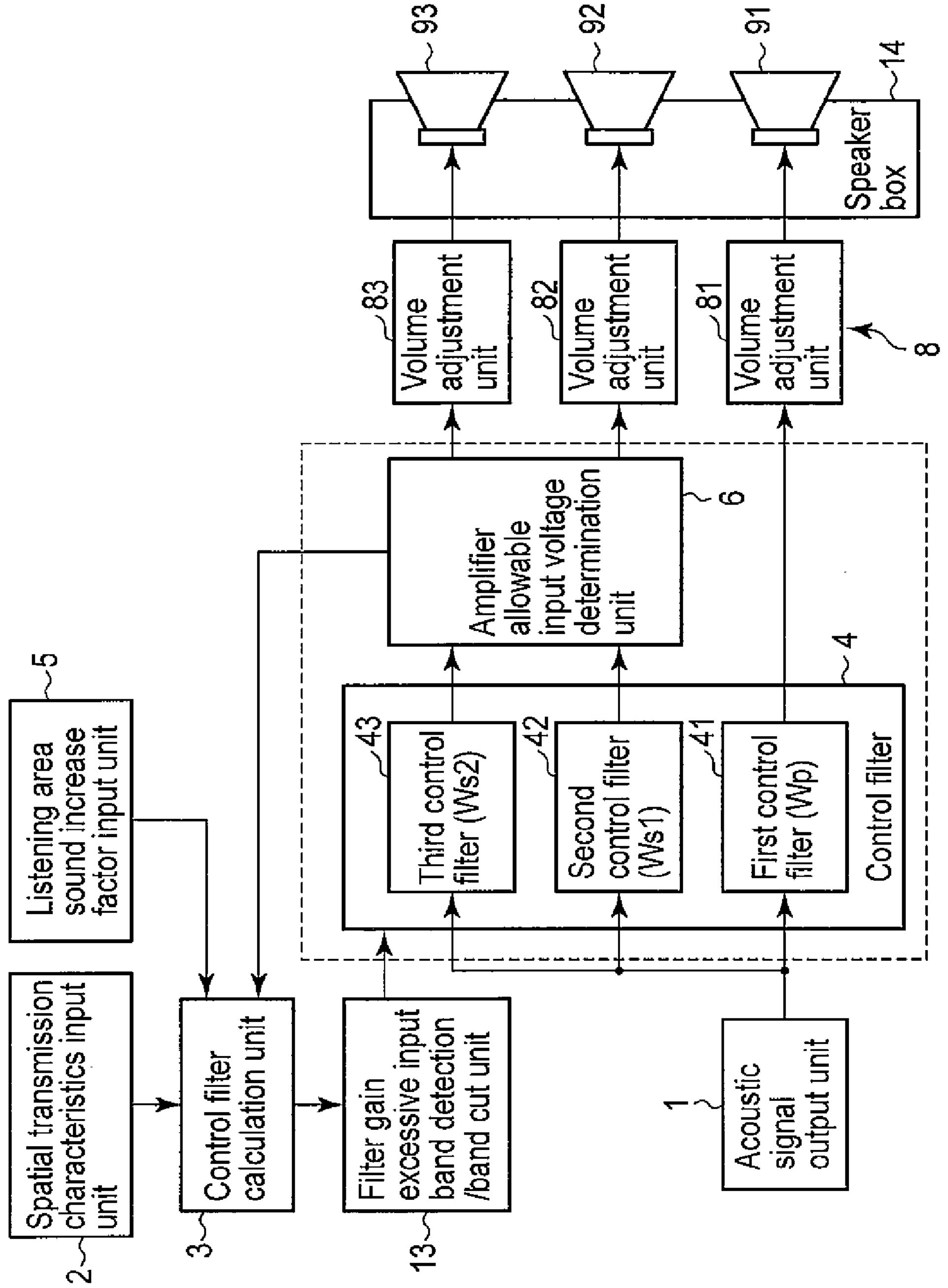
FIG. 17 is a block diagram showing an example of the arrangement of a sound field control apparatus according to a fourth embodiment.

FIG. 17 shows an arrangement example of a sound field control apparatus of this embodiment.

In the arrangement example shown in FIG. 17, the sound increase factor change unit 7 is excluded from the arrangement example of the sound field control apparatus of the first embodiment which includes the amplifier allowable input voltage determination unit 6 and sound increase factor change unit 7, and a filter gain excessive input band detection/band cut unit (signal adjustment unit) 13 is added. Note that an arrangement including the sound increase factor change unit 7 is also available, or that which excludes the amplifier allowable input voltage determination unit 6 and sound increase factor change unit 7 is also available.

Upon driving the control filters, due to the influences of f0 (lowest resonance frequencies) of the speakers 91 to 93 and/or low-order mode resonance of a speaker box housing 14 to which the speakers are attached, an excessive amplitude gain may be set in a low frequency band on the control filters. When sound waves are reproduced in this state intact, abnormal noise may be generated from the speakers or the speakers may be damaged.

Figure 18:
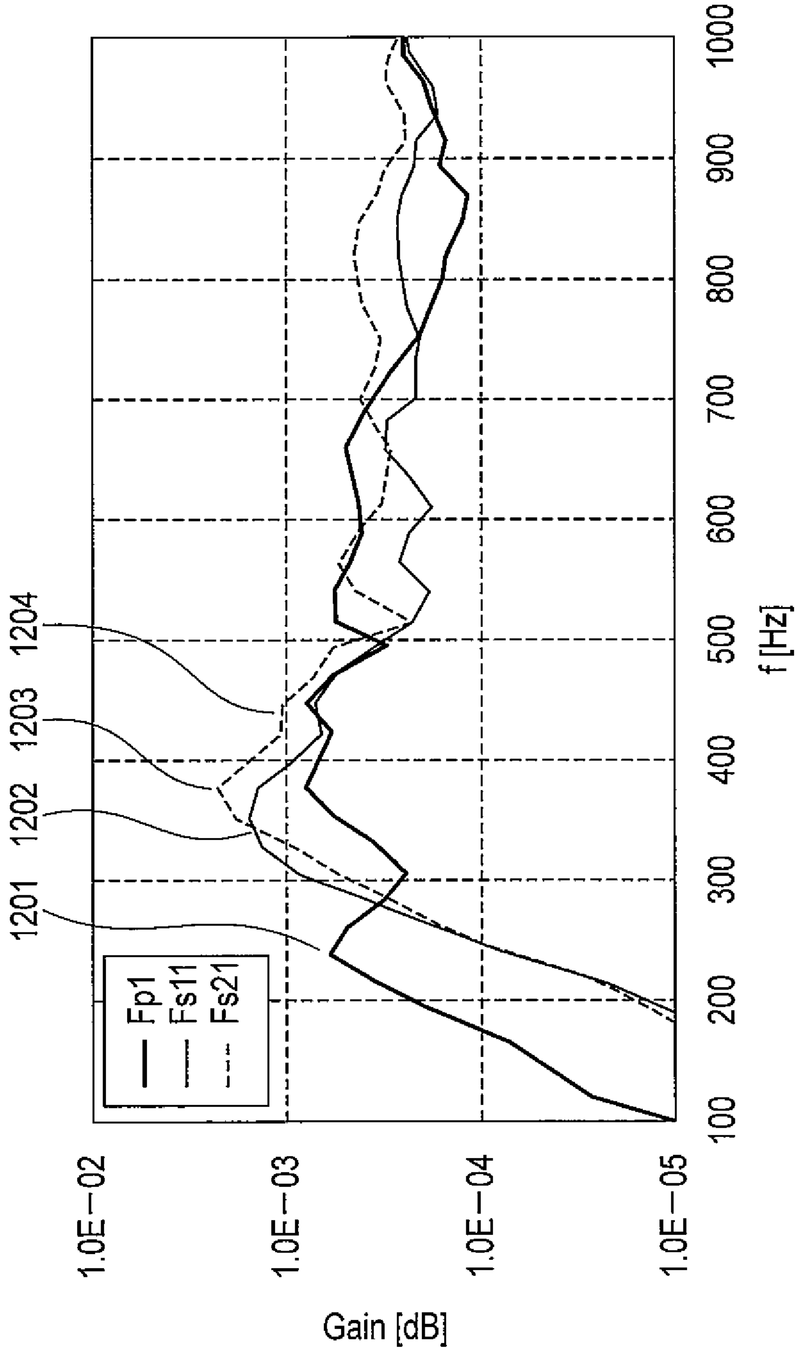
FIG. 18 is a graph for explaining resonance characteristics of respective speakers and a speaker box.
Figures 19A, 19B:
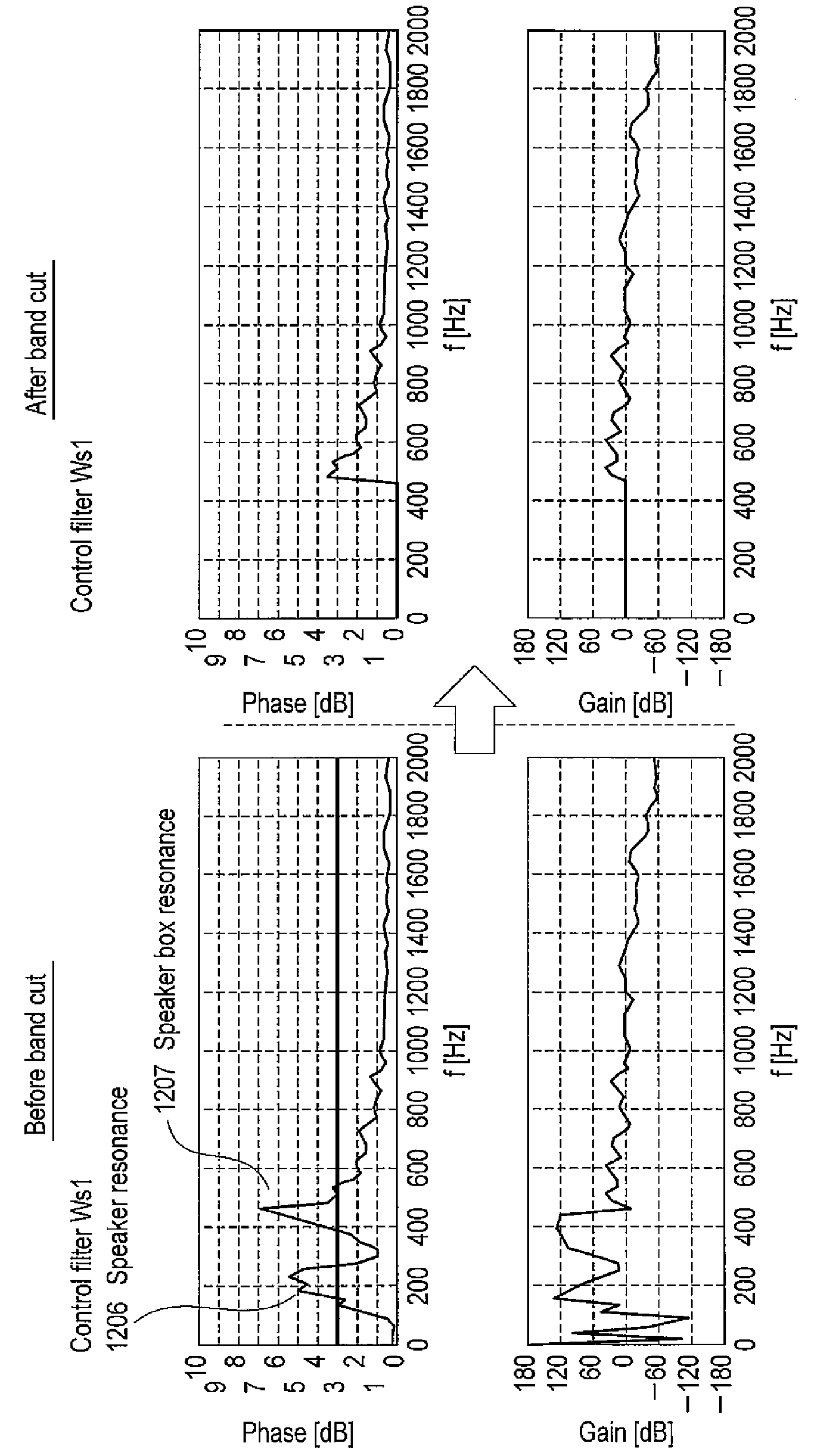
FIGS. 19A and 19B show graphs for explaining filter gain excessive input band detection/band cut effects of the embodiment.

FIG. 18 shows examples of the Spatial transmission characteristics from speakers to an arbitrary point in the actual speakers, and FIGS. 19A-19B show the gain characteristics (upper graph) and phase characteristics (lower graph) of the control filter Ws1 (FIG. 19A corresponds to characteristics before band cut, and FIG. 19B corresponds to those after band cut).

As shown in FIG. 18, the resonance frequency of the main sound source speaker (see 1201 in FIG. 18), that of the first control sound source speaker (see 1202 in FIG. 18), that of the second control sound source speaker (see 1203 in FIG. 18), and that of the speaker box (see 1204 in FIG. 18) are deviated from each other, and gain differences of these deviated frequencies directly lead to those of the control filters (see 1206 and 1207 in FIG. 19A). When speakers of different types are combined, since they have different f0 values, gains which result in speaker excessive inputs readily appear on the control filters. As described in the first embodiment as well, when the sound increase factor n is reduced so that the gain falls within an allowable range, the increase effect of the whole frequency band dulls. Hence, in this embodiment, a corresponding band is detected and cut by the filter gain excessive input band detection/band cut unit 13, as shown in, for example, FIG. 19B.

Since speakers have individual differences, a band of f0 or lower after calculations of the control filters is less wasteful than cutting of that band of the speaker specification by the Spatial transmission characteristic input unit 2 in terms of leaving a controllable band as much as possible. It is possible to move mode resonance of the box housing which mounts the speakers by volume segmentation of the interior of the box or to reduce it by an acoustic absorber process, but the mode resonance never disappears, and the influences often remain on the transfer function. Therefore, it is desirable to detect and cut the corresponding band.

The control filter calculation unit 3 calculates the control filters using the Spatial transmission characteristics (from the speakers to the listening area or non-listening area) in the frequency domain, and transforms the calculated control filters into those of the time domain by computing their inverse Fourier transforms. Hence, the filter gain excessive input band detection/band cut unit 13 is arranged between the control filter calculation unit 3 and control filters 4. Then, a filter amplitude threshold in the frequency domain is set, and the filter gain excessive input band detection/band cut unit 13 cuts a gain for a band which exceeds that threshold. The threshold is decided as needed depending on the specifications of the amplifiers (volume adjustment units) and/or speakers.

Figure 20A:
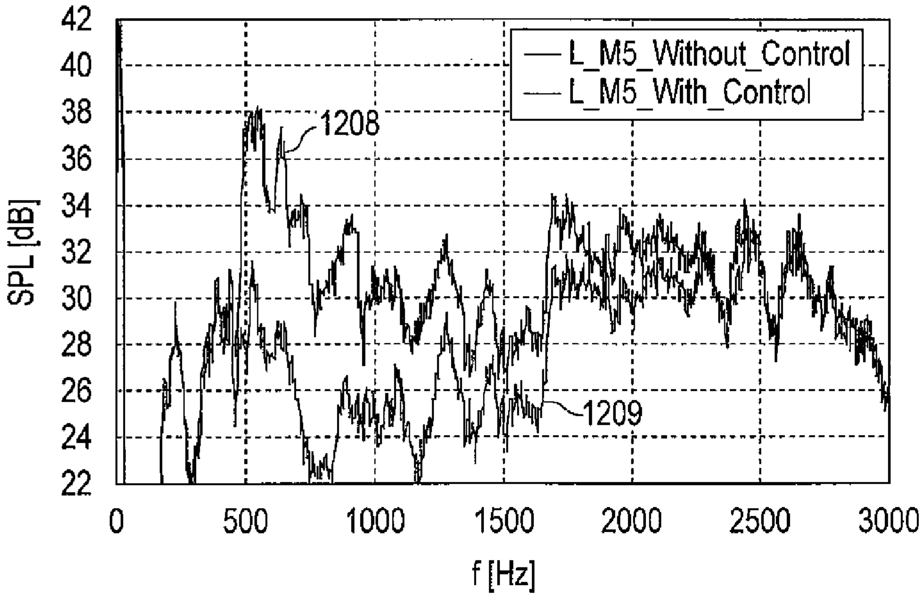
FIGS. 20A and 20B show graphs of test result examples to verify a sound increase control effect of the embodiment.
Figure 20B:
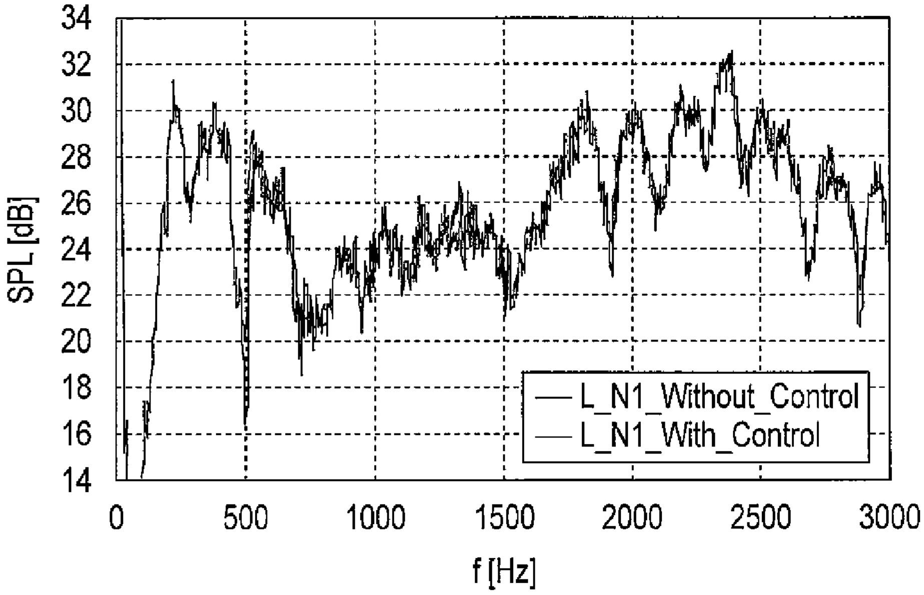

FIGS. 20A-20B shows test results which verify effects of the fourth embodiment. FIG. 20A shows sound pressure characteristics measured in the listening area. In FIG. 20A, reference numeral 1208 denotes the characteristics at an evaluation point M5 (see FIG. 6) in the listening area after the sound increase control; and 1209, those before the sound increase control. FIG. 20B shows sound pressure characteristics before and after the sound increase control, which are measured in the non-listening area.

Note that this embodiment can be practiced in combination with one or both of the second and third embodiments.

The fifth to eighth embodiments will be described hereinafter.

The fifth to eighth embodiments will exemplify the following sound field control apparatus. That is, this sound field control apparatus uses stereo acoustic signals, and includes, using the main sound source and the plurality of control sound sources described so far as one set, a total of two sets, that is, one set for a bass band of a right-channel stereo acoustic signal, and that for a bass band of a left-channel stereo acoustic signal. Furthermore, the apparatus applies sound increase control to a right-channel bass stereo acoustic signal and left-channel bass stereo acoustic signal, and applies directionality control using a plurality of (arrayed) speakers to a mid/treble band of the stereo acoustic signals. As for the sound increase control for bass tones of respective channels, all the descriptions given so far apply.

The fifth to eighth embodiments will exemplify a speaker system which, for example, when a plurality of persons in a family watch a large-screen TV, increases a volume around a position of a person whose hearing has deteriorated (for example, an elderly person or hearing-impaired person) (to be referred to as an elderly person or the like), but provides a normal volume to other viewers in a surrounding area.

It is desired to implement the sound increase control by, for example, a simple remote controller operation (especially for an elderly person or the like or a person unaccustomed to an operation). An automatic volume adjustment system which does not provide an excessive volume in a surrounding area even when an elderly person himself or herself or the like adjusts a volume to a large volume by, for example, a remote controller, or a remote-controller adjustment system which can automatically provide a suitably large volume to an elderly person or the like, who stays on site, even when another user operates to set a preferred listening volume, is desired.

Upon implementing such system, it is desired to realize rich sound quality over a broad frequency band from a bass band to a treble band. The related art targets at a mid/treble band, and is not suitable for a powerful bass band with long wavelengths. It is impossible in principle, based on the dimensions of a home TV/AV sound system or anything smaller, to realize sharp directionality for the mid/treble band.

Hence, a technique which can obtain sharp directionality in a bass band even within such dimensions to have a looking and listening space sound field as a target is demanded.

Furthermore, as TVs are ordinarily used by all ages from elderly persons to children, complicated functions like high-grade AV equipment are not suitable, and adjustment by a simple operation is demanded. Therefore, as for variations in acoustic effects depending on installation environments, which are inherent to audio equipment, it is desirable to avoid measurements and corrections of acoustic characteristics of an installation environment by a user himself or herself.

An overview of the fifth to eighth embodiments will be described below. In the fifth to eighth embodiments, as for a bass band, control speakers nearly in opposite phase are laid out beside right and left main speakers, and are controlled to cause phase interferences, thereby implementing control filters, which give directionality to a powerful low-pitch tone range of about 1 kHz to 2 kHz or lower, and guide sound to a predetermined position.

Since the control speakers are also integrally laid out with the main speakers, a general stereo layout (triangle) is satisfied at a TV front viewing position, and stereo localization can be maintained even after control.

Even when a direction of sound directionality is changed to an oblique direction of the TV, a bass band is free from deterioration of a sound image localization position since it has longer wavelengths, and the user can feel central localization when the TV is viewed from the oblique viewing position. Furthermore, as for sound quality enhancement and clarity enhancement, the amplitudes/phases/time delay amounts of a mid/treble band which contributes to them are adjusted to match a bass sound increase amount by a speaker group arranged at the center, thus providing balanced sound quality from a bass band to treble band in a direction where sound increase control is desired.

Although sound image localization of a mid/treble band is stricter than bass tones especially at an oblique viewing position since that range has shorter wavelengths, since localization can be already maintained in a bass band, even if central speakers are used to reproduce monaural sound, this does not lead to deterioration of localization. Instead, since a reproduction frequency band is expanded up to a treble band, a merit of rich sound quality can be provided.

Therefore, even within a large-screen TV implementation size, by configuring speakers for bass and treble tones suitably, directionality control which combines power, localization, and sound quality as their features can be attained.

Fifth Embodiment

The fifth embodiment will be described below.

Differences from the embodiments described so far will be mainly explained.

Figure 21:
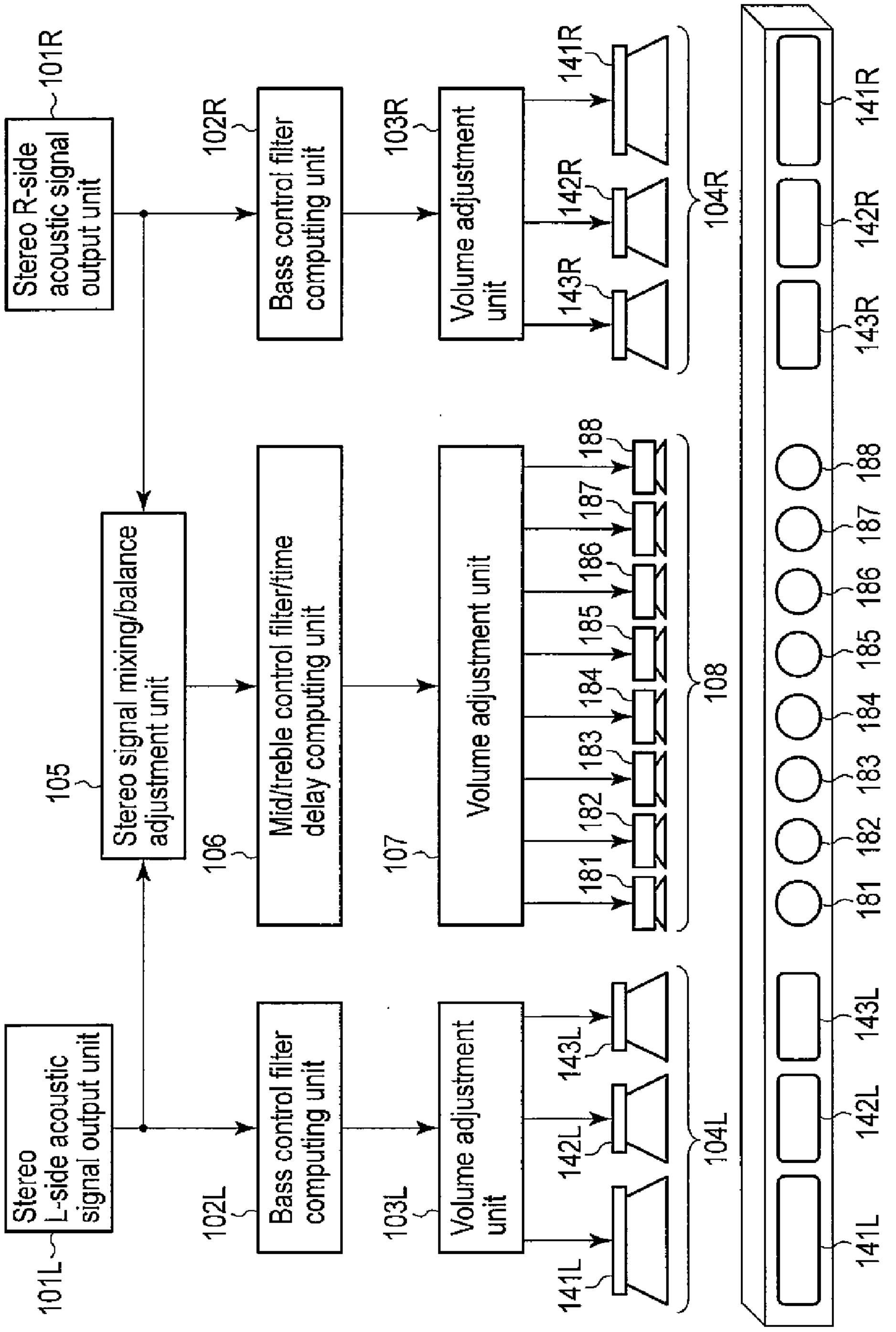
FIG. 21 is a block diagram showing an example of the arrangement of a sound field control apparatus according to a fifth embodiment.

FIG. 21 shows an arrangement example of a sound field control apparatus according to this embodiment.

As shown in FIG. 21, the sound field control apparatus of this embodiment includes an L-side (left channel-side) stereo acoustic signal output unit 101L and R-side (right channel-side) stereo acoustic signal output unit 101R, an L-side bass control filter computing unit 102L and L-side volume adjustment unit (amplifier unit) 103L as an L-side bass controller, an R-side bass control filter computing unit 102R and R-side volume adjustment unit (amplifier unit) 103R as an R-side bass controller, and a stereo signal mixing/balance adjustment unit 105, mid/treble control filter/time delay computing unit 106, and mid/treble volume adjustment unit (amplifier unit) 107 as a mid/treble controller. Note that reference numeral 200 in FIG. 21 denotes an example of a speaker box. Eight mid/treble speakers are exemplified. However, the number of these speakers is not limited to eight.

An L-side main sound source speaker (main speaker) 141L and L-side control speakers 142L and 143L, an R-side main sound source speaker 141R and R-side control speakers 142R and 143R, and mid/treble (arrayed) speakers 181 to 188 may be either incorporated in or externally connected to the sound field control apparatus.

The stereo acoustic signal output unit 101L outputs an L-side acoustic signal as a source.

The bass control filter computing unit 102L extracts and adjusts an amplitude phase of an L-side bass band from the stereo acoustic signal output unit 101L.

The volume adjustment unit 103L amplifies signals for respective speakers output from the bass control filter computing unit 102L.

The main sound source speaker 141L and control speakers 142L and 143L convert the signals for the respective speakers output from the volume adjustment unit 103L into sound. The main sound source speaker 141L and control speakers 142L and 143L can be used as one set to execute the sound increase control described in the first to fourth embodiments.

Likewise, the stereo acoustic signal output unit 101R outputs an R-side acoustic signal as a source.

The bass control filter computing unit 102R extracts and adjusts an amplitude phase of an R-side bass band from the stereo acoustic signal output unit 101R.

The volume adjustment unit 103R amplifies signals for respective speakers output from the bass control filter computing unit 102R.

The main sound source speaker 141R and control speakers 142R and 143R convert the signals for the respective speakers output from the volume adjustment unit 103R into sound. The main sound source speaker 141R and control speakers 142R and 143R can be used as one set to execute the sound increase control described in the first to fourth embodiments.

On the other hand, the stereo signal mixing/balance adjustment unit 105 mixes the R- and L-side stereo acoustic signals output from the stereo acoustic signal output units 101R and 101L and adjusts their balance.

The mid/treble control filter/time delay computing unit 106 extracts and adjusts amplitude phases of a mid/treble band from the output signals of the stereo signal mixing/balance adjustment unit 105.

The volume adjustment unit 107 amplifies signals for the respective speakers output from the mid/treble control filter/time delay computing unit 106.

The speakers 181 to 188 convert the signals for the respective speakers output from the volume adjustment unit 107 into sound.

In this embodiment, bass tones are increased in a specific area using the sound increase control independently for the R and L sides, and mid/treble tones are controlled to be given with directionality in a direction of the specific area using, for example, a time delay method, thus implementing an increase effect that can assure satisfactory directionality over a broad frequency band from the bass band to the treble band.

Note that in this embodiment, the sound increase factor n used in the sound increase control of the bass band may be fixed or may be designated by the user like in the first to fourth embodiments. Also, a direction of directionality (a direction to increase bass tones and that of directionality of mid/treble tones) may be fixed or may be designated by the user.

In this embodiment, stereo acoustic signals correspond to, for example, TV content sound such as audio or music, and the stereo acoustic signal output units 101R and 101L extract amplitudes and phases of the bass band from the stereo acoustic signals. The bass band in this case corresponds to a frequency band of 2 kHz or lower, which can be implemented by a sound control technique mainly for bass tones. The bass control filter computing units 102R and 102L execute FIR filter computations for the extracted time-series acoustic signals of the bass band, and the volume adjustment units 103R and 103L amplify the controlled signals, and the amplified signals are output from the control speakers 142R, 143R, 142L, and 143L. Note that signals to the main speakers 141R and 141L need not undergo bass band cut processing, but they require computation delays to be synchronized with computed output signals for the control speakers 142R, 143R, 142L, and 143L. Hence, these signals are processed together by the bass control filter computing units 102R and 102L.

Note that filters configure a relationship given by equations (36) below using Spatial transmission functions F and Z to a listening area (audible area) where sound is increased after sound field control and to a non-listening area (inaudible area) where sound pressure is maintained, as shown in FIG. 2.

The listening area is set in the direction to amplify sound, and a composite sound pressure of the main speaker and two control sound sources increases sound by n times compared to a coming sound pressure when only the main speaker produces sound. Also, in the non-listening area, acoustic energies of the two control sound sources are minimized to maintain sound pressure even after control.

Then, by shifting the two areas stepwise, directionality can be attained even in the bass band. Note that since a complex number α in equations (36) is nearly in opposite phase in this case, a necessary condition of bass directionality is to set the two control speakers nearly in opposite phase.

$$q_{S2} = -\frac{\sum_{j=1}^{N}((1-n)F_{Pj}\cdot\beta_j^*)}{\sum_{j=1}^{N}(\beta_j\cdot\beta_j^*)}\cdot q_P \tag{36}$$

$$q_{S2} = \alpha\cdot q_{S2}$$

$$\alpha = -\frac{\sum_{i=1}^{M}(Z_{S1i}^*\cdot Z_{S2i})}{\sum_{i=1}^{M}(Z_{S1i}\cdot Z_{S1i}^*)}$$

Figure 22A:
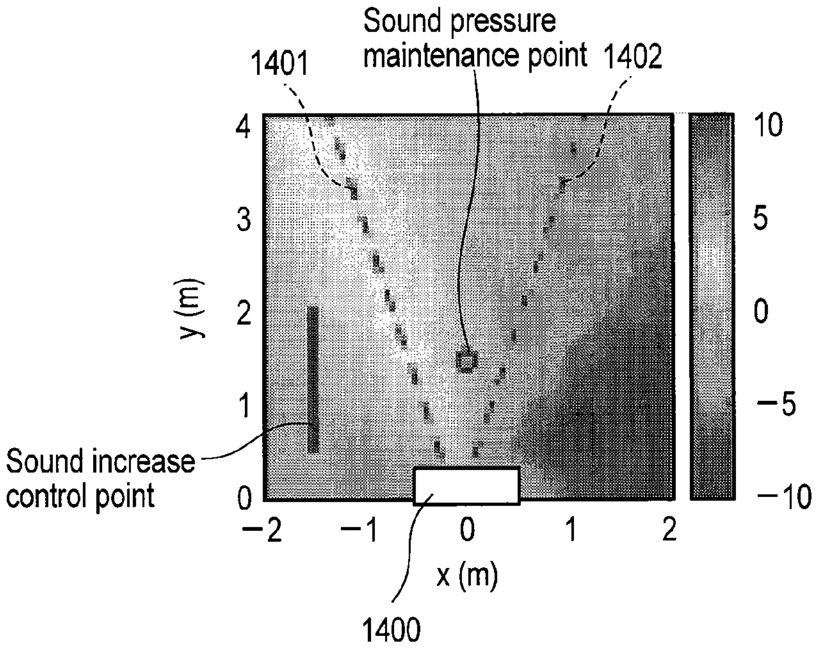
FIGS. 22A and 22B show graphs of sound pressure distribution calculation result examples of sound field control used to explain directionality distribution modes of bass tones.
Figure 22B:
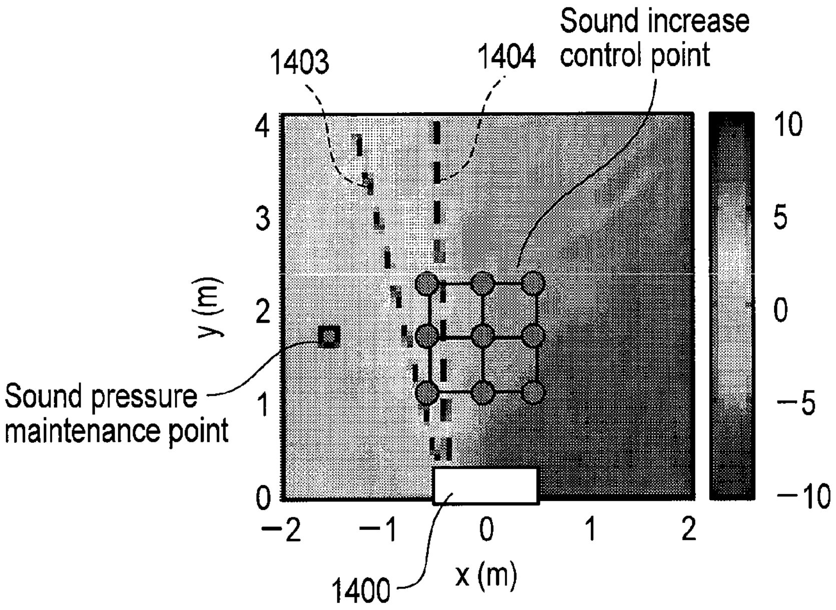

FIGS. 22A-B shows calculation examples of a sound field when the positions of evaluation points in the listening area and non-listening area are changed. FIG. 22A shows an example in which increase evaluation points (listening area) (see 1411 in FIG. 22A) are set on the left side of a speaker system 1400, and sound pressure maintenance points (non-listening area) (see 1412 in FIG. 22A) are set in front of the system. FIG. 22B shows an example in which sound pressure maintenance points (non-listening area) (see 1413 in FIG. 22B) are set on the left side of the speaker system 1400, and increase evaluation points (listening area) (see 1414 in FIG. 22B) are set in front of the system. Note that FIG. 22B exemplifies a state in which nine evaluation points are laid out at 0.5-m intervals in the back-and-forth directions and right-and-left directions to have a position separated by 1.8 m from the front surface of the speaker as a center.

In the case of the setting example in FIG. 22A, sound is increased on the left side, sound pressure is changed from being maintained to being reduced from the front side to the right side, and bass directionality toward the left side is given (in FIG. 22A, reference numeral 1401 denotes a line of +3 dB; and 1402, a line of −3 dB). On the other hand, in the case of the setting example in FIG. 22B, sound is increased from the front side to the right side, and sound pressure is maintained on the left side (in FIG. 22B, reference numeral 1403 denotes a line of +1 dB; and 1404, a line of +3 dB).

By changing the setting positions in this way, the direction of directionality and the size of the listening area can be arbitrarily set.

On the other hand, as for a mid/treble band, one speaker cannot be assumed as a omnidirectional point sound source compared to the bass band having longer wavelengths, and serves as a directional sound source.

Therefore, directional characteristics are roughly estimated by a directionality basic principle formula of a piston sound source given by a sound pressure P(θ, R) at a distance R (m) and an angle θ (rad) from a sound source, and a directional coefficient D(θ):

$$p(\theta, R) = \frac{j\omega\rho\pi a^a u}{2\pi R}e^{-jkR}\cdot D(\theta) \tag{37}$$

-continued $$D(\theta) = \frac{2J_1(ka\sin\theta)}{ka\sin\theta}$$

where θ is an angle (rad), u is a vibration velocity (m/s2), a is a vibration radius (m), j is an imaginary unit, ω is an angular frequency (rad/sec), ρ is an air density (kg/m$^3$), c is a sonic velocity (m/s2), and J1 is a Bessel function of the first order.

By applying time delay control or amplitude/phase control to the speakers (181 to 188) arranged at the center based on the aforementioned characteristics, respectively, beam-like directional control is implemented.

The stereo signal mixing/balance adjustment unit 105 receives the two signals from the stereo acoustic signal output units 101R and 101L, and mixes the stereo acoustic signals to convert them into a monaural acoustic signal. Furthermore, the stereo signal mixing/balance adjustment unit 105 changes delay times over signals to be input to, for example, the speakers (181 to 188), thus controlling a sound direction in one direction. Alternatively, the stereo signal mixing/balance adjustment unit 105 individually adjusts amplitudes and phases by executing, for example, FIR computation processing of individual signals, thus implementing concave or convex directionality which forms a sound focus anteriorly or posteriorly.

Then, echo is avoided by also executing synchronization and time alignment processes with an output time of the bass band, and directional sound can be provided to a predetermined position over a broad frequency band from the bass band to the treble band.

Figure 23:
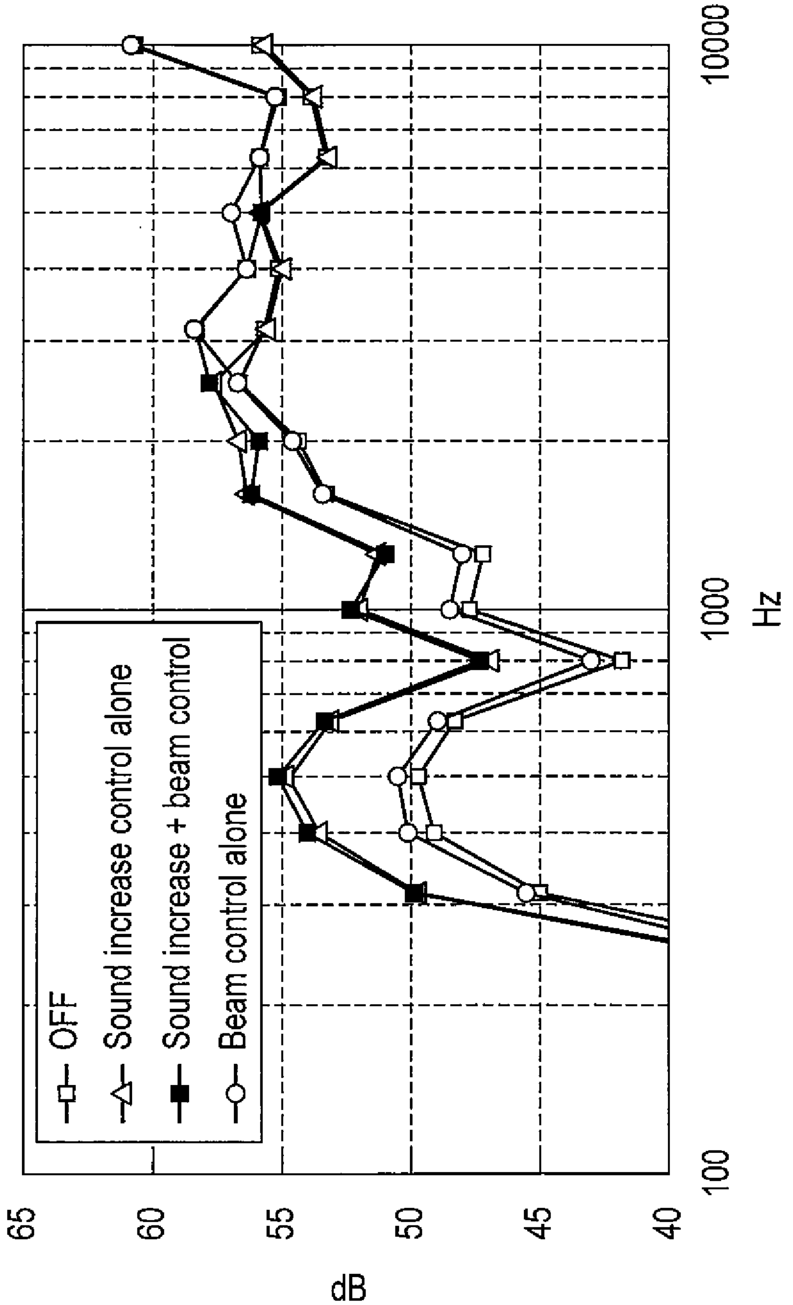
FIG. 23 is a graph showing an actual measurement result example to verify the sound increase control effect of the embodiment.
Figure 24:
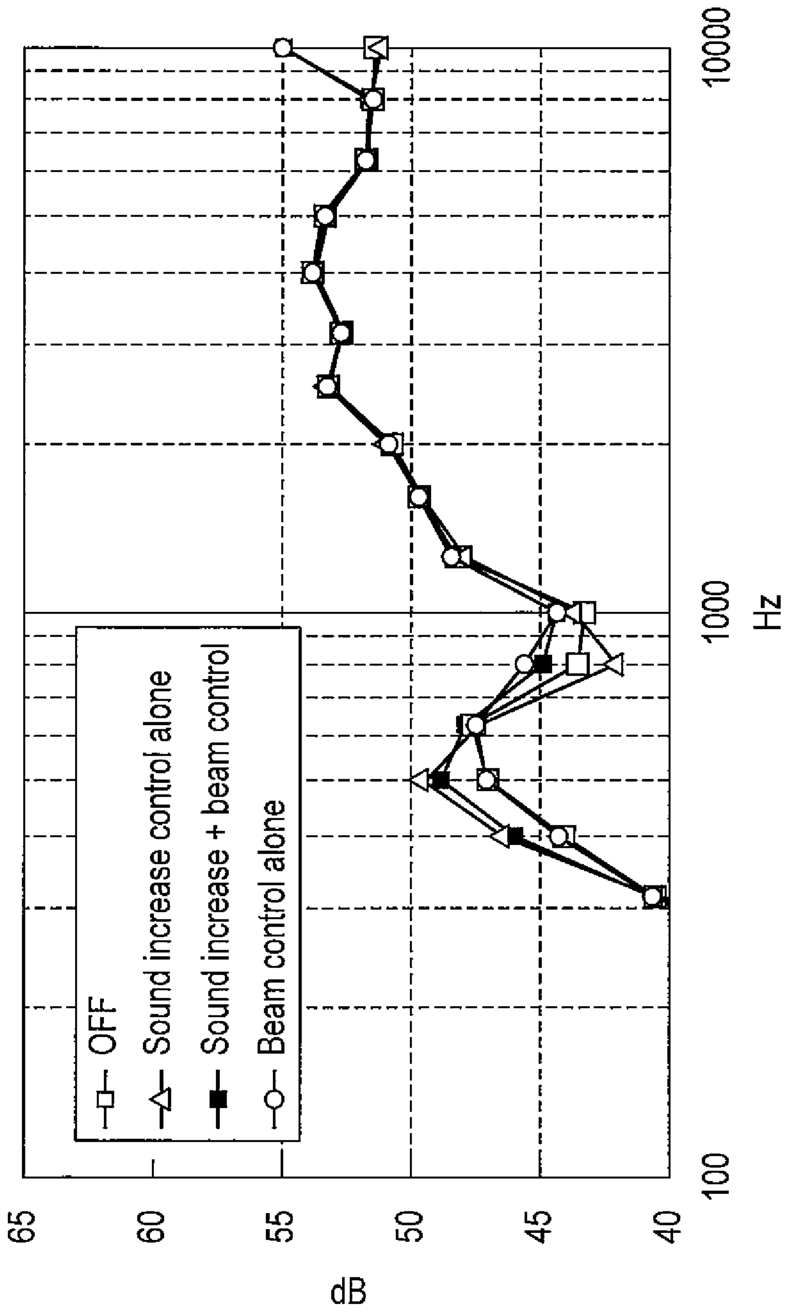
FIG. 24 is a graph showing an actual measurement result example to verify the sound increase control effect of the embodiment.

FIGS. 23 and 24 show actual measurement results, which demonstrated the effects of a hybrid multi-speaker directional control system using the bass sound field sound increase control and mid/treble beam-like directionality control.

FIG. 23 shows the control effects when directionality is given to increase sound pressure at a front position separated by 1.8 m from the speakers. As for the front position, when only the sound field control in the bass band is executed (a sound increase factor=×2 at a front position separated by 1.8 m, and sound pressure is maintained at the side position separated from there by 1.8 m), sound is increased in a bass band up to 2 kHz in comparison with a state in which the sound increase control is OFF. Then, as can be seen from FIG. 23, by additionally executing beam control for a treble band in which an increase effect is enhanced at 2 kHz or higher, sound is uniformly increased over a broad frequency band up to a high-frequency band of 2 kHz or higher.

On the other hand, FIG. 24 shows the control effects at the side position in this case. A result of OFF before control equally overlaps that of only the beam control. By contrast, the sound increase control is increased near 500 Hz due to a slight influence of echo, but sound pressure is maintained over the entire frequency band of 2 kHz or lower without being increased compared to the front position. As can be seen from FIG. 24, sound in the mid/treble band is largely increased on the front side but is not changed at all at the side position, and sound pressure is maintained. Thus, as can be seen from FIG. 24, although a distance difference is only about 1.8 m, directionality control over a broad frequency band from bass to treble tones can be attained.

As described above, according to this embodiment, the sound increase control is used in the bass band, and the directionality control such as a time delay method is used in the mid/treble band, thereby providing sound of rich sound quality over a broad frequency band from the bass band to the treble band to a specific user position with directionality. Then, for example, the user can enjoy TV/AV sound at full blast in the listening area without regard to sound leakage to a surrounding area. Also, before and after the sound increase control, only a listener in the listening area can directly experience that effect (increase effect). For example, in the non-listening area, a user can enjoy TV/AV sound with a large volume of a level lower than the listening area, or a normal volume, or a volume lower than the normal volume, or he or she does not listen to any sound by muting sound. Alternatively, when a plurality of persons of a family watch a large-screen TV, even when a volume is increased at a position near an elderly person whose hearing deteriorates, sound at a normal volume can be provided to other surrounding viewers.

Sixth Embodiment

The sixth embodiment will be described below.

Differences from the embodiments described so far will be mainly explained.

It is not so troublesome for a general user to adjust the direction of the directionality by a remote controller operation as well as perform volume adjustment. Rather, it may be preferable for such user to confirm the direction of directionality by changing a sound direction in order to ensure a desired directionality. However, for example, all ages from children to elderly persons enjoy TV and the like, and an operation method should be as simple as possible, resulting in convenience. Hence, this embodiment realizes a speaker directionality control system which increases a speaker volume to a user position (looking and listening position) as a target, which is estimated using, for example, an internal microphone and/or camera.

Figure 25:
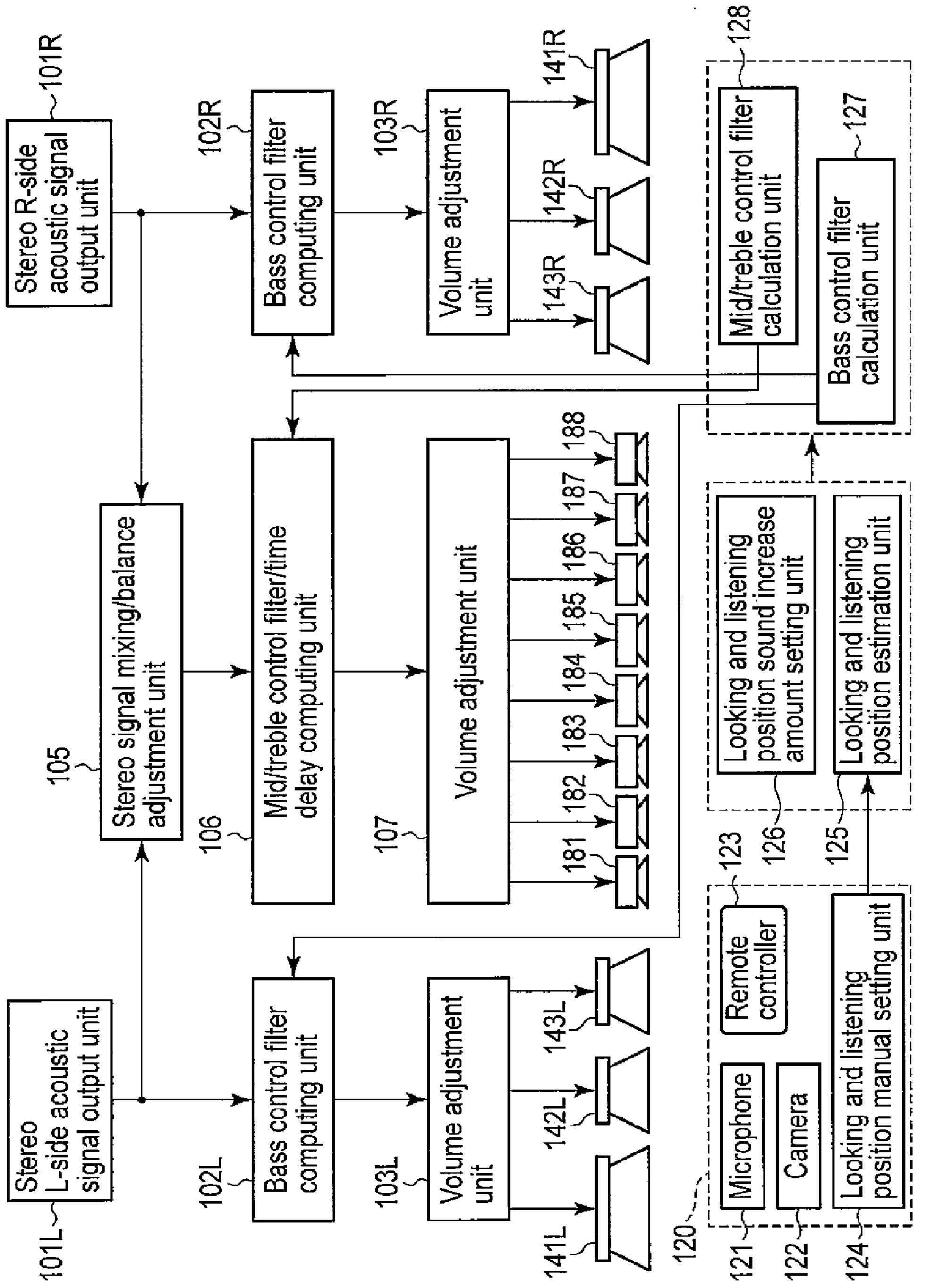
FIG. 25 is a block diagram showing an example of the arrangement of a sound field control apparatus according to a sixth embodiment.

FIG. 25 shows an arrangement example of a sound field control apparatus of this embodiment.

The arrangement example shown in FIG. 25 further includes a looking and listening position estimation information input unit 120 and looking and listening position estimation unit 125, and a looking and listening position sound increase amount setting unit 126, a bass control filter calculation unit 127, and a mid/treble control filter calculation unit 128, in addition to that of FIG. 21 (fifth embodiment).

The looking and listening position estimation information input unit 120 may include, for example, all or some of a microphone 121, camera 122, remote controller 123, and looking and listening position manual setting unit 124.

The looking and listening position estimation unit 125 estimates a looking and listening position based on information (for example, all or some of a voice input from the microphone 121, an image input from the camera 122, and a signal sent from the remote controller 123) from the looking and listening position estimation information input unit 120. Note that this estimation may use a conventional technique. Alternatively, a user may manually set a looking and listening position from the looking and listening position manual setting unit 124 (note that, for example, various methods such as a method of designating a looking and listening position by a cursor, which moves on an image indicating a room layout displayed on a display screen, and a method of specifically inputting a direction and/or a distance from speakers are available).

Upon estimating the looking and listening position, for example, only a direction viewed from the center of an image display apparatus which incorporates speakers or the center (to be referred to as a reference point hereinafter) of the speakers may be estimated (in this case, when distance information is also required, for example, a pre-set value is used as the distance information), or a viewing direction and distance from the reference point may be estimated. In these cases, continuous values or discrete values may be used as the estimated value.

Note that an estimation range of the looking and listening position (looking and listening position estimation range) may be limited in advance. For example, only a person who falls within a range of a pre-set angle to have a front position viewed from the reference point as the center may be selected as an estimation target of the looking and listening position. A person who listens to sound increase listens to sound at a desired position within the looking and listening position estimation range, and a person who listens to sound without being increased listens to sound at a desired position outside the looking and listening position estimation range. Preferably, the user can set or select this looking and listening position estimation range as needed.

The looking and listening position sound increase amount setting unit 126 sets, in advance, a suited sound increase amount ρ (a relative sound increase amount with respect to a surrounding area) at the estimated looking and listening position.

The bass control filter calculation unit 127 calculates a bass control filter so as to assure a sound increase amount of a bass band at the looking and listening position (basically in the same manner as in the first embodiment) based on the estimation result of the looking and listening position estimation unit 125 and the setting value of the sound increase amount by the looking and listening position sound increase amount setting unit 126.

Note that the sound increase amount ρ of this embodiment may be used for the sound increase factor n of the first embodiment and the like intact or after a predetermined conversion is applied to that value. Alternatively, the sound increase amount ρ may undergo an arbitrary calculation (for example, a correction calculation in consideration of an age or hearing ability of a listener) that allows a result to change depending on the situation to calculate the sound increase factor n.

For example, the value n may increase with increasing age (since hearing ability lowers). For example, information such as an age may be registered in advance, or may be changed as needed using a remote controller, or may be input using speech recognition or image recognition.

Conversion from ρ into n may be executed by, for example, either the looking and listening position sound increase amount setting unit 126 or the bass control filter calculation unit 127.

The mid/treble control filter calculation unit 128 calculates a mid/treble control filter so as to assure a sound increase amount of a mid/treble band (for example, by a time delay method).

In this embodiment, calculations of the bass control filter and mid/treble control filter and volume adjustment, which are required to assure a desired sound increase amount at the looking and listening position, are executed based on the estimation result of the looking and listening position estimation unit 125 and the setting value of the sound increase amount set by the looking and listening position sound increase amount setting unit 126. That is, the estimated looking and listening position is set as a listening area in sound increase control associated with a bass band, and is also set as a direction of directionality in directionality control associated with a mid/treble band, thereby executing the bass sound increase control and mid/treble directionality control. Thus, a sound increase amount suited to the estimated position of a user (for example, who is watching TV) can be provided.

In this embodiment, when the looking and listening position estimation unit 125 can successfully estimate the looking and listening position, evaluation points of the listening area shown in FIG. 2 can be set at that position in a sound field control technique for bass tones. On the other hand, in beam control for the mid/treble band, time delay amounts among central speakers can be set to give directionality to that position.

Then, as for the sound increase amount, for example, a desired sound increase amount is set in advance by the looking and listening position sound increase amount setting unit 126, and the sound increase factor n of the filters given by equations (36) is automatically calculated for the bass sound field control, and the sound increase factor is calculated by the mid/treble control filter/time delay computing unit 106 or volume adjustment unit 107 for the mid/treble beam control, thereby providing a volume according to the desired sound increase amount from the speakers.

Note that the target setting volume can be variously examined.

Since all of a room layout, room size, and looking and listening position in the room are different depending on users, the user may decide the target setting volume according to a user's looking and listening position. Alternatively, the target setting volume may be set with reference to well-known age-dependent hearing levels or hearing test results with reference to those in their 20's, or hearing-aid correction characteristics for a person with a hearing aid. Since hearing sensitivity, as well as that relating to bass and treble bands (an age-dependent sensitivity difference is conspicuous in the treble band, but it is a maximum of about 10 dB even in the bass band) depends greatly on age, the sound increase amounts of the bass sound field control and the mid/treble beam control may be changed.

Note that this embodiment can also allow the user to designate the sound increase factor n as in the first embodiment and the like.

Figure 26:
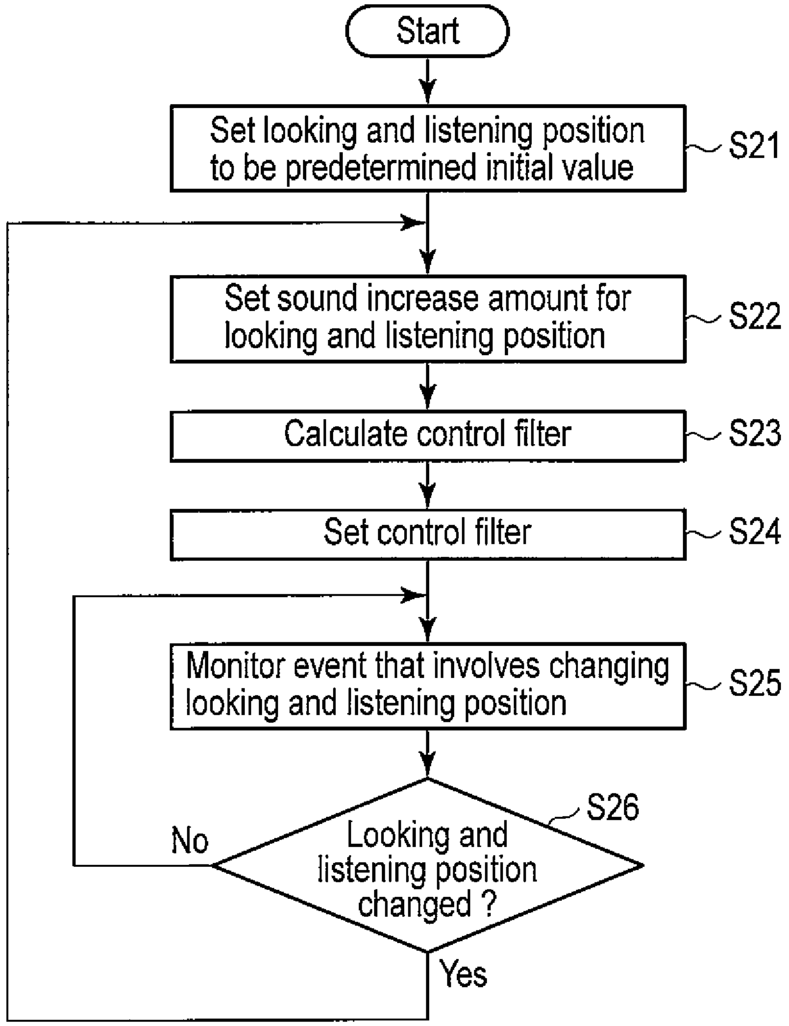
FIG. 26 is a flowchart showing an operation example of the sound field control apparatus according to the embodiment.

FIG. 26 shows an operation example associated with the sound increase control of the sound field control apparatus of this embodiment.

The following description will be given taking as an example a case in which the sound increase factor n is not designated by the user.

A looking and listening position is set to be a predetermined initial value (step S21). The initial value may be either a pre-set value (for example, a predetermined distance in a front direction of a display apparatus) or the estimation result of the looking and listening position at the latest use timing of the sound increase control in this sound field control apparatus. Also, various other methods are available.

A sound increase amount for the estimated looking and listening position is set (step S22).

The control filters are then calculated (step S23).

The calculated values are set in the control filters (step S24).

The states of the control filters are maintained until an event for changing the estimated looking and listening position is generated. In this case, an event that involves changing the estimated looking and listening position will be considered as this event.

It is monitored in step S25 whether or not an event which involves changing the estimated looking and listening position is generated.

For example, when the user changes the looking and listening position, that event is detected (step S26), and the process returns to step S22 to re-set the sound increase amount and to re-calculate and re-set the control filters.

Note that this procedure is an example, and various variations of operations associated with the sound increase control of this embodiment are available.

When the user is allowed to designate the sound increase factor n, the sound increase factor n is set to a predetermined initial value in step S21 as in the procedure example shown in FIG. 7, and it is also monitored in step S25 whether or not an event which involves changing the sound increase factor n is occurred as in the procedure example shown in FIG. 7.

Seventh Embodiment

The seventh embodiment will be described below.

An overview of this embodiment will be described below. This embodiment allows to implement, even in an actual environment with echo, a preset control method robust against variations of acoustic effects depending on installation environments.

As for a mid/treble band, beam-like directional control by means of central speakers is attained, and amplitude/phase/time delay characteristics of the individual speakers are calculated in advance, thus effect deterioration caused by an installation environment (that is, indoor echo characteristics) is little. By contrast, as for a bass band with longer wavelengths, since directionality cannot be given by the above directionality control in principle under an implementation condition, sound pressures of two control speakers nearly in opposite phase are interfered with that of a main sound source, thereby coping with the effect deterioration.

However, as indoor echo becomes larger, although a desired sound increase amount can be maintained at a looking and listening position, sound begins to be increased also in a surrounding area of the looking and listening position due to use of phase interferences. Hence, the sound increase factor of control filters is adjusted according to the echo to suppress deterioration components, thereby introducing a mechanism that presents a volume close to a desired volume. More specifically, by adjusting a sound increase factor using control filters, which are prepared in advance in an anechoic room with large direct wave components, only direct wave components are emphasized compared to echo waves even in an actual environment with a large echo, thereby introducing a preset control robust against indoor characteristics.

This embodiment further examines variations of the increase effect depending on installation environments in the sixth embodiment, and implements robust preset control even in an actual environment with echo.

Differences from the embodiments described so far will be mainly explained.

Figure 27:
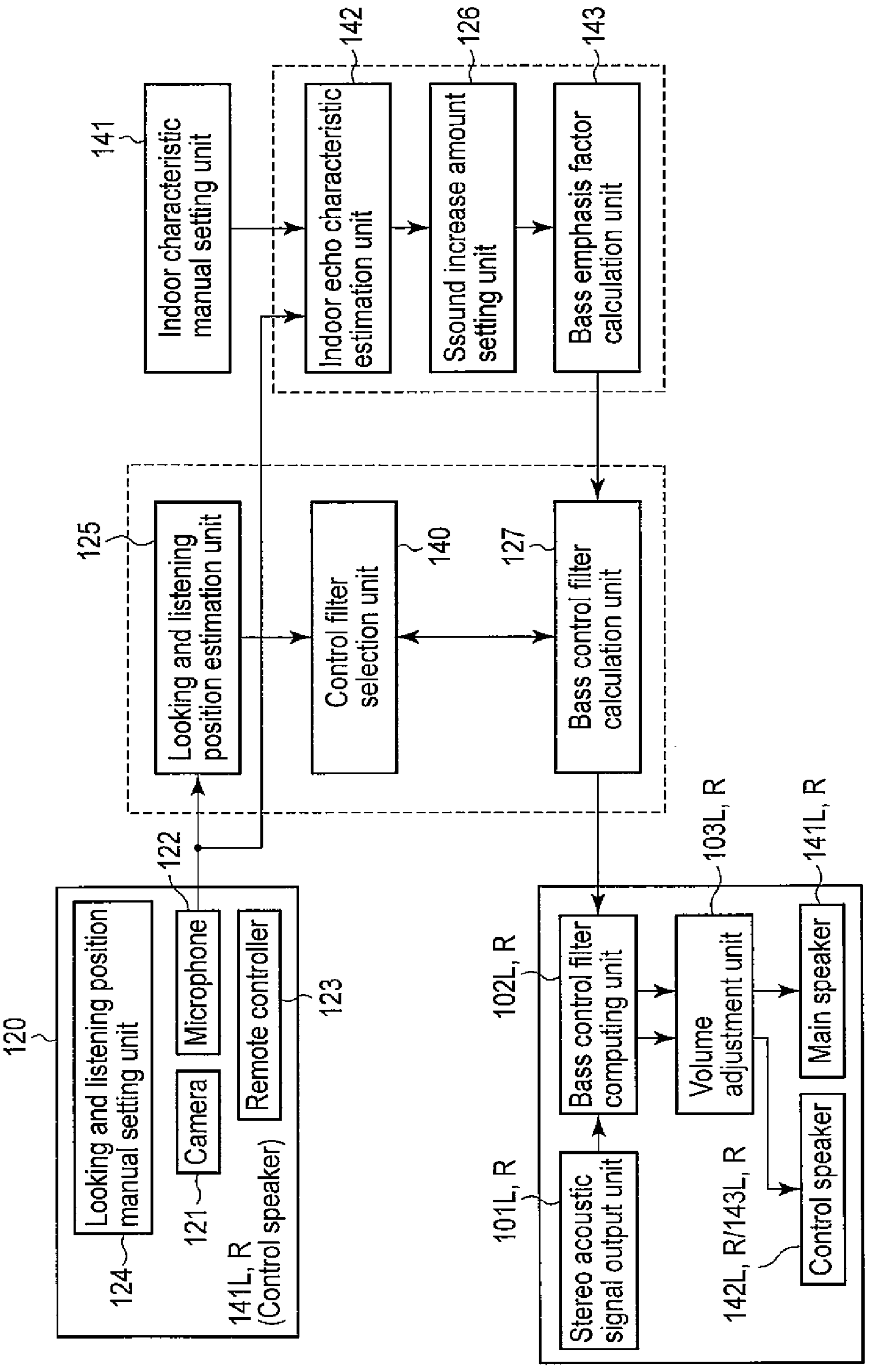
FIG. 27 is a block diagram showing an example of the arrangement of a sound field control apparatus according to a seventh embodiment.

FIG. 27 shows an arrangement example of a sound field control apparatus according to this embodiment.

The arrangement example shown in FIG. 27 further includes a control filter selection unit (filter selection unit) 140, indoor echo characteristic estimation unit 142, and bass emphasis factor calculation unit 143, in addition to that shown in FIG. 25 (sixth embodiment). Note that an indoor characteristic manual setting unit 141 may be added to allow a user to manually set indoor characteristics.

Note that the arrangement example shown in FIG. 27 does not describe any units associated with the mid/treble band, and the units associated with the mid/treble band can be the same as those in the arrangement example shown in FIG. 21 or 25.

The remote controller 123 for an elderly person or the like is preferably prepared.

The filter selection unit 140 includes a plurality of sound increase control filters prepared in advance in an anechoic room in association with a plurality of pairs of looking and listening positions and sound increase factors n, and selects optimal control filters W(n) to create a listening area at the estimated looking and listening position from the plurality of sound increase control filters prepared in advance in the anechoic room based on the estimation result (estimated looking and listening position) of the looking and listening position estimation unit 125 and a bass emphasis factor (sound increase factor) n calculated by the bass emphasis factor calculation unit 143.

Note that the plurality of sound increase control filters prepared in advance in the anechoic room may be held outside the filter selection unit 140.

The indoor echo characteristic estimation unit 142 estimates indoor echo characteristics $\overline{\alpha}$ based on information (for example, all or some of a voice input from the microphone 121, an image input from the camera 122, a signal sent from the remote controller 123, and tones to be output from the main sound source speakers (main speakers) 141R and 141L) input from the looking and listening position estimation information input unit 120. Alternatively, the indoor echo characteristic estimation unit 142 may obtain the indoor echo characteristics $\overline{\alpha}$ based on an input from the indoor characteristic manual setting unit 141.

The bass emphasis factor calculation unit (sound increase factor calculation unit) 143 calculates a bass emphasis factor (sound increase factor) n at the looking and listening position based on the estimated value of the indoor echo characteristics $\overline{\alpha}$ and a setting value of a sound increase amount ρ.

Note that in this embodiment, the bass control filter calculation unit 127 attains a sound increase amount at the suited looking and listening position using the control filters W(n) selected by the filter selection unit 140.

Figure 28:
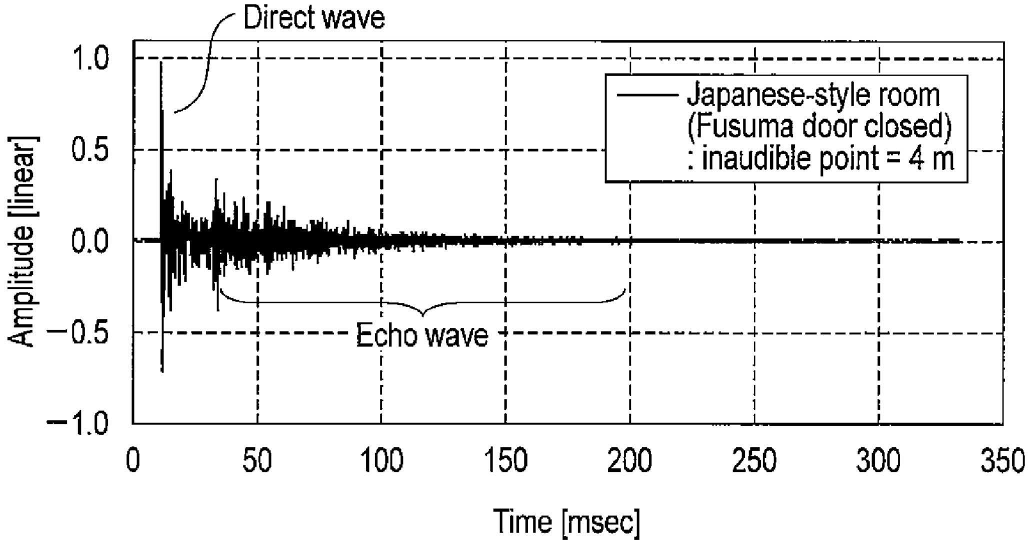
FIG. 28 is a graph showing a spatial impulse response actual measurement result example measured in an actual environment with echo.

In general, a room exhibits acoustic characteristics with echo. FIG. 28 shows impulse response characteristics in an actual room. As can be seen from FIG. 28, reflected/echo waves are superposed on direct waves compared to impulse response characteristics in an anechoic room shown in FIG. 29. The characteristics correspond to spatial characteristics obtained by computing inverse Fourier transforms of the Spatial transmission characteristics F and Z of the control filters of the sound field control given by equations (36).

The Spatial transmission characteristics including echo components in a room with echo can be expressed by:

$$F_{or}Z = \frac{j\omega\rho c^2}{V}\sum_r \frac{\varphi_r(X_{mic})}{M_r}\frac{\cdot\varphi_r(x_{qp})}{\omega_r^2-\omega^2+j\frac{cS\overline{\alpha}}{4V}\omega} \tag{38}$$

where $\overline{\alpha}$ is an average sound absorption coefficient as one index indicating characteristics of a room, V is a cubic capacity of the room, S is a surface area of the room, c is a sonic velocity, ϕ(Xmic) is a mode function at an arbitrary viewing point Xmic of the room, ϕ(Xqp) is a mode function at a sound source position Xqp, ω is an angular frequency, ρ is an air density, j is an imaginary unit, ωr is a resonance frequency decided depending on the dimensions of the room, and Mr is a modal mass.

Figure 29:
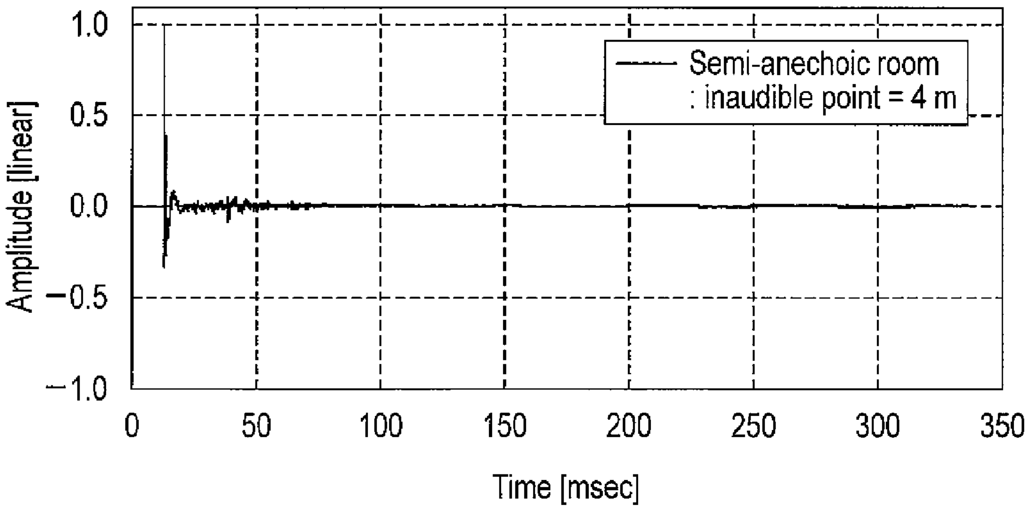
FIG. 29 is a graph showing a spatial impulse response actual measurement result example measured in an anechoic room without echo.

Therefore, when the echo is large, that is, when the average sound absorption coefficient is small, sound pressure is especially increased and echo waves are readily generated at the resonance frequency ωr decided by the room size. As a result, compared to the spatial characteristics of an anechoic room without reflection, which is shown in FIG. 29 and is given by:

$$F_{or}Z = \frac{\rho j\omega}{4\pi r}e^{-jkr} \tag{39}$$

amplitudes and phases traveling in a space are complicated, and even if two control sound sources are set in opposite phase, interferences do not so drop as in an anechoic room.

The basic principle of the sound field control of the bass band is to maintain sound pressure in the non-listening area by minimizing energies of two control sound sources nearly in opposite phase. Hence, in a room with large echo, energies of the control sound sources cannot be reduced, thus deteriorating sound pressure maintenance precision.

For example, echo becomes large in the sound increase control calculation result when an average sound absorption factor is about $\overline{\alpha}$=0.4, and sound is increased in the listening area, meanwhile in the non-listening area, sound pressure cannot be maintained but may be increased instead (that is, the sound pressure maintenance performance is deteriorated), in comparison with the sound increase control calculation result when an average sound absorption coefficient is about $\overline{\alpha}$=1.2.

Therefore, as the average sound absorption coefficient becomes smaller and echo becomes larger, a sound increase amount of a relative sound pressure difference between the listening area and non-listening area is gradually reduced (for example, upon comparing tones between the listening area and non-listening area, a lower increase effect is felt).

Hence, as a countermeasure against this, when echo is large, the sound increase factor may be increased.

Figure 30A:
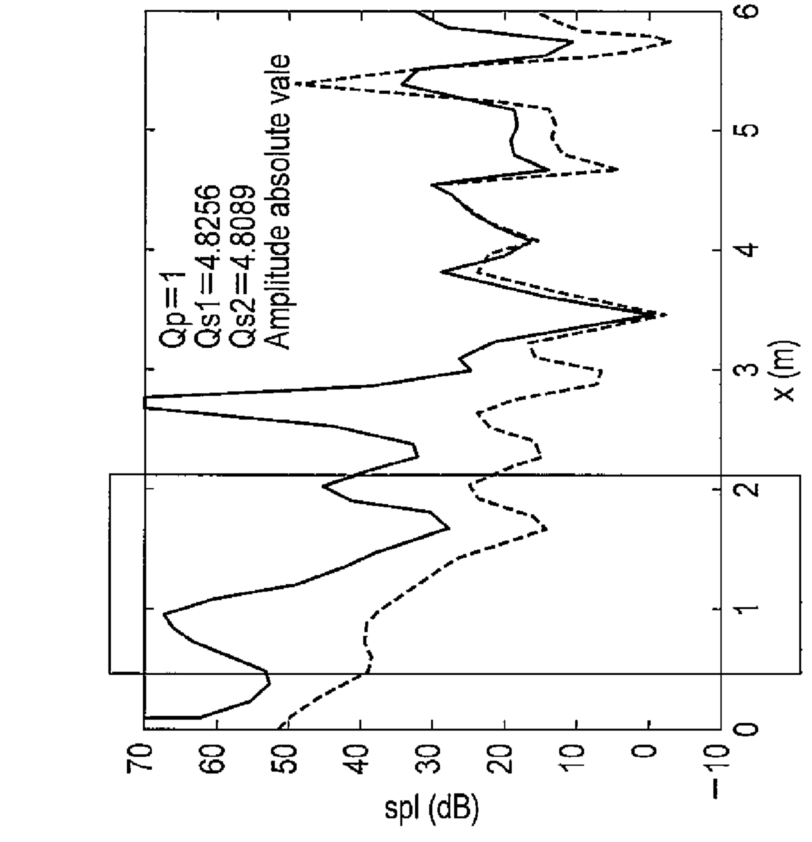
FIGS. 30A and 30B show graphs of calculation result examples of sound increase control when a sound increase factor is changed in a room with large echo.
Figure 30B:
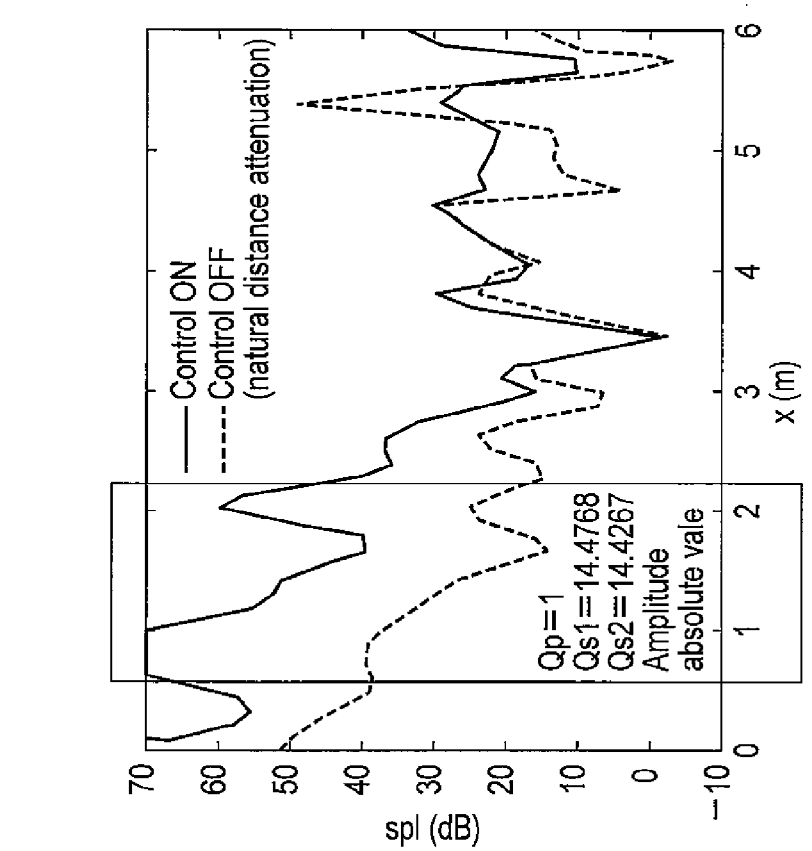

FIGS. 30A-30B show calculation results when the factor is changed from ×2 to ×4 (FIG. 30A shows the results when the sound increase factor n=×2, and FIG. 30B shows the results when the sound increase factor n=×4). As can be seen from FIG. 30, in the control result after the factor is changed, the sound increase amount is increased compared to that before control.

Figure 31A:
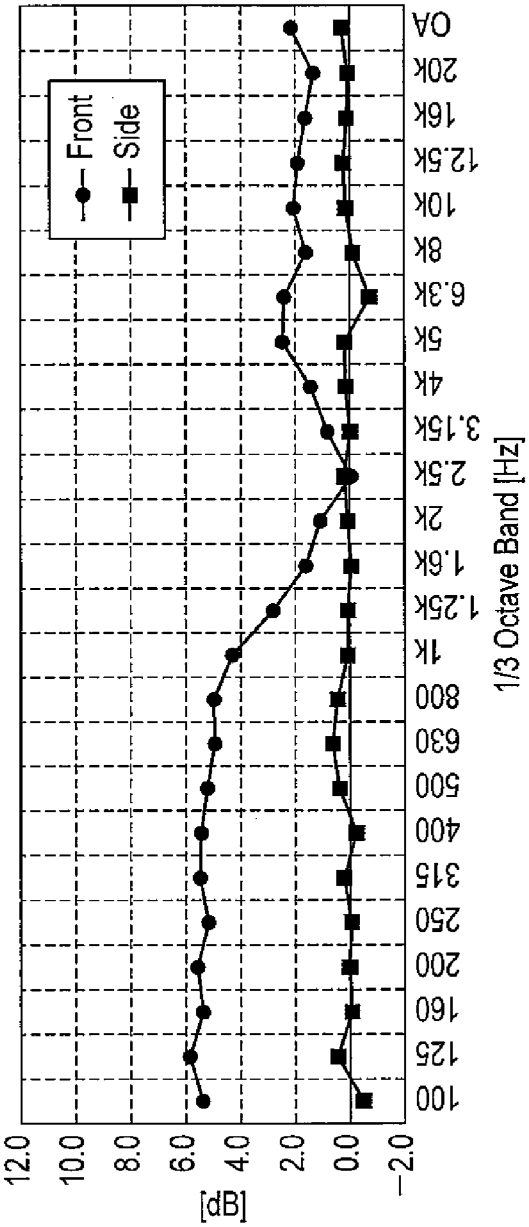
FIGS. 31A and 31B show graphs of sound increase control actual measurement result examples due to different sound increase factors of sound increase control, which were tested in a room with less echo.
Figure 31B:
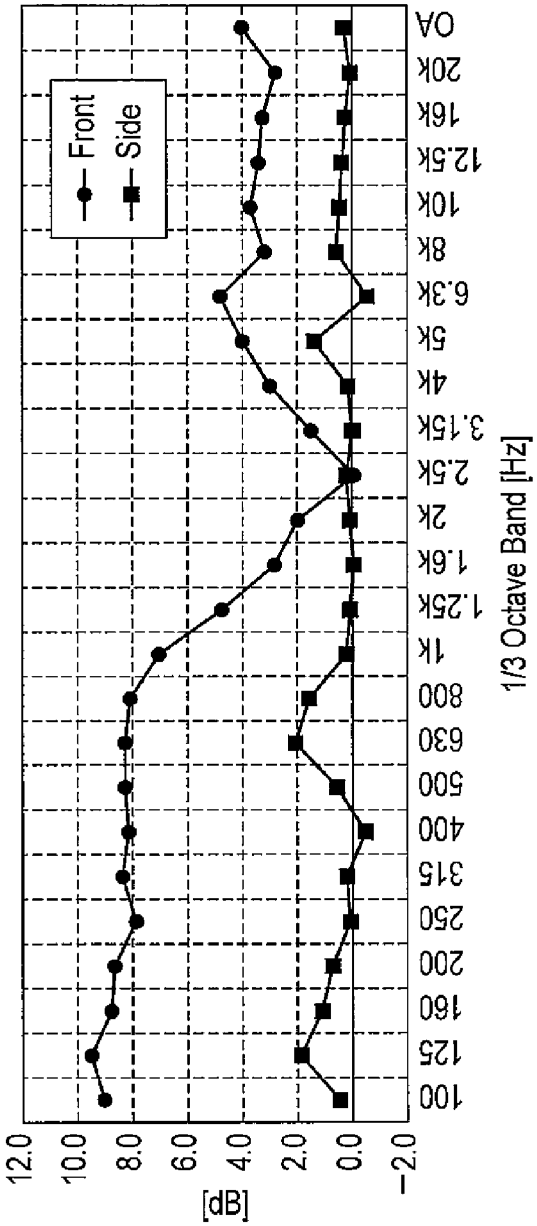

This effect was actually measured. FIGS. 31A-31B shows sound increase control results due to sound increase factor differences of sound increase, which were measured in a semi-anechoic room without echo, upon execution of the control filters which increase sound pressure at the front position (listening area) in the sound field control and maintain sound pressure at the side position (non-listening area). The ordinate plots a sound pressure increment amount before and after control. As shown in FIG. 31A, when the sound increase factor n=×2, since there is no echo, sound is increased by 20 log(n) (dB)=6 dB at the front position, sound pressure is nearly maintained at the side position, and a sound increase amount as a difference is roughly 6 dB. Then, as shown in FIG. 31B, when n=×3, sound is increased by 20 log(n)=9.5 dB. However, when the sound increase factor becomes equal to or higher than ×2, sound pressures of the control speakers become larger than a coming sound pressure of only the main speaker as a criterion (when the factor=×2, the main speaker and control speakers have the same sound pressure). Hence, a slight interference deviation in the non-listening area at the side position is expanded, and slight sound pressure maintenance performance deteriorations consequently begin to appear in places of a frequency band. In FIG. 31B, a deterioration (that is, an increment of sound pressure) of 2 dB appears near a 630-Hz band. However, as can be seen from FIG. 31B, a sound increase amount as a difference between them including this deterioration (increment) component is 6 dB or more, and when the factor is increased, a large sound pressure difference between the listening area and non-listening area can be assured, and a larger sound increase amount can be set in a direction to give directionality.

Figure 32:
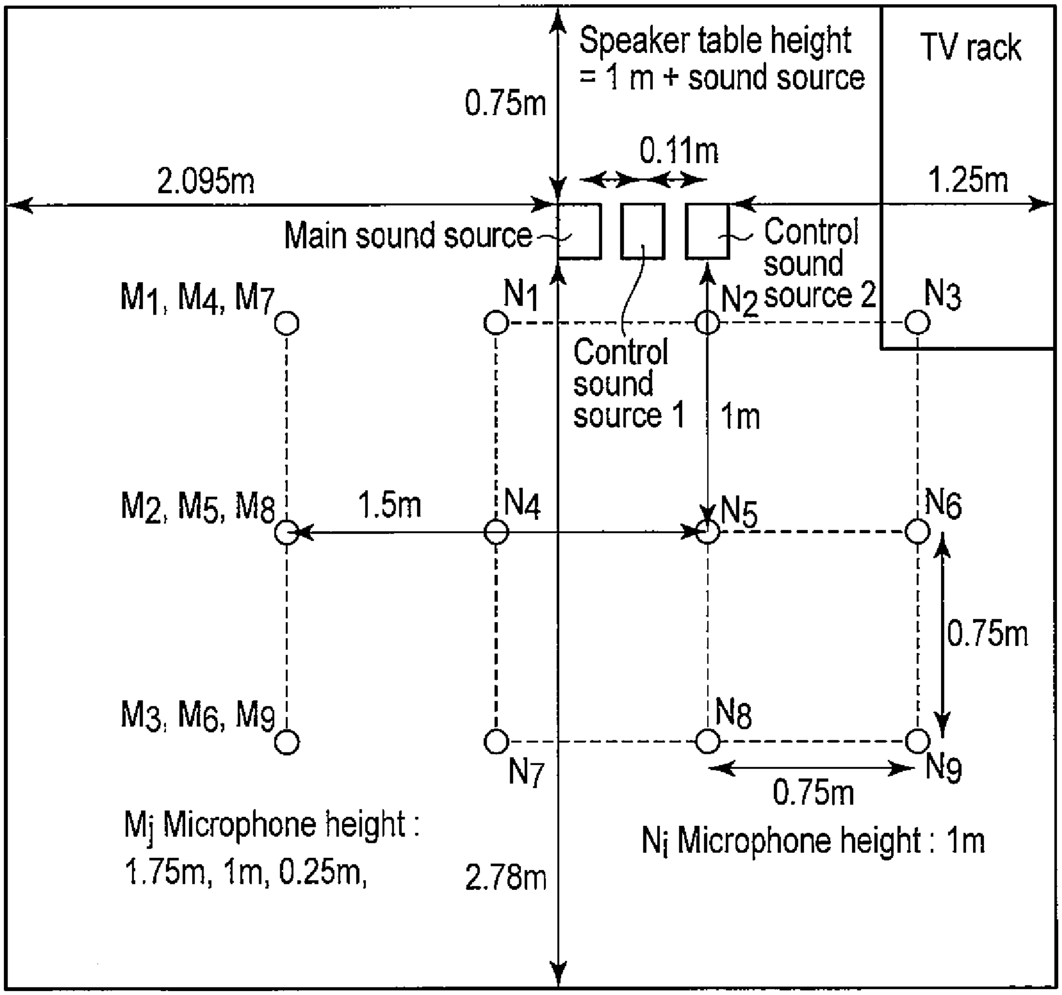
FIG. 32 is a schematic view of a sound increase control layout tested in an actual environment with echo.
Figure 33A:
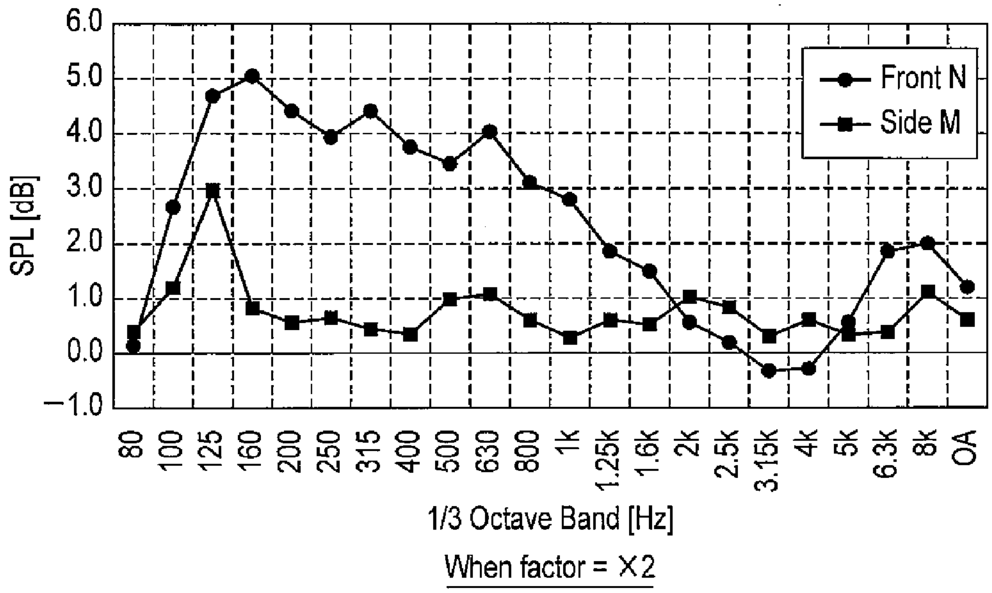
FIGS. 33A and 33B show graphs of sound increase control actual measurement result examples due to different sound increase factors of sound increase control, which were tested in an actual environment with echo.
Figure 33B:
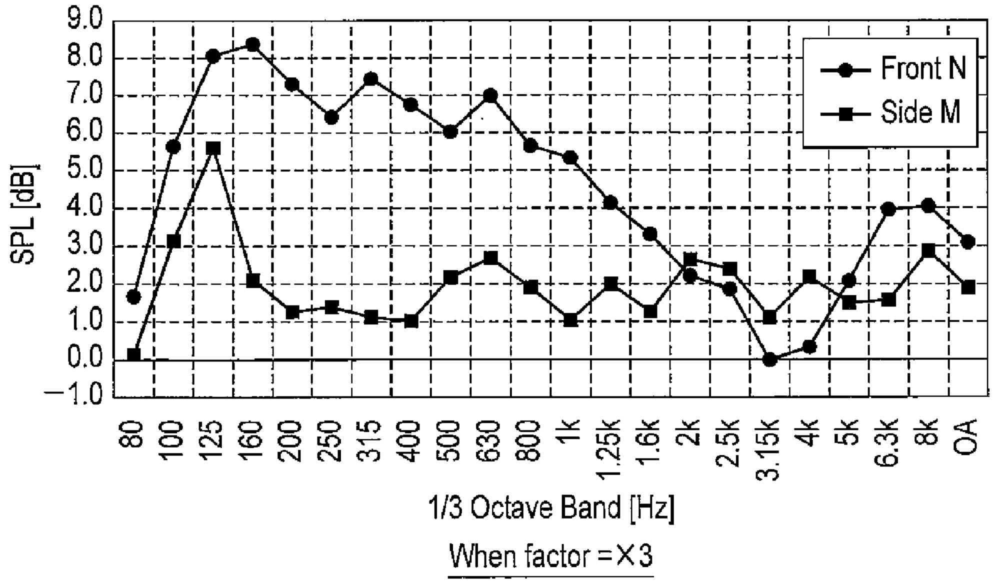
Figure 34A:
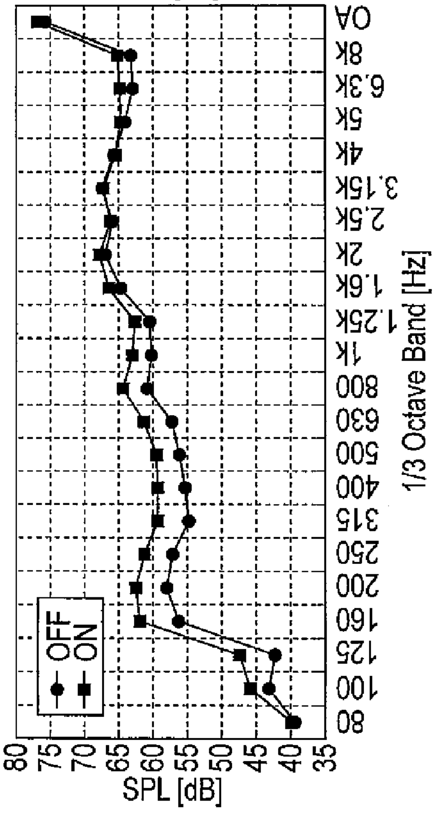
FIGS. 34A, 34B, 34C and 34D show graphs of sound pressure level actual measurement result examples before and after control.
Figure 34B:
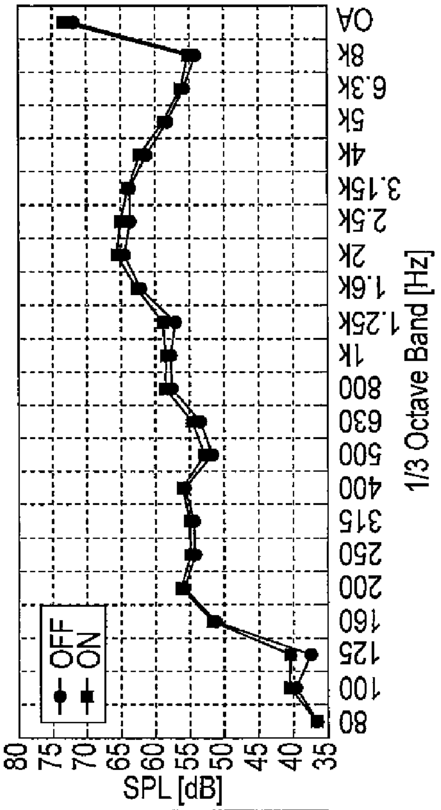
Figure 34C:
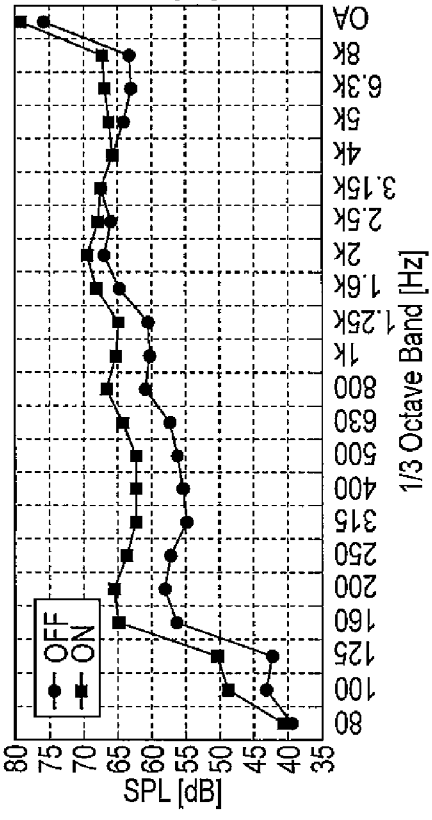
Figure 34D:
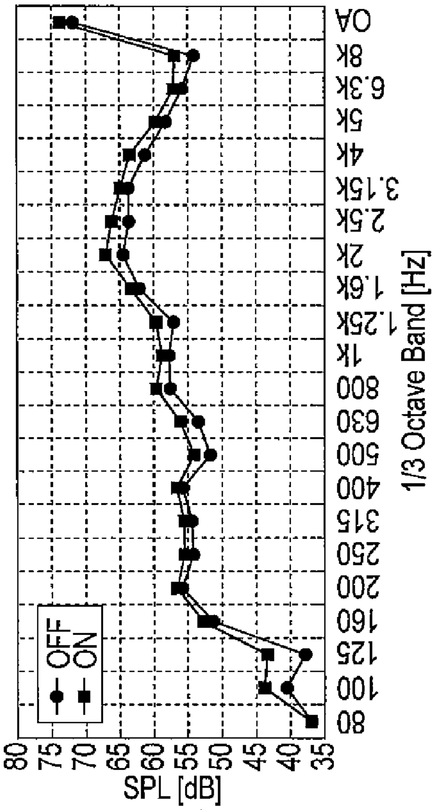

By contrast, FIGS. 33A-33B shows sound increase control effects in a layout shown in FIG. 32 in a room with echo (FIG. 34). FIG. 33A shows sound increase control effects in the listening area (front position in this case) and non-listening area (side position in this case) when the sound increase factor n=×2, and FIG. 33B shows those in the listening area (front position) and non-listening area (side position in this case) when the sound increase factor n=×4. FIG. 34A shows sound pressure levels before and after control of the listening area (front position) as a basis of the sound increase control effects in the listening area (front position) shown in FIG. 33A, and FIG. 34B shows sound pressure levels before and after control of the non-listening area (side position) as a basis of the sound increase control effects in the non-listening area (side position) shown in FIG. 33B. The same applies to the relationships between FIG. 34C and FIG. 34D and FIG. 33B.

As shown in FIG. 33A, even when the sound increase factor=×2, the sound pressure maintenance performance deterioration begin in the non-listening area, and sound increase of 6 dB cannot be assured. By contrast, as shown in FIG. 33B, when the sound increase factor=×3, a sound increase amount difference between the front and side positions is apparently increased. Note that in the echo characteristics, the factor=×3 is not optimal, and the sound increase factor may be further increased to obtain a large sound increase amount of 9.5 dB or more.

Figure 35:
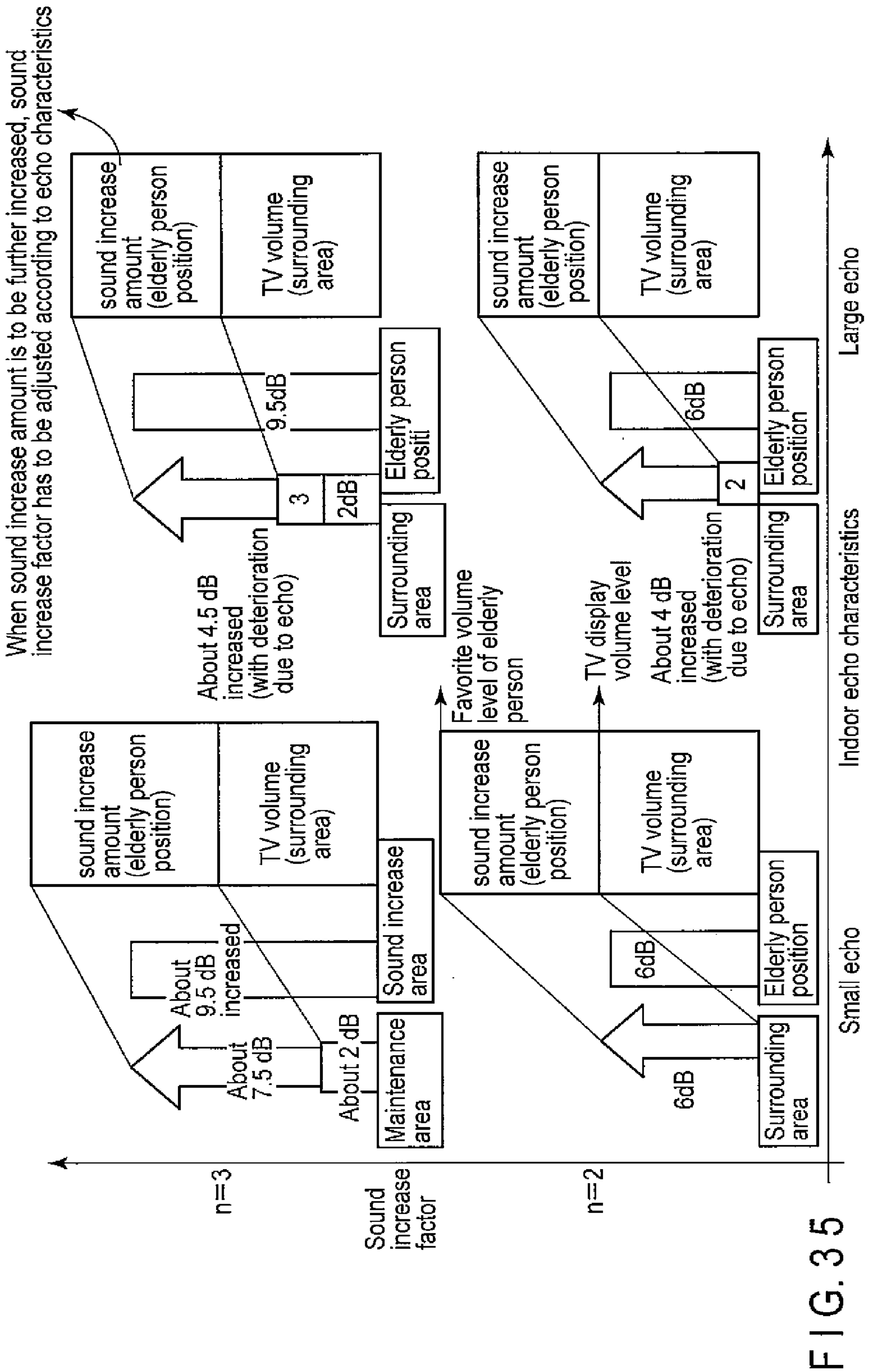
FIG. 35 is a view for explaining sound increase control with which an increase effect varies depending on echo.

As described above, FIG. 35 shows tendencies of the echo characteristics, sound increase amounts, and sound increase factors. FIG. 35 summarizes comparison results of sound increase and sound pressure maintenance effects for four combinations of small echo, large echo, and the sound increase factors n=2 and n=3 (note that since FIG. 35 exemplifies a case in which sound is increased at an estimated position of an elderly person, and sound pressure is maintained in a surrounding area, an elderly person position/sound increase area corresponds to the listening area, and a surrounding/maintenance area corresponds to the non-listening area). For example, in the case of a small echo and n=2, sound pressure is maintained in the surrounding area. However, in the case of a small echo and n=3, sound is increased by 2 dB even in the sound pressure maintenance target area. As a result, a difference between the sound increase area and sound pressure maintenance area is 7 dB, which is smaller than that when n=3. On the other hand, in the case of a large echo, sound pressure maintenance deterioration is observed due to echo even at n=2. When n=3, deterioration components due to echo become larger.

As shown in FIG. 35, when the echo characteristics can be determined with respect to a target sound increase amount, an optimal sound increase factor can be set accordingly. For example, when a factor between the increase target area and sound pressure maintenance target area is to be increased (to be closer to desired n), a method of assuring a larger value as n is available.

This embodiment includes the sound increase amount setting unit 126 which sets, in advance, a suited sound increase amount ρ at a looking and listening position of an elderly person or the like, bass emphasis factor calculation unit 143 which calculates a bass emphasis factor n at the looking and listening position based on the estimated value of the indoor characteristics $\overline{\alpha}$ and the setting value of the sound increase amount ρ, and the bass control filter calculation unit 127 which attains a sound increase amount at the suited looking and listening position by inputting the factor n value into the control filter selection unit 140.

Note that the Spatial transmission characteristics F and Z in the control filters given by equations (36) to be selected by the control filter selection unit 140 are unsusceptible to echo when they are configured by equation (38) mainly including direct waves as much as possible rather than equations (37) of echo waves. Hence, a preset method which uses, as fixed filters, filters in which the Spatial transmission characteristics F and Z, which are measured in an anechoic room in advance, are substituted in equations (36), may be adopted. By changing only the factor n according to the echo characteristics, only direct waves can be controlled even in a room with large echo to be unsusceptible to echo, thus achieving a desired sound increase amount.

On the other hand, as for control of the mid/treble band, since directional control is achieved by the central speakers, and the amplitude/phase/time delay characteristics of the individual speakers are calculated in advance, effect deteriorations due to an installation environment, that is, indoor echo characteristics, can be little.

Figure 36:
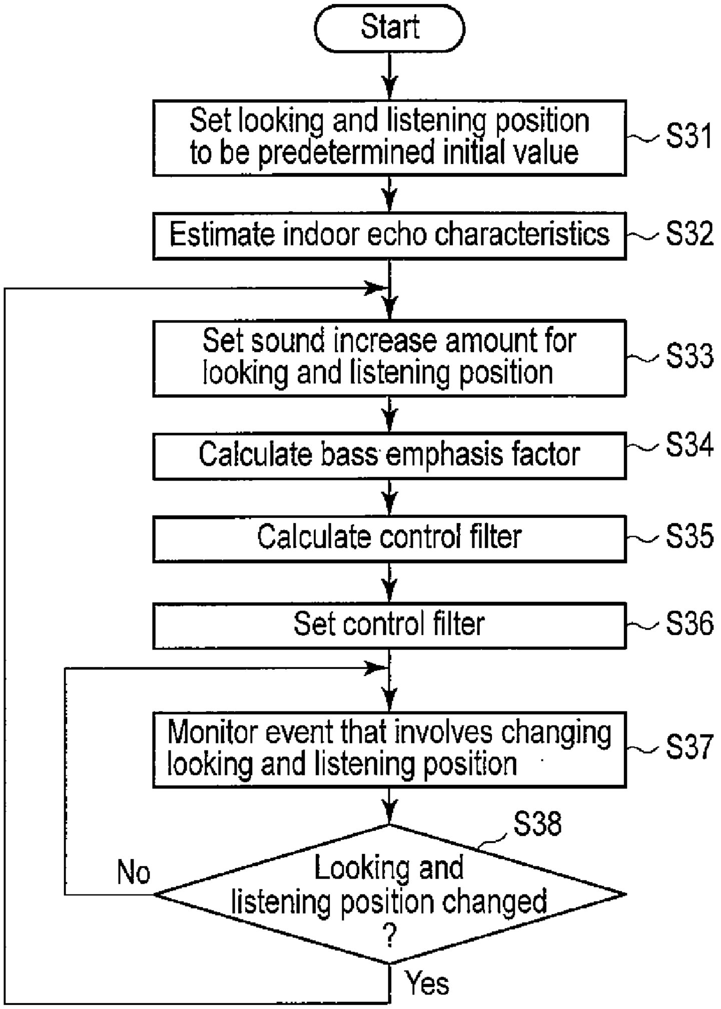
FIG. 36 is a flowchart showing an operation example of the sound field control apparatus according to the embodiment.

FIG. 36 shows an operation example associated with the sound increase control of the sound field control apparatus of this embodiment.

The following description will be given taking as an example a case in which the user does not designate the sound increase factor n.

A looking and listening position is set to a predetermined initial value (step S31). The initial value may be either a pre-set value (for example, predetermined distance in a front direction of a display apparatus) or the estimation result of the looking and listening position at the latest use timing of the sound increase control in this sound field control apparatus. Also, various other methods are available.

Indoor echo characteristics are then estimated (step S32).

A sound increase amount ρ for the estimated looking and listening position is set (step S33).

A bass emphasis factor n is calculated (step S34).

Control filters are calculated (step S35).

The calculated values are set in the control filters (step S36).

The states of the control filters are maintained until an event for changing the estimated looking and listening position is occurred. In this case, an event that involves changing the estimated looking and listening position will be considered as this event.

It is monitored in step S37 whether or not an event which involves changing the estimated looking and listening position is generated.

For example, when the user changes the looking and listening position, that event is detected (step S38), and the process returns to step S33 to re-set the sound increase amount ρ, to re-calculate the bass emphasis factor n, and to re-calculate and re-set the control filters.

Note that this procedure is an example, and variations of operations associated with the sound increase control of this embodiment are available.

When the user is allowed to designate the sound increase factor n, the sound increase factor n is set to a predetermined initial value in step S31 as in the procedure example shown in FIG. 7, and it is also monitored in step S37 whether or not an event which involves changing the sound increase factor n is generated as in the procedure example shown in FIG. 7.

According to this embodiment, deterioration of the bass increase effect due to indoor echo characteristics can be mitigated. Then, for example, even when a remote controller volume is adjusted to be relatively large to attain a desired volume for an elderly person or the like, a function of automatically adjusting a TV volume so as to set a large volume at a remote controller operation/looking and listening position of the elderly person or the like but not to set an excessive volume in a surrounding area can be implemented.

Eighth Embodiment

The eighth embodiment will be described below.

Differences from the embodiments described so far will be mainly explained.

In this embodiment, in the volume adjustment units of the sixth and seventh embodiments, in order to suppress an increase in volume (absolute volume) of a TV itself caused by a factor n, which is increased to assure a desired sound increase amount (a relative volume difference at a position of an elderly person or the like with respect to a surrounding area) under large noise/echo, an excessive volume is avoided by reducing the volumes of acoustic signals to be input to speakers according to the magnitude of the factor n. This process corresponds to that for decreasing a volume by each volume adjustment unit with reference to FIG. 34. For example, the relationship between the factor n and a volume reduction amount by the volume adjustment unit may be set in advance, or various other methods are available.

Also, instructions described in the process procedures in the aforementioned embodiments can be executed based on a program as software. A general computer system stores this program in advance, and loads this program, thus obtaining the same effects as those by the sound field control apparatus of the aforementioned embodiments. Instructions described in the aforementioned embodiments are recorded as a program, which can be executed by a computer, in a recording medium such as a magnetic disk (flexible disk, hard disk, or the like), an optical disk (CD-ROM, CD-R, CD-RW, DVD-ROM, DVD±R, DVD±RW, or the like), a semiconductor memory, or equivalents. A storage format is not particularly limited as long as a recording medium is readable by a computer or embedded system. A computer loads the program from this recording medium, and controls a CPU to execute instructions described in the program based on the loaded program, thereby implementing the same operations as those of the sound field control apparatus of the aforementioned embodiments. Of course, the computer may acquire or load the program via a network.

Based on instructions of a program which is installed from a recording medium in a computer or embedded system, an OS (Operating System), database management software, or MW (middleware) of, for example, a network, which runs on a computer, may execute some processes to implement the embodiments.

Furthermore, the recording medium of the embodiment is not limited to a medium independent of the computer or embedded system, and includes a recording medium which downloads and stores or temporarily stores a program transmitted via a LAN or the Internet.

The number of recording media is not limited to one. A case in which processes of the embodiment are executed from a plurality of media is also included in the recording medium of this embodiment, and the configuration of the medium is not particularly limited.

Note that the computer or embedded system is to execute respective processes of the embodiment based on the program stored in the recording medium, and can be any of an apparatus consisting of one of a personal computer and microcomputer, and a system in which a plurality of apparatuses are connected via a network.

The computer of this embodiment is not limited to a personal computer, and includes an arithmetic processing apparatus, microcomputer, and the like included in information processing equipment, as well as generic equipment and apparatuses that can implement the functions of the embodiment by means of the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound field control apparatus comprising:

a control filter unit configured to execute an FIR computation for an input acoustic signal using a main sound source coefficient and a plurality of control sound source coefficients to output a main sound source signal and a plurality of control sound source signals, the main sound source signal being acquired from the input acoustic signal and computed using the main sound source coefficient, and the plurality of control sound source signals being acquired from the input acoustic signal through a low-pass filter and computed using the plurality of control sound source coefficients;

a volume adjustment unit configured to adjust volumes of the main sound source signal and the plurality of control sound source signals output from the control filter unit, to supply the adjusted main sound source signal and the adjusted plurality of control sound source signals to a main sound source speaker and a plurality of control sound source speakers, respectively; and a calculation unit configured to calculate the main sound source coefficient, the plurality of control sound source coefficients, an amplitude of only one main sound source and an amplitude of a plurality of control sound sources, to be used by the control filter unit based on Spatial transmission characteristics from the main sound source speaker and the plurality of control sound source speakers to a first area and a second area, the first area being different from the second area, and a sound increase factor n, wherein the calculation unit sets a composite sound pressure from the main sound source speaker and the plurality of control sound source speakers to the first area to be n times or closer of a coming sound pressure from only the main sound source speaker, and sets a composite sound pressure from the main sound source speaker and the plurality of control sound source speakers to the second area to be equal or close to the coming sound pressure from only the main sound source speaker;

wherein the low-pass filter sets a control upper limit frequency to be fd, and the main sound source speaker and the plurality of control sound source speakers have therebetween a speaker interval that is laid out in a predetermined pattern, and is set to be d (where d≤c/2fd, and c is a sonic velocity).

2. The apparatus according to claim 1, wherein the calculation unit calculates the main sound source coefficient and the plurality of control sound source coefficients to set the composite sound pressure from the main sound source speaker and the plurality of control sound source speakers to the second area to be equal or close to the coming sound pressure from only the main sound source speaker by minimizing acoustic energies of the plurality of control sound source speakers transferred to the second area.

3. The apparatus according to claim 1, wherein one main sound source speaker and two control sound source speakers form one set, and the main sound source speaker and the control sound source speakers are laid out in a triangular pattern in which speaker intervals between the main sound source speaker and the control sound source speakers are d.

4. The apparatus according to claim 3, wherein the main sound source speaker and the control sound source speakers are laid out in a bezel frame of an image display apparatus, and the main sound source speaker is laid out at a corner of the bezel.

5. The apparatus according to claim 4, wherein the control sound source speakers are laid out at positions deviated from a center of the bezel frame.

6. The apparatus according to claim 3, wherein the main sound source speaker and the control sound source speakers are laid out inside an image display apparatus, and are coupled to corresponding openings on a bezel surface of the image display apparatus via ducts, and the openings related to the main sound source speaker and the control sound source speakers are laid out in a triangular pattern having an interval d.

7. A sound field control apparatus comprising:

a control filter unit configured to execute an FIR computation for an input acoustic signal using a main sound source coefficient and a plurality of control sound source coefficients to output a main sound source signal and a plurality of control sound source signals, the main sound source signal being acquired from the input acoustic signal and computed using the main sound source coefficient, and the plurality of control sound source signals being acquired from the input acoustic signal and computed using the plurality of control sound source coefficients;

a volume adjustment unit configured to adjust volumes of the main sound source signal and the plurality of control sound source signals output from the control filter unit, to supply the adjusted main sound source signal and the adjusted plurality of control sound source signals to a main sound source speaker and a plurality of control sound source speakers, respectively;

a calculation unit configured to calculate the main sound source coefficient, the plurality of control sound source coefficients, an amplitude of only one main sound source and an amplitude of a plurality of control sound sources, to be used by the control filter unit based on Spatial transmission characteristics from the main sound source speaker and the plurality of control sound source speakers to a first area and a second area, the first area being different from the second area, and a sound increase factor n, wherein the calculation unit sets a composite sound pressure from the main sound source speaker and the plurality of control sound source speakers to the first area to be n times or closer of a coming sound pressure from only the main sound source speaker, and sets a composite sound pressure from the main sound source speaker and the plurality of control sound source speakers to the second area to be equal or close to the coming sound pressure from only the main sound source speaker; and a determination unit configured to determine whether output voltages of the control sound source signals from the control filter unit is more than an allowable input voltage to the volume adjustment unit; and a change unit configured to change, when the determination unit determines that the output voltages exceed the allowable input voltage, the sound increase factor or an amplitude of the main sound source so that the output voltages become not more than the allowable input voltage.

8. A sound field control apparatus comprising:

a control filter unit configured to execute an FIR computation for an input acoustic signal using a main sound source coefficient and a plurality of control sound source coefficients to output a main sound source signal and a plurality of control sound source signals, the main sound source signal being acquired from the input acoustic signal and computed using the main sound source coefficient, and the plurality of control sound source signals being acquired from the input acoustic signal and computed using the plurality of control sound source coefficients;

a volume adjustment unit configured to adjust volumes of the main sound source signal and the plurality of control sound source signals output from the control filter unit, to supply the adjusted main sound source signal and the adjusted plurality of control sound source signals to a main sound source speaker and a plurality of control sound source speakers, respectively; and a calculation unit configured to calculate the main sound source coefficient, the plurality of control sound source coefficients, an amplitude of only one main sound source and an amplitude of a plurality of control sound sources, to be used by the control filter unit based on Spatial transmission characteristics from the main sound source speaker and the plurality of control sound source speakers to a first area and a second area, the first area being different from the second area, and a sound increase factor n, wherein the calculation unit sets a composite sound pressure from the main sound source speaker and the plurality of control sound source speakers to the first area to be n times or closer of a coming sound pressure from only the main sound source speaker, and sets a composite sound pressure from the main sound source speaker and the plurality of control sound source speakers to the second area to be equal or close to the coming sound pressure from only the main sound source speaker; and a signal adjustment unit arranged between the control filter unit and the calculation unit and configured to detect a frequency band component as an excessive input in association with a gain of the control filter unit, and to remove the frequency band component as the excessive input.

9. The apparatus according to claim 1, wherein the acoustic signal is a stereo acoustic signal including a right-channel acoustic signal and a left-channel acoustic signal, the sound field control apparatus comprises one set of the control filter unit, the volume adjustment unit, and the calculation unit in correspondence with each of a bass band acoustic signal extracted from the right-channel acoustic signal and a bass band acoustic signal extracted from the left-channel acoustic signal, and the sound field control apparatus further comprises a mid/treble control unit configured to control mid/treble speakers to output acoustic signals associated with mid/treble tones obtained from the right-channel acoustic signal and the left-channel acoustic signal to have directionality to the first area.

10. The apparatus according to claim 9, further comprising:

a listening position estimation unit configured to estimate a listening position, and an area including the listening position estimated by the listening position estimation unit is set as the first area.

11. The apparatus according to claim 1, further comprising:

a sound increase factor input unit configured to input the sound increase factor.

12. A sound field control method of a sound field control apparatus, which comprises a control filter unit, a volume adjustment unit, a calculation unit, and a low-pass filter, the method comprising the steps of:

executing, at the control filter unit, an FIR computation for an input acoustic signal using a main sound source coefficient and a plurality of control sound source coefficients and to output a main sound source signal and a plurality of control sound source signals, the main sound source signal being acquired from the input acoustic signal and computed using the main sound source coefficient, and the plurality of control sound source signals being acquired from the input acoustic signal through a low-pass filter and computed using the plurality of control sound source coefficients;

adjusting, at the volume adjustment unit, volumes of the main sound source signal and the plurality of control sound source signals output from the control filter unit, and to supply the adjusted main sound source signal and the adjusted plurality of control sound source signals to a main sound source speaker and a plurality of control sound source speakers, respectively; and calculating, at the calculation unit, the main sound source coefficient, the plurality of control sound source coefficients, amplitude of only one main sound source, and amplitude of a plurality of control sound sources to be used by the control filter unit based on Spatial transmission characteristics from the main sound source speaker and the plurality of control sound source speakers to a first area and a second area, the first area being different from the second area, and a sound increase factor n, wherein the calculating the main sound source coefficient sets a composite sound pressure from the main sound source speaker and the plurality of control sound source speakers to the first area to be n times or closer of a coming sound pressure from only the main sound source speaker, and sets a composite sound pressure from the main sound source speaker and the plurality of control sound source speakers to the second area to be equal or close to the coming sound pressure from only the main sound source speaker;

wherein the low-pass filter sets a control upper limit frequency to be fd, and the main sound source speaker and the plurality of control sound source speakers have therebetween as speaker interval that is laid out in a predetermined pattern, and is set to be d (where $d \le c/2fd$, and c is a sonic velocity).

13. The apparatus according to claim 7, wherein the calculation unit calculates the main sound source coefficient and the plurality of control sound source coefficients to set the composite sound pressure from the main sound source speaker and the plurality of control sound source speakers to the second area to be equal or close to the coming sound pressure from only the main sound source speaker by minimizing acoustic energies of the plurality of control sound source speakers transferred to the second area.

14. The apparatus according to claim 7, wherein the acoustic signal is a stereo acoustic signal including a right-channel acoustic signal and a left-channel acoustic signal, the sound field control apparatus comprises one set of the control filter unit, the volume adjustment unit, and the calculation unit in correspondence with each of a bass band acoustic signal extracted from the right-channel acoustic signal and a bass band acoustic signal extracted from the left-channel acoustic signal, and the sound field control apparatus further comprises a mid/treble control unit configured to control mid/treble speakers to output acoustic signals associated with mid/treble tones obtained from the right-channel acoustic signal and the left-channel acoustic signal to have directionality to the first area.

15. The apparatus according to claim 7, further comprising:

a sound increase factor input unit configured to input the sound increase factor.

16. The apparatus according to claim 8, wherein the calculation unit calculates the main sound source coefficient and the plurality of control sound source coefficients to set the composite sound pressure from the main sound source speaker and the plurality of control sound source speakers to the second area to be equal or close to the coming sound pressure from only the main sound source speaker by minimizing acoustic energies of the plurality of control sound source speakers transferred to the second area.

17. The apparatus according to claim 8, wherein the acoustic signal is a stereo acoustic signal including a right-channel acoustic signal and a left-channel acoustic signal, the sound field control apparatus comprises one set of the control filter unit, the volume adjustment unit, and the calculation unit in correspondence with each of a bass band acoustic signal extracted from the right-channel acoustic signal and a bass band acoustic signal extracted from the left-channel acoustic signal, and the sound field control apparatus further comprises a mid/treble control unit configured to control mid/treble speakers to output acoustic signals associated with mid/treble tones obtained from the right-channel acoustic signal and the left-channel acoustic signal to have directionality to the first area.

18. The apparatus according to claim 8, further comprising:

a sound increase factor input unit configured to input the sound increase factor.

19. A sound field control method of a sound field control apparatus, which comprises a control filter unit, a volume adjustment unit, a calculation unit, a determination unit, and a change unit, the method comprising the steps of:

executing, at the control filter unit, an FIR computation for an input acoustic signal using a main sound source coefficient and a plurality of control sound source coefficients and to output a main sound source signal and a plurality of control sound source signals, the main sound source signal being acquired from the input acoustic signal and computed using the main sound source coefficient, and the plurality of control sound source signals being acquired from the input acoustic signal and computed using the plurality of control sound source coefficients;

adjusting, at the volume adjustment unit, volumes of the main sound source signal and the plurality of control sound source signals output from the control filter unit, and to supply the adjusted main sound source signal and the adjusted plurality of control sound source signals to a main sound source speaker and a plurality of control sound source speakers, respectively; and calculating, at the calculation unit, the main sound source coefficient, the plurality of control sound source coefficients, amplitude of only one main sound source, and amplitude of a plurality of control sound sources to be used by the control filter unit based on Spatial transmission characteristics from the main sound source speaker and the plurality of control sound source speakers to a first area and a second area, the first area being different from the second area, and a sound increase factor n, wherein the calculating the main sound source coefficient sets a composite sound pressure from the main sound source speaker and the plurality of control sound source speakers to the first area to be n times or closer of a coming sound pressure from only the main sound source speaker, and sets a composite sound pressure from the main sound source speaker and the plurality of control sound source speakers to the second area to be equal or close to the coming sound pressure from only the main sound source speaker; and determining, at the determination unit, whether output voltages of the control sound signals from the control filter unit more than an allowable input voltage to the volume adjustment unit; and changing, at the change unit, when the determination unit determines that the output voltages exceed the allowable input voltage, the sound increase factor or an amplitude of the main sound source so that the output voltages become not more than the allowable input voltage.

20. A sound field control method of a sound field control apparatus, which comprises a control filter unit, a volume adjustment unit, a calculation unit, and a signal adjustment unit arranged between the control filter unit and the calculation unit and, the method comprising the steps of:

executing, at the control filter unit, an FIR computation for an input acoustic signal using a main sound source coefficient and a plurality of control sound source coefficients and to output a main sound source signal and a plurality of control sound source signals, the main sound source signal being acquired from the input acoustic signal and computed using the main sound source coefficient, and the plurality of control sound source signals being acquired from the input acoustic signal and computed using the plurality of control sound source coefficients;

adjusting, at the volume adjustment unit, volumes of the main sound source signal and the plurality of control sound source signals output from the control filter unit, and to supply the adjusted main sound source signal and the adjusted plurality of control sound source signals to a main sound source speaker and a plurality of control sound source speakers, respectively; and calculating, at the calculation unit, the main sound source coefficient, the plurality of control sound source coefficients, amplitude of only one main sound source, and amplitude of a plurality of control sound sources to be used by the control filter unit based on Spatial transmission characteristics from the main sound source speaker and the plurality of control sound source speakers to a first area and a second area, the first area being different from the second area, and a sound increase factor n, wherein the calculating the main sound source coefficient sets a composite sound pressure from the main sound source speaker and the plurality of control sound source speakers to the first area to be n times or closer of a coming sound pressure from only the main sound source speaker, and sets a composite sound pressure from the main sound source speaker and the plurality of control sound source speakers to the second area to be equal or close to the coming sound pressure from only the main sound source speaker; and detecting, at the signal adjustment unit, a frequency band component as an excessive input in association with a gain of the control filter unit, and to remove the frequency band component as the excessive input.

* * * * *